US012498922B2

United States Patent
Dou et al.

(10) Patent No.: US 12,498,922 B2
(45) Date of Patent: Dec. 16, 2025

(54) QUANTUM COMPUTING PLATFORM ADAPTATION METHOD AND APPARATUS, AND QUANTUM COMPUTER OPERATING SYSTEM

(71) Applicant: ORIGIN QUANTUM COMPUTING TECHNOLOGY (HEFEI) CO., LTD, Anhui (CN)

(72) Inventors: Menghan Dou, Anhui (CN); Yuan Fang, Anhui (CN); Jing Wang, Anhui (CN); Dongyi Zhao, Anhui (CN)

(73) Assignee: ORIGIN QUANTUM COMPUTING TECHNOLOGY (HEFEI) CO., LTD, Anhui (CN)

( * ) Notice: Subject to any disclaimer, the term of this patent is extended or adjusted under 35 U.S.C. 154(b) by 270 days.

(21) Appl. No.: 18/491,184

(22) Filed: Oct. 20, 2023

(65) Prior Publication Data

US 2024/0338213 A1    Oct. 10, 2024

Related U.S. Application Data

(63) Continuation of application No. PCT/CN2022/087842, filed on Apr. 20, 2022.

(30) Foreign Application Priority Data

Apr. 21, 2021 (CN) .......................... 202110430149.3
Apr. 21, 2021 (CN) .......................... 202110430151.3
Apr. 21, 2021 (CN) .......................... 202110431607.3

(51) Int. Cl.
 G06F 8/76   (2018.01)
 G06N 10/20  (2022.01)
 G06N 10/80  (2022.01)

(52) U.S. Cl.
 CPC .............. *G06F 8/76* (2013.01); *G06N 10/20* (2022.01); *G06N 10/80* (2022.01)

(58) Field of Classification Search
 None
 See application file for complete search history.

(56) References Cited

U.S. PATENT DOCUMENTS 10,592,816 B1 *   3/2020   Hsu .................. G16H 40/20
10,769,545 B2 *   9/2020   Amin ................ G06N 10/20
(Continued)

FOREIGN PATENT DOCUMENTS

CN   109376866 B    3/2021
CN   110825375 B    12/2022

OTHER PUBLICATIONS

Lin et al., "Layout Synthesis for Topological Quantum Circuits With 1-D and 2-D Architectures," IEEE, 2018. (Year: 2018).*
(Continued)

*Primary Examiner* — Ryan D. Coyer
(74) *Attorney, Agent, or Firm* — IPkey PLLC

(57) ABSTRACT

A quantum computing platform adaptation method and apparatus, and a quantum computer operating system are provided. The method includes: acquiring a quantum program to be executed and a topological structure of a quantum chip corresponding to a quantum computing platform, wherein the topological structure is configured to represent physical qubits in an electronic device and a connection relationship between the physical qubits; and adapting the quantum program to the quantum computing platform based on the topological structure. According to some embodiments of the present disclosure, scalability of the quantum program can be improved, so that the quantum program can be adapted to different quantum computing platforms and run on different quantum chips.

19 Claims, 18 Drawing Sheets

(56) References Cited

U.S. PATENT DOCUMENTS 11,250,334 B2 * 2/2022 Fano .................. G06N 5/04
2020/0326977 A1 10/2020 Gambetta et al.

OTHER PUBLICATIONS

Siraichi et al., "Qubit Allocation as a Combination of Subgraph Isomorphism and Token Swapping," ACM, 2019. (Year: 2019).*
International Search Report mailed on Jun. 22, 2022, issued in the corresponding International Application No. PCT/CN2022/087842, filed on Apr. 20, 2022, and its English translation thereof, 5 pages.

* cited by examiner

QUANTUM COMPUTING PLATFORM ADAPTATION METHOD AND APPARATUS, AND QUANTUM COMPUTER OPERATING SYSTEM

CROSS-REFERENCE TO RELATED APPLICATIONS

This application is a continuation of International Application No. PCT/CN2022/087842, filed on Apr. 20, 2022, which claims priority to Chinese Patent Application No. 202110431607.5, filed on Apr. 21, 2021, to Chinese Patent Application No. 202110430149.3, filed on Apr. 21, 2021, and to Chinese Patent Application No. 202110430151.0, filed on Apr. 21, 2021, the entire contents of which are incorporated herein by reference.

TECHNICAL FIELD

The present disclosure relates to the technical field of quantum computing and, in particular, to a quantum computing platform adaptation method and apparatus, and a quantum computer operating system.

BACKGROUND

Different quantum computing platforms include different quantum chips, and different quantum computing chips support different sets of quantum logic gates. Generally, during implementation of a quantum algorithm, the quantum algorithm developed by quantum software developers can only run on a designated quantum chip. Therefore, it is an urgent problem of how to improve scalability of a quantum program so that the quantum program can be adapted to different quantum computing platforms and run on different quantum chips.

SUMMARY

Embodiments of the present disclosure provide a quantum computing platform adaptation method and apparatus, and a quantum computer operating system to improve scalability of the quantum program, so that the quantum program can be adapted to different quantum computing platforms and run on different quantum chips.

In a first aspect, some embodiments of the present disclosure provide a quantum computing platform adaptation method, including: acquiring a quantum program to be executed and a topological structure of a quantum chip corresponding to a quantum computing platform, the topological structure is configured to represent physical qubits in an electronic device and a connection relationship between the physical qubits; and adapting the quantum program to the quantum computing platform based on the topological structure.

In some embodiments, the adapting the quantum program to the quantum computing platform based on the topological structure includes: constructing a first directed acyclic graph of the quantum program; traversing the first directed acyclic graph to obtain a maximum subgraph sequence, the maximum subgraph sequence includes N maximum subgraphs, and N is an integer greater than or equal to 1; determining isomorphic subgraphs of the N maximum subgraphs in the topological structure to obtain N sets of isomorphic subgraphs, the N sets of isomorphic subgraphs being in one-to-one correspondence to the N maximum subgraphs; and constructing a quantum circuit based on the N sets of isomorphic subgraphs, the quantum circuit is configured to operate on the quantum computing platform.

In some embodiments, the constructing a first directed acyclic graph of the quantum program includes: acquiring quantum logic gates of the quantum program; and constructing the first directed acyclic graph based on the quantum logic gates, the first directed acyclic graph includes nodes and directed edges; the nodes include two points and an edge, the two points are configured to represent two logical qubits corresponding to the quantum logic gate, and the edge is configured to represent the quantum logic gate acting on the two logical qubits; and the directed edges are configured to represent dependence of the quantum logic gate based on a quantum state evolution time sequence of logical qubits.

In some embodiments, the quantum logic gates include multi-quantum logic gates; and the constructing the first directed acyclic graph based on the quantum logic gates includes: converting the multi-quantum logic gate into a single-quantum logic gate and a two-quantum logic gate; and deleting the single-quantum logic gate, and constructing the first directed acyclic graph based on the two-quantum logic gate.

In some embodiments, the constructing the first directed acyclic graph based on the quantum logic gates includes: constructing, when the quantum logic gates include a plurality of continuous two-quantum logic gates and the plurality of continuous two-quantum logic gates act on two identical logical qubits, the first directed acyclic graph based on any one of the plurality of continuous two-quantum logic gates.

In some embodiments, the method further includes: constructing, when the quantum logic gates include a plurality of continuous two-quantum logic gates and the plurality of continuous two-quantum logic gates act on two different logical qubits, the first directed acyclic graph based on the plurality of continuous two-quantum logic gates.

In some embodiments, the traversing the first directed acyclic graph to obtain a maximum subgraph sequence includes: determining a first node in the first directed acyclic graph, an in-degree of the first node being 0; generating a first subgraph based on the first node; deleting the first node to obtain a second directed acyclic graph; determining whether a second node exists in the second directed acyclic graph, an in-degree of the second node being 0; determining the first subgraph as a maximum subgraph when the second node does not exist in the second directed acyclic graph; and arranging the maximum subgraphs in an order of generation to obtain the maximum subgraph sequence.

In some embodiments, the traversing the first directed acyclic graph to obtain a maximum subgraph sequence further includes: determining, when the second node exists in the second directed acyclic graph, a priority of the second node, the second node includes two points and an edge, the two points are configured to represent two logical qubits in the quantum program, and the edge is configured to represent the quantum logic gate acting on the two logical qubits; and the priority of the second node is determined based on the two points, the edge, and the first subgraph; and generating a maximum subgraph based on the second node and the priority of the second node.

In some embodiments, the generating a maximum subgraph based on the second node and the priority of the second node includes: expanding, when the second node has a first priority, the first subgraph into a second subgraph based on the second node, and taking the second subgraph as a new first subgraph; deleting the second node to obtain a third directed acyclic graph; and taking the third directed acyclic graph as a new second directed acyclic graph, and then performing the step of determining whether a second node exists in the second directed acyclic graph.

In some embodiments, the generating a maximum subgraph based on the second node and the priority of the second node further includes: taking, when the second node has a second priority, the second node as a new first node, and then performing the step of generating a first subgraph based on the first node, the first priority is prior than the second priority.

In some embodiments, the first priority includes a first subpriority and a second subpriority, and the second priority includes a third subpriority and a fourth subpriority; and the determining a priority of the second node includes: determining the priority of the second node as the fourth subpriority when the two points and the edge do not exist in the first subgraph; determining the priority of the second node as the third subpriority when the two points exist and the edge does not exist in the first subgraph; determining the priority of the second node as the second subpriority when one of the two points exists and the edge does not exist in the first subgraph; and determining the priority of the second node as the first subpriority if the two points and the edge exist in the first subgraph; the priorities, from high to low, are sequentially the first subpriority, the second subpriority, the third subpriority, and the fourth subpriority.

In some embodiments, the adapting the quantum program to the quantum computing platform based on the topological structure includes: determining N sets of isomorphic subgraphs corresponding to N maximum subgraphs of the quantum program, the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs.

In some embodiments, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes: determining the fixed cost of each isomorphic subgraph in the N sets of isomorphic subgraphs to obtain N fixed cost sets, the N fixed cost sets are in one-to-one correspondence to the N sets of isomorphic subgraphs; determining the exchange cost between any two isomorphic subgraphs in any adjacent sets of isomorphic subgraphs in the N sets of isomorphic subgraphs to obtain N−1 exchange cost sets, each of the exchange cost sets includes $k_i \cdot k_{i+1}$ exchange costs; determining $$\prod\nolimits_{i=0}^{i=N-1} k_i$$

consumption costs based on the N fixed cost sets and the N−1 exchange cost sets; and constructing the quantum circuit based on the $$\prod\nolimits_{i=0}^{i=N-1} k_i$$

consumption costs.

In some embodiments, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes: determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph; determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph; determining exchange costs of all the first isomorphic subgraphs in the first set of isomorphic subgraphs and each second isomorphic subgraph in the second set of isomorphic subgraphs to obtain $k_i$ exchange cost sets, each of the exchange cost sets includes $k_0$ exchange costs; determining $k_i$ consumption cost sets based on the first fixed cost set, the second fixed cost set, and the $k_i$ exchange cost sets, each of the consumption cost sets includes $k_0$ consumption costs; determining a minimum consumption cost in each of the consumption cost sets to obtain $k_i$ minimum consumption costs, the $k_i$ minimum consumption costs are in one-to-one correspondence to $k_i$ second isomorphic subgraphs in the second set of isomorphic subgraphs; constituting each second isomorphic subgraph in the $k_i$ second isomorphic subgraphs and the first isomorphic subgraph corresponding thereto into a new first isomorphic subgraph, to obtain $k_i$ new first isomorphic subgraphs; determining the $k_i$ new first isomorphic subgraphs as a new first set of isomorphic subgraphs; setting i=i+1, and performing the step of determining a first fixed cost of each first isomorphic subgraph in a first isomorphic subgraph set to obtain a first fixed cost set, an initial value of i is 1; and constructing, when i=N−1, the quantum circuit based on the obtained $k_{N-1}$ minimum consumption costs.

In some embodiments, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes: determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph; determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph; determining exchange costs of all the second isomorphic subgraphs in the second sets of isomorphic subgraphs and each first isomorphic subgraph in the first set of isomorphic subgraphs to obtain $k_0$ exchange cost sets, each of the exchange cost sets includes $k_i$ exchange costs; determining $k_0$ consumption cost sets based on the first fixed cost set, the second fixed cost set, and the $k_0$ exchange cost sets, each of the consumption cost sets includes $k_i$ consumption costs; determining a minimum consumption cost in each of the consumption cost sets to obtain $k_0$ minimum consumption costs, the $k_0$ minimum consumption costs are in one-to-one correspondence to $k_0$ first isomorphic subgraphs in the first set of isomorphic subgraphs; constituting each first isomorphic subgraph in the $k_0$ first isomorphic subgraphs and the second isomorphic subgraph corresponding thereto into a new first isomorphic subgraph, to obtain $k_0$ new first isomorphic subgraphs; determining the $k_0$ new first isomorphic subgraphs as a new first set of isomorphic subgraphs; setting i=i+1, and performing the step of determining a first fixed cost of each first isomorphic subgraph in a first isomorphic subgraph set to obtain a first fixed cost set, an initial value of i is 1; and constructing, when i=N−1, the quantum circuit based on the obtained $k_0$ minimum consumption costs.

In some embodiments, the fixed cost and the exchange cost are determined based on fidelity.

In some embodiments, the fixed cost and the exchange cost are determined based on the number of CZ gates.

In a second aspect, some embodiments of the present disclosure provide a quantum circuit construction method, including: traversing a first directed acyclic graph of a quantum program to obtain a maximum subgraph sequence, the maximum subgraph sequence includes N maximum subgraphs, and N is an integer greater than or equal to 1; and constructing a quantum circuit according to the N maximum subgraphs and a topological structure, the topological structure is configured to represent physical qubits in an electronic device and a connection relationship between the physical qubits.

In some embodiments, the constructing a quantum circuit according to the N maximum subgraphs and a topological structure includes: determining isomorphic subgraphs of the N maximum subgraphs in the topological structure to obtain N sets of isomorphic subgraphs, the N sets of isomorphic subgraphs are in one-to-one correspondence to the N maximum subgraphs; and constructing the quantum circuit based on the N sets of isomorphic subgraphs.

In some embodiments, the traversing a first directed acyclic graph of a quantum program to obtain a maximum subgraph sequence includes: determining a first node in the first directed acyclic graph, an in-degree of the first node being 0; generating a first subgraph based on the first node; deleting the first node to obtain a second directed acyclic graph; determining whether a second node exists in the second directed acyclic graph, an in-degree of the second node being 0; determining the first subgraph as a maximum subgraph when the second node does not exist in the second directed acyclic graph; and arranging the maximum subgraphs in an order of generation to obtain the maximum subgraph sequence.

In some embodiments, the traversing a first directed acyclic graph of a quantum program to obtain a maximum subgraph sequence further includes: determining, when the second node exists in the second directed acyclic graph, a priority of the second node, the second node includes two points and an edge, the two points are configured to represent two logical qubits in the quantum program, and the edge is configured to represent the quantum logic gate acting on the two logical qubits; and the priority of the second node is determined based on the two points, the edge, and the first subgraph; and generating a maximum subgraph based on the second node and the priority of the second node.

In some embodiments, the generating a maximum subgraph based on the second node and the priority of the second node includes: expanding, when the second node has a first priority, the first subgraph into a second subgraph based on the second node, and taking the second subgraph as a new first subgraph; deleting the second node to obtain a third directed acyclic graph; and taking the third directed acyclic graph as a new second directed acyclic graph, and then performing the step of determining whether a second node exists in the second directed acyclic graph.

In some embodiments, the generating a maximum subgraph based on the second node and the priority of the second node further includes: taking, when the second node has a second priority, the second node as a new first node, and then performing the step of generating a first subgraph based on the first node, the first priority is prior than the second priority.

In some embodiments, the first priority includes a first subpriority and a second subpriority, and the second priority includes a third subpriority and a fourth subpriority; and the determining a priority of the second node includes: determining the priority of the second node as the fourth subpriority when the two points and the edge do not exist in the first subgraph; determining the priority of the second node as the third subpriority when the two points exist and the edge does not exist in the first subgraph; determining the priority of the second node as the second subpriority when one of the two points exists and the edge does not exist in the first subgraph; and determining the priority of the second node as the first subpriority if the two points and the edge exist in the first subgraph; the priorities, from high to low, are sequentially the first subpriority, the second subpriority, the third subpriority, and the fourth subpriority.

In a third aspect, some embodiments of the present disclosure provide a quantum circuit construction method, including: determining N sets of isomorphic subgraphs corresponding to N maximum subgraphs of the quantum program, the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs.

In some embodiments, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes: determining the fixed cost of each isomorphic subgraph in the N sets of isomorphic subgraphs to obtain N fixed cost sets, the N fixed cost sets are in one-to-one correspondence to the N sets of isomorphic subgraphs; determining the exchange cost between any two isomorphic subgraphs in any adjacent sets of isomorphic subgraphs in the N sets of isomorphic subgraphs to obtain N−1 exchange cost sets, each of the exchange cost sets includes $k_i \cdot k_{i+1}$ exchange costs; determining $$\prod_{i=0}^{i=N-1} k_i$$

consumption costs based on the N fixed cost sets and the N−1 exchange cost sets; and constructing the quantum circuit based on the $$\prod_{i=0}^{i=N-1} k_i$$

consumption costs.

In some embodiments, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes: determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph; determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph; determining exchange costs of all the first isomorphic subgraphs in the first set of isomorphic subgraphs and each second isomorphic subgraph in the second set of isomorphic subgraphs to obtain $k_i$ exchange cost sets, each of the exchange cost sets includes $k_0$ exchange costs; determining $k_i$ consumption cost sets based on the first fixed cost set, the second fixed cost set, and the $k_i$ exchange cost sets, each of the consumption cost sets includes $k_0$ consumption costs; determining a minimum consumption cost in each of the consumption cost sets to obtain $k_i$ minimum consumption costs, the $k_i$ minimum consumption costs are in one-to-one correspondence to $k_i$ second isomorphic subgraphs in the second set of isomorphic subgraphs; constituting each second isomorphic subgraph in the $k_i$ second isomorphic subgraphs and the first isomorphic subgraph corresponding thereto into a new first isomorphic subgraph, to obtain $k_i$ new first isomorphic subgraphs; determining the $k_i$ new first isomorphic subgraphs as a new first set of isomorphic subgraphs; setting i=i+1, and performing the step of determining a first fixed cost of each first isomorphic subgraph in a first isomorphic subgraph set to obtain a first fixed cost set, an initial value of i is 1; and constructing, when i=N−1, the quantum circuit based on the obtained $k_{N-1}$ minimum consumption costs.

In some embodiments, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes: determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph; determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph; determining exchange costs of all the second isomorphic subgraphs in the second sets of isomorphic subgraphs and each first isomorphic subgraph in the first set of isomorphic subgraphs to obtain $k_0$ exchange cost sets, each of the exchange cost sets includes $k_i$ exchange costs; determining $k_0$ consumption cost sets based on the first fixed cost set, the second fixed cost set, and the $k_0$ exchange cost sets, each of the consumption cost sets includes $k_i$ consumption costs; determining a minimum consumption cost in each of the consumption cost sets to obtain $k_0$ minimum consumption costs, the $k_0$ minimum consumption costs are in one-to-one correspondence to $k_0$ first isomorphic subgraphs in the first set of isomorphic subgraphs; constituting each first isomorphic subgraph in the $k_0$ first isomorphic subgraphs and the second isomorphic subgraph corresponding thereto into a new first isomorphic subgraph, to obtain $k_0$ new first isomorphic subgraphs; determining the $k_0$ new first isomorphic subgraphs as a new first set of isomorphic subgraphs; setting i=i+1, and performing the step of determining a first fixed cost of each first isomorphic subgraph in a first isomorphic subgraph set to obtain a first fixed cost set, an initial value of i is 1; and constructing, when i=N−1, the quantum circuit based on the obtained $k_0$ minimum consumption costs.

In some embodiments, the fixed cost and the exchange cost are determined based on fidelity.

In some embodiments, the fixed cost and the exchange cost are determined based on the number of CZ gates.

In a fourth aspect, some embodiments of the present disclosure provide a quantum computing platform adaptation apparatus, including: an acquisition unit configured to acquire a quantum program and a topological structure of a quantum chip corresponding to a quantum computing platform, the topological structure is configured to represent physical qubits in an electronic device and a connection relationship between the physical qubits; and an adaptation unit configured to adapt the quantum program to the quantum computing platform based on the topological structure.

In a fifth aspect, some embodiments of the present disclosure provide a quantum circuit construction apparatus, including: a traversal unit configured to traverse a first directed acyclic graph of a quantum program to obtain a maximum subgraph sequence, the maximum subgraph sequence includes N maximum subgraphs, and N is an integer greater than or equal to 1; and a construction unit configured to construct a quantum circuit according to the N maximum subgraphs and a topological structure, the topological structure is configured to represent physical qubits in an electronic device and a connection relationship between the physical qubits.

In a sixth aspect, some embodiments of the present disclosure provide a quantum circuit construction apparatus, including: a determination unit configured to determine N sets of isomorphic subgraphs corresponding to N maximum subgraphs of the quantum program, the N maximum subgraphs are determined based on a directed acyclic graph of the quantum program, and N is an integer greater than or equal to 1; and a construction unit configured to determine a fixed cost of each isomorphic subgraph in the N sets of isomorphic subgraphs and an exchange cost between any two isomorphic subgraphs in any adjacent sets of isomorphic subgraphs, and construct a quantum circuit based on the fixed cost and the exchange cost; the fixed cost is determined based on the quantum logic gate corresponding to the isomorphic subgraph, and the exchange cost is determined based on SWAP gates required for conversion between quantum logic gates corresponding to the isomorphic subgraphs.

In a seventh aspect, some embodiments of the present disclosure provide an electronic device, including a processor, a memory, a communication interface, and one or more programs, the one or more programs are stored in the memory and configured to be executed by the processor, and the programs include instructions for performing steps in the method in the first aspect or the second aspect or the third aspect of some embodiments of the present disclosure.

In an eighth aspect, some embodiments of the present disclosure provide a computer-readable storage medium, the computer-readable storage medium stores a computer program for electronic data interchange, the computer program causes a computer to perform some or all steps as described in the method in the first aspect or the second aspect or the third aspect of some embodiments of the present disclosure.

In a ninth aspect, some embodiments of the present disclosure provide a computer program product, the computer program product includes a non-transitory computer-readable storage medium storing a computer program, the computer program is operable to cause a computer to perform some or all steps as described in the method as described in the first aspect or the second aspect or the third aspect of some embodiments of the present disclosure. The computer program product may be a software installation package.

In a tenth aspect, some embodiments of the present disclosure provide a quantum computer operating system, the quantum computer operating system implements adaptation to the quantum computing platform according to some or all steps as described in the method in the first aspect or the second aspect or the third aspect of some embodiments of the present disclosure.

As can be seen from the above contents, in some embodiments of the present disclosure, a quantum program and a topological structure of a quantum chip corresponding to a quantum computing platform are acquired first, and the topological structure is configured to represent physical qubits in an electronic device and a connection relationship between the physical qubits. Then, the quantum program is adapted to the quantum computing platform based on the topological structure. Whether a quantum program can run on a quantum chip mainly depends on a topological structure of the chip. Therefore, when the quantum program is adapted based on the topological structure, the quantum program can be adapted to different quantum computing platforms, and a same quantum program may be run on different quantum chips, thereby improving scalability of the quantum program. In addition, workload of the quantum software developer is also reduced, and thus there is no need to develop quantum software with the same function for different quantum chips.

These and other aspects of the present disclosure will be more clearly understood in the following description of embodiments.

BRIEF DESCRIPTION OF DRAWINGS

In order to more clearly illustrate the technical solutions in some embodiments of the present disclosure or the related art, the accompanying drawings used in the description of the embodiments or the related art will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

In order to enable those skilled in the art to better understand the solutions of the present disclosure, the technical solutions in embodiments of the present disclosure will be clearly and completely described below in conjunction with the accompanying drawings in the embodiments of the present disclosure. It is appreciated that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Detailed descriptions are provided below.

In the specification, claims, and the accompanying drawings of the present disclosure, the terms "first", "second", "third", "fourth", and the like are intended to distinguish different objects but do not indicate a particular order. In addition, the terms "include" and "have" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

Mentioning an "embodiment" herein means that a particular characteristic, structure, or feature described with reference to this embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by those skilled in the art that the embodiments described herein may be combined with other embodiment(s).

Some embodiments of the present disclosure first provide a quantum computing platform adaptation method. The method may be applied to electronic devices, such as computer terminals, for example, ordinary computers, quantum computers, and the like.

Figure 1:
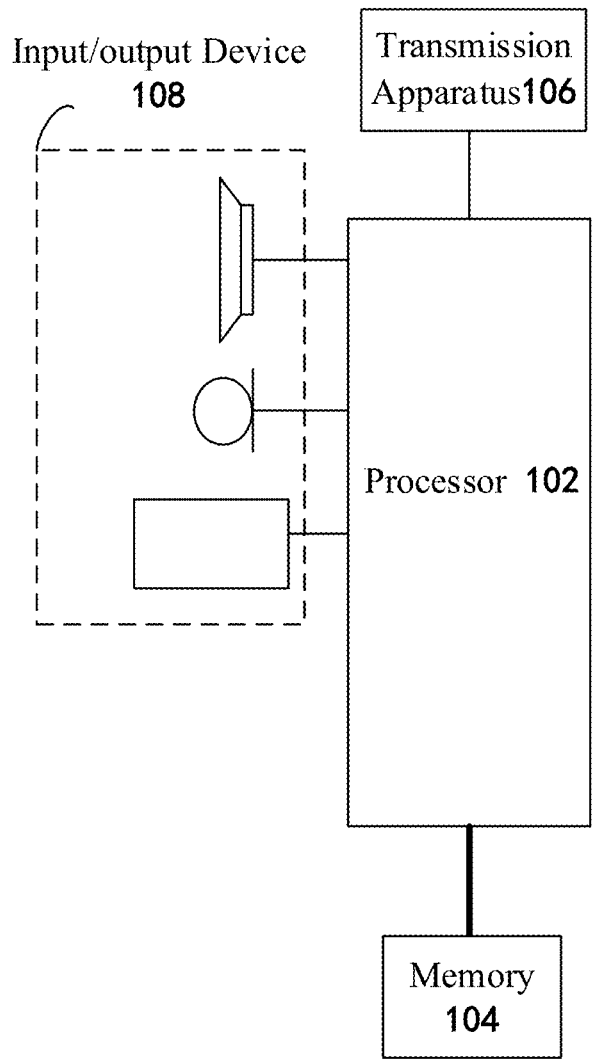
FIG. 1 is a block diagram of a hardware structure of a computer terminal for a quantum computing platform adaptation method according to some embodiments of the present disclosure.

The following is a detailed description based on an example in which the method runs on a computer terminal. FIG. 1 is a block diagram of a hardware structure of a computer terminal for a quantum computing platform adaptation method according to some embodiments of the present disclosure. As shown in FIG. 1, the computer terminal may include one or more (only one is shown in FIG. 1) processors 102 (the processor 102 may include, but is not limited to, a processing apparatus such as a micro processor (e.g., MCU) or a programmable logic device (e.g., FPGA)) and a memory 104 configured to store data based on the quantum computing platform adaptation method. For example, the above computer terminal may also include a transmission apparatus 106 configured for a communication function and an input/output device 108. Those of ordinary skill in the art may understand that the structure shown in FIG. 1 is an example and does not provide any limitation on the structure of the above computer terminal. For example, the computer terminal may also include more or fewer components than those shown in FIG. 1, or have a configuration different from that shown in FIG. 1.

The memory 104 may be configured to store a software program of application software and modules, for example, a program instruction/module corresponding to the quantum computing platform adaptation method in some embodiments of the present disclosure. The processor 102 executes various functional applications and data processing by running the software program and the module stored in the memory 104, i.e., implementing the foregoing method. The memory 104 may include a high-speed random memory, and may also include a nonvolatile memory such as one or more magnetic storage devices, a flash memory, or another nonvolatile solid-state memory. In some examples, the memory 104 may further include memories remotely disposed relative to the processor 102, and these remote memories may be connected to the computer terminal through a network.

Examples of the above network include, but are not limited to, the Internet, an intranet, a local area network, a mobile communications network, and any combinations thereof.

The transmission apparatus 106 is configured to receive or send data via a network. Specific examples of the network may include a wireless network provided by a communications supplier of the computer terminal. In an example, the transmission apparatus 106 includes a network interface controller (NIC) that may be connected to another network device through a base station, thereby communicating with the Internet. In an example, the transmission apparatus 106 may be a radio frequency (RF) module that is configured to communicate with the Internet in a wireless manner.

It is to be noted that a real quantum computer has a hybrid structure that includes two main parts. One part is a classical computer responsible for classical computing and control. The other part is a quantum device responsible for running a quantum program to implement quantum computing. The quantum program is an instruction sequence that is written in a quantum language such as a QRunes language and that can be run on the quantum computer, which supports quantum logic gate operations and ultimately implements quantum computing. For example, the quantum program is a series of instruction sequences through which quantum logic gates are operated in a specific time sequence.

In actual application, limited by the development of hardware of a quantum device, quantum computing simulation is generally required to verify a quantum algorithm, quantum applications, and the like. The quantum computing simulation is a process in which virtual architecture (that is, a quantum virtual machine) built by using resources of a common computer realizes simulation of running a quantum program corresponding to a specific problem. Generally, the quantum program corresponding to the specific problem is required to be constructed. The quantum program in some embodiments of the present disclosure is a program that is written in a classical language and that characterizes qubits and their evolutions. Herein, qubits, quantum logic gates, and the like related to quantum computing are all represented by corresponding classical code.

As an implementation of quantum programs, quantum circuits, also known as quantum logic circuits, are the most commonly used general-purpose quantum computing models, which mean circuits that operate qubits under abstract concepts, and components thereof include qubits, circuits (timelines), and various quantum logic gates. Finally, results are generally required to be read out through quantum measurement operations.

Different from a conventional circuit that is connected through metallic wires to transmit voltage signals or current signals, the quantum circuit may be considered to be connected by time. That is, a state of a qubit evolves naturally with time. This process proceeds according to an instruction of the Hamiltonian operator until the qubit is operated by a logic gate.

A quantum program as a whole corresponds to a total quantum circuit, and the quantum program in the present disclosure refers to the total quantum circuit. The total number of qubits in the total quantum circuit is the same as the total number of qubits in the quantum program. It may be understood that a quantum program may consist of quantum circuits, measurement operations for qubits in quantum circuits, registers for storing measurement results, and control flow nodes (jump instructions). A quantum circuit may include tens, hundreds or even tens of thousands of quantum logic gate operations. An execution process of the quantum program is a process of executing all quantum logic gates according to a certain time sequence. It is to be noted that the "time sequence" refers to a chronological order in which a single-quantum logic gate is executed.

It is to be noted that in classical computing, the most basic unit is a bit, and the most basic control mode is a logic gate. With a combination of logic gates, the purpose of controlling a circuit can be achieved. Similarly, the manner in which the qubits are processed is a quantum logic gate. The use of the quantum logic gate enables the evolution of a quantum state. The quantum logic gate is a base for forming the quantum circuit. The quantum logic gate includes single-bit quantum logic gates such as a Hadamard gate (H gate), a Pauli-X gate (X gate), a Pauli-Y gate (Y gate), a Pauli-Z gate (Z gate), an RX gate, an RY gate, and an RZ gate; and multi-bit quantum logic gates such as a CNOT gate, a CR gate, an iSWAP gate, and a Toffoli gate. The quantum logic gate is generally represented by using a unitary matrix. The unitary matrix is not only a matrix form but also an operation and a transform. Generally, the effect of the quantum logic gate on the quantum state is calculated by left multiplying the unitary matrix by a matrix corresponding to a quantum-state ket.

Figure 2A:
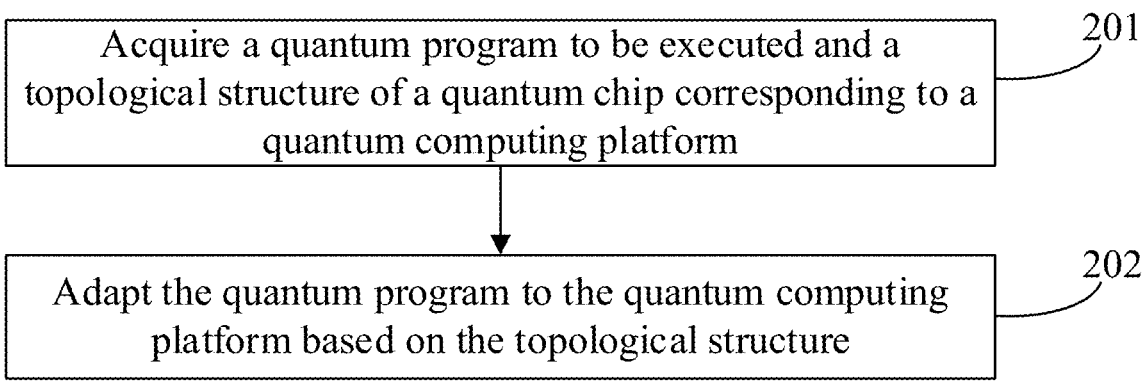
FIG. 2A is a schematic flowchart of a quantum computing platform adaptation method according to some embodiments of the present disclosure.

Referring to FIG. 2A, FIG. 2A is a schematic flowchart of a quantum computing platform adaptation method according to some embodiments of the present disclosure. The method includes the following steps.

In step 201, a quantum program to be executed and a topological structure of a quantum chip corresponding to a quantum computing platform are acquired, the topological structure is configured to represent physical qubits in an electronic device and a connection relationship between the physical qubits.

The quantum computing platform may include quantum computing platforms of different systems, such as quantum computing platforms composed of one or more of a quantum computer, a quantum virtual machine, and a classical computer. The quantum computing platform in some embodiments of the present disclosure is any one of the above quantum computing platforms.

The connection relationship indicates that two quantum logic gates may act on two physical qubits.

In step 202, the quantum program is adapted to the quantum computing platform based on the topological structure.

As can be seen from the above contents, in some embodiments of the present disclosure, a quantum program and a topological structure of a quantum chip corresponding to a quantum computing platform are acquired first, and the topological structure is configured to represent physical qubits in an electronic device and a connection relationship between the physical qubits. Then, the quantum program is adapted to the quantum computing platform based on the topological structure. Whether a quantum program can run on a quantum chip mainly depends on the topological structure of the chip. Therefore, when the quantum program is adapted based on the topological structure, the quantum program can be adapted to different quantum computing platforms, and a same quantum program may be run on different quantum chips, thereby improving scalability of the quantum program. In addition, workload of the quantum software developer is also reduced, and thus there is no need to develop quantum software with the same function for different quantum chips.

In some embodiments of the present disclosure, the adapting the quantum program to the quantum computing platform based on the topological structure includes:

Determining N sets of isomorphic subgraphs corresponding to N maximum subgraphs of the quantum program, the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and Determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs.

In some embodiments of the present disclosure, the determining N sets of isomorphic subgraphs corresponding to N maximum subgraphs of the quantum program includes:

Constructing a first directed acyclic graph of the quantum program;

Traversing the first directed acyclic graph to obtain a maximum subgraph sequence, the maximum subgraph sequence includes N maximum subgraphs, and N is an integer greater than or equal to 1; and Determining isomorphic subgraphs of the N maximum subgraphs in the topological structure to obtain N sets of isomorphic subgraphs, the N sets of isomorphic subgraphs are in one-to-one correspondence to the N maximum subgraphs.

In some other embodiments of the present disclosure, the adapting the quantum program to the quantum computing platform based on the topological structure includes:

Constructing a first directed acyclic graph of the quantum program;

Traversing the first directed acyclic graph to obtain a maximum subgraph sequence, the maximum subgraph sequence includes N maximum subgraphs, and N is an integer greater than or equal to 1;

Determining isomorphic subgraphs of the N maximum subgraphs in the topological structure to obtain N sets of isomorphic subgraphs, the N sets of isomorphic subgraphs are in one-to-one correspondence to the N maximum subgraphs; and Constructing a quantum circuit based on the N sets of isomorphic subgraphs, the quantum circuit is configured to operate on the quantum computing platform.

The N maximum subgraphs are sequentially arranged in an order of obtaining, to obtain the maximum subgraph sequence.

An isomorphic subgraph is a bit relation graph on the quantum chip obtained by mapping a maximum subgraph based on the topological structure of the quantum chip in the electronic device. For example, it is assumed that the maximum subgraph is "q[0]-q[1]", and the topological structure of the quantum chip in the electronic device is linear "Q[0]-Q[1]-Q[2]-Q[3]". Then, "q[0]-q[1]" may be mapped to "Q[0]-Q[1]", or mapped to "Q[1]-Q[2]", or mapped to "Q[2]-Q[3]". Isomorphic subgraphs of the maximum subgraph "q[0]-q[1]" are "Q[0]-Q[1]", "Q[1]-Q[2]", and "Q[2]-Q[3]".

The constructing a quantum circuit based on the N sets of isomorphic subgraphs may include selecting any isomorphic subgraph from each isomorphic subgraph set, and constructing the quantum circuit based on the obtained N isomorphic subgraphs.

As can be seen, in some embodiments of the present disclosure, firstly, a first directed acyclic graph of the quantum program is constructed. Then, the first directed acyclic graph is traversed to obtain a maximum subgraph sequence including N maximum subgraphs. Next, isomorphic subgraphs of the N maximum subgraphs in the topological structure are determined. Finally, a quantum circuit is constructed based on obtained N maximum subgraph sets. In this way, the quantum program is converted into a quantum circuit supported by a current quantum computing platform, which realizes the construction of the quantum circuit.

In some embodiments of the present disclosure, the constructing a first directed acyclic graph of the quantum program includes:

Acquiring quantum logic gates of the quantum program; and

Constructing the first directed acyclic graph based on the quantum logic gates, the first directed acyclic graph includes nodes and directed edges; the nodes include two points and an edge, the two points are configured to represent two logical qubits corresponding to the quantum logic gate, and the edge is configured to represent the quantum logic gate acting on the two logical qubits; and the directed edges are configured to represent dependence of the quantum logic gate based on a quantum state evolution time sequence of logical qubits.

In some embodiments of the present disclosure, the quantum logic gates include multi-quantum logic gates; and the constructing the first directed acyclic graph based on the quantum logic gates includes:

Converting the multi-quantum logic gate into a single-quantum logic gate and a two-quantum logic gate; and Deleting the single-quantum logic gate, and constructing the first directed acyclic graph based on the two-quantum logic gate.

It is to be noted that, if the quantum program includes a single-quantum logic gate, a two-quantum logic gate, and a multi-quantum logic gate, firstly, the multi-quantum logic gate is converted into a single-quantum logic gate and a two-quantum logic gate, then, the single-quantum logic gate obtained after conversion and the single-quantum logic gate existing in the quantum program prior to conversion are deleted, and the first directed acyclic graph is constructed based on the two-quantum logic gate obtained after conversion and the two-quantum logic gate existing in the quantum program prior to conversion.

The existence of the single-quantum logic gate in the first directed acyclic graph does not affect construction of a maximum subgraph. A maximum subgraph obtained through a first directed acyclic graph with a single-quantum logic gate is the same as a maximum subgraph obtained through a first directed acyclic graph without a single-quantum logic gate. Therefore, the single-quantum logic gate is deleted here for simplicity.

In the subsequent construction process of the maximum subgraph sequence, graphic examples will be used to illustrate that the maximum subgraph sequences obtained by the two are the same, which will not be elaborated here.

In some embodiments of the present disclosure, the constructing the first directed acyclic graph based on the quantum logic gates includes:

Constructing, when the quantum logic gates include a plurality of continuous two-quantum logic gates and the plurality of continuous two-quantum logic gates act on two identical logical qubits, the first directed acyclic graph based on any one of the plurality of continuous two-quantum logic gates.

"A plurality of" here means two or more.

For example, if the quantum program includes two CZ(q[0], q[1]) and the two CZ(q[0], q[1]) are adjacent in time sequence, the two CZ(q[0], q[1]) are multiple two-quantum logic gates that are continuous and act on two identical logical qubits. If there are two other quantum logic gates between the two CZ(q[0], q[1]), the two are not multiple two-quantum logic gates that are continuous and act on two identical logical qubits. For the two-quantum logic gates that are continuous and act on two identical logical qubits, the first directed acyclic graph is constructed based on any one thereof, or the first directed acyclic graph is constructed based on multiple thereof. Maximum subgraphs generated by the first directed acyclic graphs constructed by the two are the same. Similarly, for simplicity here, the first directed acyclic graph is constructed based on only one of them.

In some embodiments of the present disclosure, the constructing the first directed acyclic graph based on the quantum logic gates further includes:

Constructing, when the quantum logic gates include a plurality of continuous two-quantum logic gates and the plurality of continuous two-quantum logic gates act on two different logical qubits, the first directed acyclic graph based on the plurality of continuous two-quantum logic gates.

For example, if the quantum program includes two continuous CZs, as long as the two CZs act on a different qubit, the two are multiple continuous two-quantum logic gates acting on two different logical qubits, and there is a need to construct the first directed acyclic graph based on the two.

It is to be further noted that, if the quantum program includes a conjugate transposed quantum circuit, there is a need to convert the conjugate transposed quantum circuit and then construct the first directed acyclic graph based on the converted quantum circuit. If there is a measurement operation in the quantum program, the measurement operation will be processed in a same manner as the single-quantum logic gate. The measurement operation or the single-quantum logic gate is deleted, information of the measurement operation or the single-quantum logic gate is recorded, and then the first directed acyclic graph is constructed based on the two-quantum logic gates.

Further, a specific implementation of constructing the first directed acyclic graph based on the two-quantum logic gates is:

Acquiring information of logical qubits on which the two-quantum logic gates act;

Executing the two-quantum logic gates sequentially based on the information of the logical qubits, and determining a neighboring relationship between a two-quantum logic gate currently executed and a two-quantum logic gate to be executed next;

Constructing nodes corresponding to the two-quantum logic gates, the nodes include two points and an edge, the two points are configured to represent two logical qubits corresponding to the quantum logic gate, and the edge is configured to represent the quantum logic gate acting on the two logical qubits;

Constructing directed edges between the nodes based on the neighboring relationship, the directed edges are configured to represent dependence of the two-quantum logic gates based on a quantum state evolution time sequence of logical qubits; and Obtaining the first directed acyclic graph based on the nodes and the directed edges.

Figure 2B:
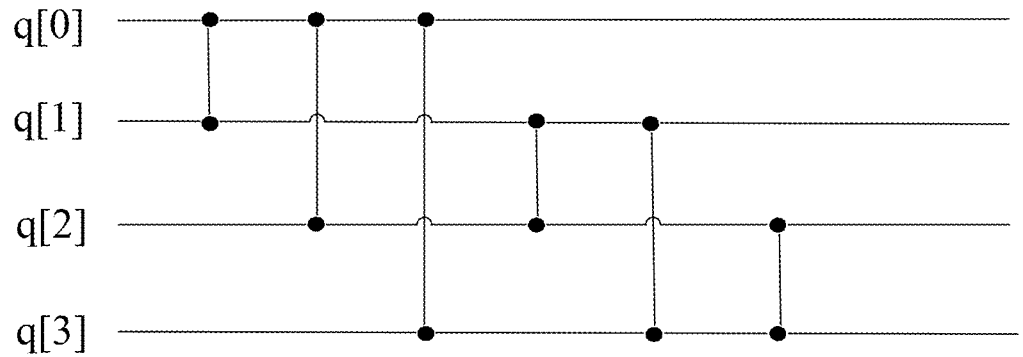
FIG. 2B is a schematic structural diagram of a quantum circuit according to some embodiments of the present disclosure.
Figure 2C:
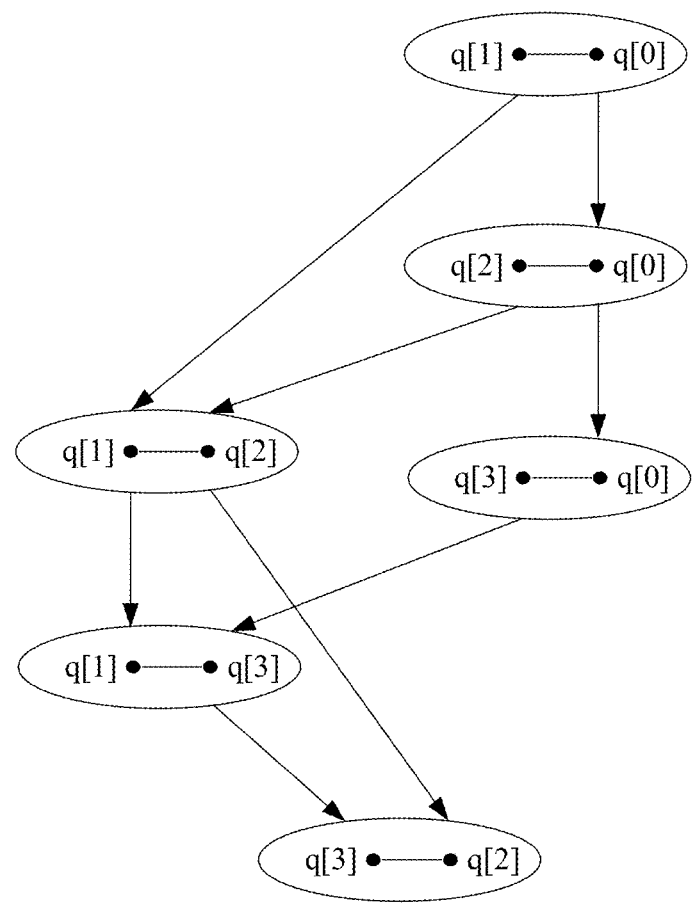
FIG. 2C is a schematic diagram of a first directed acyclic graph corresponding to the quantum circuit shown in FIG. 2B.

For example, it is assumed that the quantum program is CZ(q[0], q[1])<<CZ(q[0], q[2])<<CZ(q[0], q[3])<<CZ(q[1], q[2])<<CZ(q[1], q[3])<<CZ(q[2], q[3]). A quantum circuit corresponding to the quantum program is shown in FIG. 2B. FIG. 2B is a schematic structural diagram of a quantum circuit according to some embodiments of the present disclosure. According to the above embodiments, a first directed acyclic graph of the quantum circuit can be constructed, as shown in FIG. 2C. FIG. 2C is a schematic diagram of a first directed acyclic graph corresponding to the quantum circuit shown in FIG. 2B. The first directed acyclic graph includes 6 nodes and 8 directed edges.

Further, the traversing the first directed acyclic graph to obtain a maximum subgraph sequence includes:

Determining a first node in the first directed acyclic graph, an in-degree of the first node are 0;

Generating a first subgraph based on the first node;

Deleting the first node to obtain a second directed acyclic graph;

Determining whether a second node exists in the second directed acyclic graph, an in-degree of the second node is 0;

Determining the first subgraph as a maximum subgraph when the second node does not exist in the second directed acyclic graph; and Arranging the maximum subgraphs in an order of generation to obtain the maximum subgraph sequence.

The "in-degree" is one of the important concepts in a graph theory algorithm, which generally refers to a sum of the number of times a point in a directed graph is an end point of an edge in the graph.

As can be seen, in some embodiments of the present disclosure, firstly, a first node with an in-degree of 0 in the first directed acyclic graph is determined, and a first subgraph is generated based on the first node. Then, the first node is deleted to obtain a second directed acyclic graph, and it is determined whether a second node with an in-degree of 0 exists in the second directed acyclic graph. The first subgraph is determined as a maximum subgraph when the second node does not exist in the second directed acyclic graph, and the maximum subgraphs are arranged in an order of generation to obtain the maximum subgraph sequence. Some embodiments of the present disclosure provide a method for determining a maximum subgraph sequence, in which the maximum subgraph sequence is determined from the perspective of a graph theory, and the determination of the maximum subgraph sequence is realized when the second node does not exist in the second directed acyclic graph.

Further, the traversing the first directed acyclic graph to obtain a maximum subgraph sequence further includes:

Determining, when the second node exists in the second directed acyclic graph, a priority of the second node, the second node includes two points and an edge, the two points are configured to represent two logical qubits in the quantum program, and the edge is configured to represent the quantum logic gate acting on the two logical qubits; and the priority of the second node is determined based on the two points, the edge, and the first subgraph; and Generating a maximum subgraph based on the second node and the priority of the second node.

For example, as shown in FIG. 2C, a node corresponding to CZ(q[0], q[1]) includes two points and an edge, namely a point corresponding to q[0] and a point corresponding to q[1], and an edge between the point corresponding to q[0] and the point corresponding to q[1]. The point corresponding to q[0] represents a logical qubit q[0], the point corresponding to q[1] represents a logical qubit q[1], and the edge between the point corresponding to q[0] and the point corresponding to q[1] represents a CZ gate acting on the logical qubit q[0] and the logical qubit q[1].

As can be seen, in some embodiments of the present disclosure, a priority of the second node is determined when the second node exists in the second directed acyclic graph, and a maximum subgraph is generated based on the second node and the priority of the second node. Some embodiments of the present disclosure provide a method for determining a maximum subgraph sequence, in which the maximum subgraph sequence is determined from the perspective of a graph theory, and a maximum subgraph is generated based on the second node and the priority of the second node when the second node does not exist in the second directed acyclic graph, thereby realizing the determination of the maximum subgraph sequence.

Further, the generating a maximum subgraph based on the second node and the priority of the second node includes:
Expanding, when the second node has a first priority, the first subgraph into a second subgraph based on the second node, and taking the second subgraph as a new first subgraph;
Deleting the second node to obtain a third directed acyclic graph; and
Taking the third directed acyclic graph as a new second directed acyclic graph, and then performing the step of determining whether a second node exists in the second directed acyclic graph.

Further, a specific implementation of expanding the first subgraph into a second subgraph is: when one of the two points exists and the edge does not exist in the first subgraph, taking the one of the two points as a vertex to draw an edge to obtain the other of the two points, taking a line connecting the two points as the edge, and taking the expanded first subgraph as the second subgraph.

As can be seen, in some embodiments of the present disclosure, when the second node has a first priority, the first subgraph is expanded into a second subgraph based on the second node, and the second subgraph is taken as a new first subgraph. Then, the second node is deleted to obtain a third directed acyclic graph. The third directed acyclic graph is taken as a new second directed acyclic graph, and then the step of determining whether a second node exists in the second directed acyclic graph is performed. Some embodiments of the present disclosure provide a method for determining a maximum subgraph, in which when the second node has a first priority, the first subgraph is expanded until the first subgraph cannot be expanded, and an obtained subgraph is the maximum subgraph, thereby realizing the determination of the maximum subgraph.

Further, the generating a maximum subgraph based on the second node and the priority of the second node further includes:
Taking, when the second node has a second priority, the second node as a new first node, and then performing the step of generating a first subgraph based on the first node, the first priority is prior than the second priority.

Further, prior to the taking the second node as a new first node, the method further includes:
Deleting the second node with the first priority, and determining the new first subgraph as the maximum subgraph.

It is to be noted that, if the second node is included, there are two situations. In one situation, the subgraph may be continuously expanded based on the second node, thereby obtaining a larger subgraph than before. In the other situation, the subgraph cannot be continuously expanded based on the second node, and then the current subgraph is the maximum subgraph. The priority in the first situation is required to be prior than the priority in the second situation. Otherwise, the obtained subgraph is not the maximum subgraph.

As can be seen, in some embodiments of the present disclosure, the second node is taken as a new first node when the second node has a second priority, and then the step of generating a first subgraph based on the first node is performed. Some embodiments of the present disclosure provide a method for determining a maximum subgraph, in which when the second node has a second priority, that is, the first subgraph cannot be expanded and is the maximum subgraph, the obtained first subgraph is determined as the maximum subgraph, then the second node is taken as a new first node, and a search for other maximum subgraphs is restarted, thereby realizing the determination of the maximum subgraph.

Further, the first priority includes a first subpriority and a second subpriority, and the second priority includes a third subpriority and a fourth subpriority; and the determining a priority of the second node includes:
Determining the priority of the second node as the fourth subpriority when the two points and the edge do not exist in the first subgraph;
Determining the priority of the second node as the third subpriority when the two points exist and the edge does not exist in the first subgraph;
Determining the priority of the second node as the second subpriority when one of the two points exists and the edge does not exist in the first subgraph; and
Determining the priority of the second node as the first subpriority if the two points and the edge exist in the first subgraph.

The priorities, from high to low, are sequentially the first subpriority, the second subpriority, the third subpriority, and the fourth subpriority.

It is to be noted that the situation where the maximum subgraph cannot be expanded includes two substitutions. In one substitution, the two points and the edge do not exist in the first subgraph. In the other substitution, the two points exist and the edge does not exist in the first subgraph. If two points and an edge are taken as feature points, the number of feature points included in the former substitution is 0, and the number of feature points included in the latter substitution is 2. If the priority is determined based on the number of feature points, the priority in the former substitution is lower than the priority in the latter substitution. That is, the fourth sub-priority is lower than the third sub-priority.

Similarly, the situation where the maximum subgraph can be expanded includes two substitutions. In one substitution, one of the two points exists and the edge does not exist in the first subgraph. In the other substitution, the two points and the edge exist in the first subgraph. If two points and an edge are taken as feature points, the number of feature points included in the former substitution is 1, and the number of feature points included in the latter substitution is 3. If the priority is determined based on the number of feature points, the priority in the former substitution is lower than the priority in the latter substitution. That is, the second sub-priority is lower than the first sub-priority.

In the above embodiments, a basis for determining the first priority (i.e., the first sub-priority and the second sub-priority) and the second priority (i.e., the third sub-priority and the fourth sub-priority) has been described, that is, the third sub-priority is lower than the second sub-priority, which will not be elaborated here. Therefore, it can be determined that the priorities, from high to low, are sequentially the first subpriority, the second subpriority, the third subpriority, and the fourth subpriority.

As can be seen, in some embodiments of the present disclosure, the priority of the second node is determined as the fourth subpriority when the two points and the edge do not exist in the first subgraph, the priority of the second node is determined as the third subpriority when the two points exist and the edge does not exist in the first subgraph, the priority of the second node is determined as the second subpriority when one of the two points exists and the edge does not exist in the first subgraph, and the priority of the second node is determined as the first subpriority if the two points and the edge exist in the first subgraph; the priorities, from high to low, are sequentially the first subpriority, the second subpriority, the third subpriority, and the fourth subpriority. Some embodiments of the present disclosure provide a method for determining a priority of a second node, in which two points and an edge included in the second node are taken as feature points, and the priority is determined according to the number of the feature points, which realizes determination of the second priority.

The following is a specific application scenario of a method for determining a maximum subgraph sequence provided in some embodiments of the present disclosure.

Figure 2D:
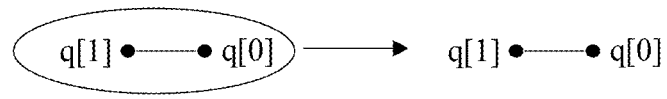
FIG. 2D is a schematic diagram of a first subgraph determined based on a first node in the first directed acyclic graph shown in FIG. 2C.
Figure 2E:
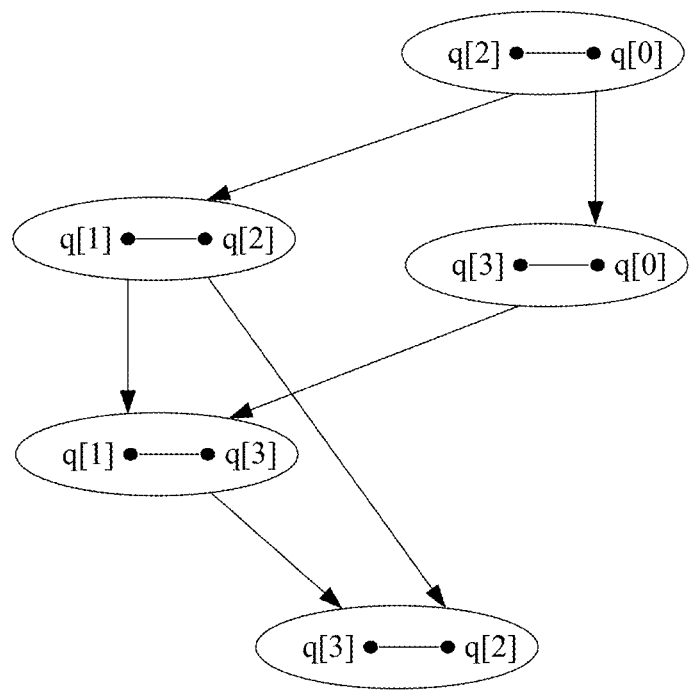
FIG. 2E is a schematic diagram of a second directed acyclic graph obtained after the first node is deleted from FIG. 2C.
Figure 2F:
FIG. 2F is a schematic diagram of a second subgraph obtained by expansion on FIG. 2D based on a second node.
Figure 2G:
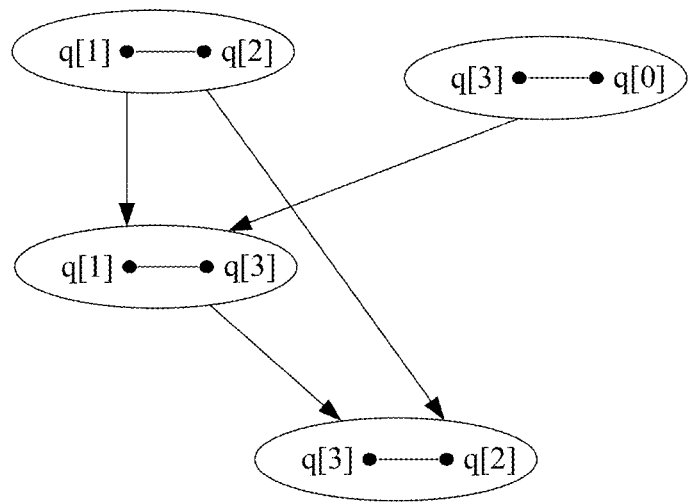
FIG. 2G is a schematic diagram of a third directed acyclic graph obtained after the second node is deleted from FIG. 2E.
Figure 2H:
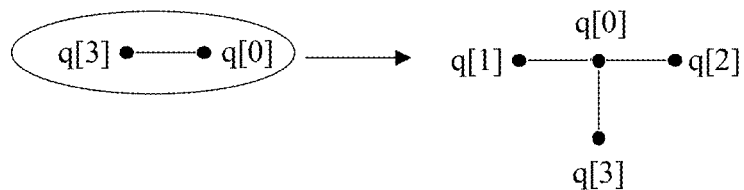
FIG. 2H is a schematic diagram of a second subgraph obtained by expansion on FIG. 2F based on a new second node.

For example, it is assumed that the quantum program is CZ(q[0], q[1])<<CZ(q[0], q[2])<<CZ(q[0], q[3])<<CZ(q[1], q[2])<<CZ(q[1], q[3])<<CZ(q[2], q[3]). A first directed acyclic graph corresponding to the quantum program is shown in FIG. 2C. Steps of determining the maximum subgraph sequence according to the first directed acyclic graph shown in FIG. 2C are as follows. Since an in-degree of a node corresponding to CZ(q[0], q[1]) is 0, firstly, it may be determined that a first node in the first directed acyclic graph is the node corresponding to CZ(q[0], q[1]). Two points included in the first node (a point corresponding to q[0] and a point corresponding to q[1]) are taken as two endpoints in the first subgraph, and an edge included in the first node is taken as an edge in the first subgraph, as shown in FIG. 2D. FIG. 2D is a schematic diagram of a first subgraph determined based on a first node in the first directed acyclic graph shown in FIG. 2C. The first node is deleted to obtain a second directed acyclic graph, as shown in FIG. 2E. FIG. 2E is a schematic diagram of a second directed acyclic graph obtained after the first node is deleted from FIG. 2C. Then, it is determined whether a second node exists in the second directed acyclic graph. An in-degree of a node corresponding to CZ(q[0], q[2]) in the second directed acyclic graph is 0. Therefore, the node corresponding to CZ(q[0], q[2]) is the second node. The second node includes two points, namely a point corresponding to q[0] and a point corresponding to q[2], and an edge between the two points. A priority of the second node is determined as the second subpriority when the point corresponding to q[0] exists in the first subgraph. The point corresponding to q[0] is taken as an edge to expand the first subgraph into a second subgraph, as shown in FIG. 2F. FIG. 2F is a schematic diagram of a second subgraph obtained by expansion on FIG. 2D based on a second node. Then, the above second subgraph is taken as a new first subgraph, and the second node is deleted to obtain a third directed acyclic graph, as shown in FIG. 2G. FIG. 2G is a schematic diagram of a third directed acyclic graph obtained after the second node is deleted from FIG. 2E. The third directed acyclic graph is taken as a new second directed acyclic graph, and then it is determined whether a second node exists in the second directed acyclic graph. Since an in-degree of a node corresponding to CZ(q[0], q[3]) and an in-degree of a node corresponding to CZ(q[1], q[2]) are both 0, 2 second nodes exist here. A priority of the node corresponding to CZ(q[0], q[3]) and a priority of the node corresponding to CZ(q[1], q[2]) are determined. A point in the node corresponding to CZ(q[0], q[3]) is in the new first subgraph, and a priority thereof is the second subpriority. Two points in the node corresponding to CZ(q[1], q[2]) are both in the new first subgraph but an edge between the two points is not in the new first subgraph, so a priority thereof is the fourth subpriority. The second subpriority is prior than the fourth subpriority, and the node corresponding to the second subpriority is first executed. The point corresponding to q[0] is taken as an edge to expand the new first subgraph into a second subgraph, as shown in FIG. 2H. FIG. 2H is a schematic diagram of a second subgraph obtained by expansion on FIG. 2F based on a new second node. The node corresponding to CZ(q[1], q[2]) is then executed. Since the priority corresponding to the node is the fourth subpriority, the new first subgraph obtained above is determined as the maximum subgraph.

Figure 2I:
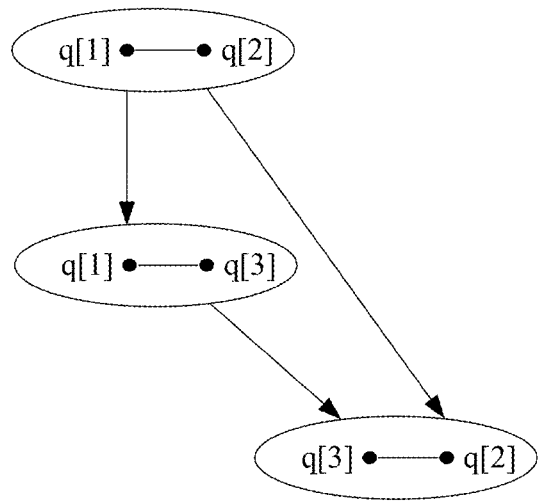
FIG. 2I is a schematic diagram of a new first directed acyclic graph obtained after the new second node is deleted from FIG. 2G.
Figure 2J:
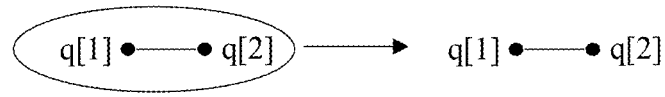
FIG. 2J is a schematic diagram of a first subgraph determined based on a first node in the first directed acyclic graph shown in FIG. 2I.
Figure 2K:
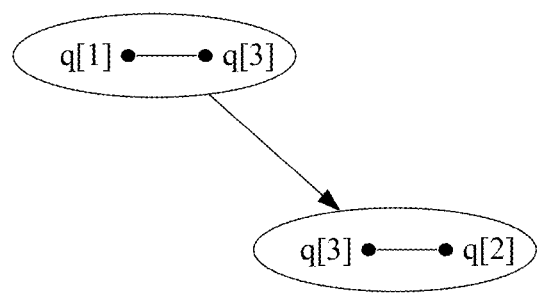
FIG. 2K is a schematic diagram of a second directed acyclic graph obtained after the first node is deleted from FIG. 2J.
Figure 2L:
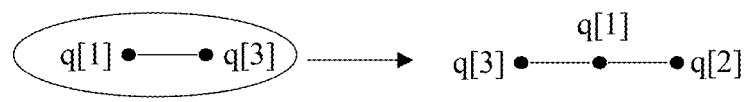
FIG. 2L is a schematic diagram of a second subgraph obtained by expansion on FIG. 2J based on a second node.
Figure 2M:
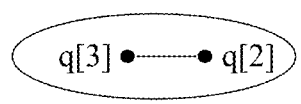
FIG. 2M is a schematic diagram of a third directed acyclic graph obtained after the second node is deleted from FIG. 2K.

The node corresponding to CZ(q[0], q[3]) is deleted to obtain a new first directed acyclic graph, as shown in FIG. 2I. FIG. 2I is a schematic diagram of a new first directed acyclic graph obtained after the new second node is deleted from FIG. 2G. The node corresponding to CZ(q[1], q[2]) is taken as a new first node. Two points included in the first node (a point corresponding to q[1] and a point corresponding to q[2]) are taken as two endpoints in the first subgraph, and an edge included in the first node is taken as an edge in the first subgraph, as shown in FIG. 2J. FIG. 2J is a schematic diagram of a first subgraph determined based on a first node in the first directed acyclic graph shown in FIG. 2I. The node corresponding to the first node CZ(q[1], q[2]) is deleted to obtain a second directed acyclic graph, as shown in FIG. 2K. FIG. 2K is a schematic diagram of a second directed acyclic graph obtained after the first node is deleted from FIG. 2J. Then, it is determined whether a second node exists in the second directed acyclic graph. An in-degree of a node corresponding to CZ(q[1], q[3]) in the second directed acyclic graph is 0. Therefore, the node corresponding to CZ(q[1], q[3]) is the second node. The second node includes 2 points, namely a point corresponding to q[1] and a point corresponding to q[3], and an edge between the two points. A priority of the second node is determined as the second subpriority when the point corresponding to q[1] exists in the first subgraph. The point corresponding to q[1] is taken as an edge to expand the first subgraph into a second subgraph, as shown in FIG. 2L. FIG. 2L is a schematic diagram of a second subgraph obtained by expansion on FIG. 2J based on a second node. Then, the above second subgraph is taken as a new first subgraph, and the node corresponding to the second node CZ(q[1], q[3]) is deleted to obtain a third directed acyclic graph, as shown in FIG. 2M. FIG. 2M is a schematic diagram of a third directed acyclic graph obtained after the second node is deleted from FIG. 2K. The third directed acyclic graph is taken as a new second directed acyclic graph, and then it is determined whether a second node exists in the second directed acyclic graph. Since an in-degree of a node corresponding to CZ(q[2], q[3]) is 0, the node corresponding to CZ(q[2], q[3]) is the second node. Two points in the node corresponding to CZ(q[2], q[3]) are both in the new first subgraph but an edge between the two points is not in the new first subgraph, so a priority thereof is the fourth subpriority. The new first subgraph obtained above is determined as the maximum subgraph.

Figure 2N:
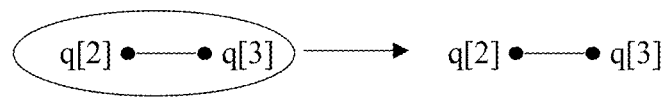
FIG. 2N is a schematic diagram of a first subgraph determined based on a first node in the third directed acyclic graph shown in FIG. 2M.

The node corresponding to CZ(q[2], q[3]) is taken as a new first node. Two points included in the first node (a point corresponding to q[2] and a point corresponding to q[3]) are taken as two endpoints in the first subgraph, and an edge included in the first node is taken as an edge in the first subgraph, as shown in FIG. 2N. FIG. 2N is a schematic diagram of a first subgraph determined based on a first node in the third directed acyclic graph shown in FIG. 2M. The node corresponding to CZ(q[2], q[3]) is deleted, the second directed acyclic graph obtained is empty, no second node exists in the second directed acyclic graph, and the first subgraph is determined as the maximum subgraph.

Based on the above, three maximum subgraphs can be obtained, namely a maximum subgraph composed of CZ(q[0], q[1])<<CZ(q[0], q[2])<<CZ(q[0], q[3]) (as shown in FIG. 2H); a maximum subgraph composed of CZ(q[1], q[2])<<CZ(q[1], q[3]) (as shown in FIG. 2L); and a maximum subgraph composed of CZ(q[2], q[3]) (as shown in FIG. 2N). The three maximum subgraphs are sequentially arranged in an order of obtaining, to obtain a maximum subgraph sequence.

Figure 2O:
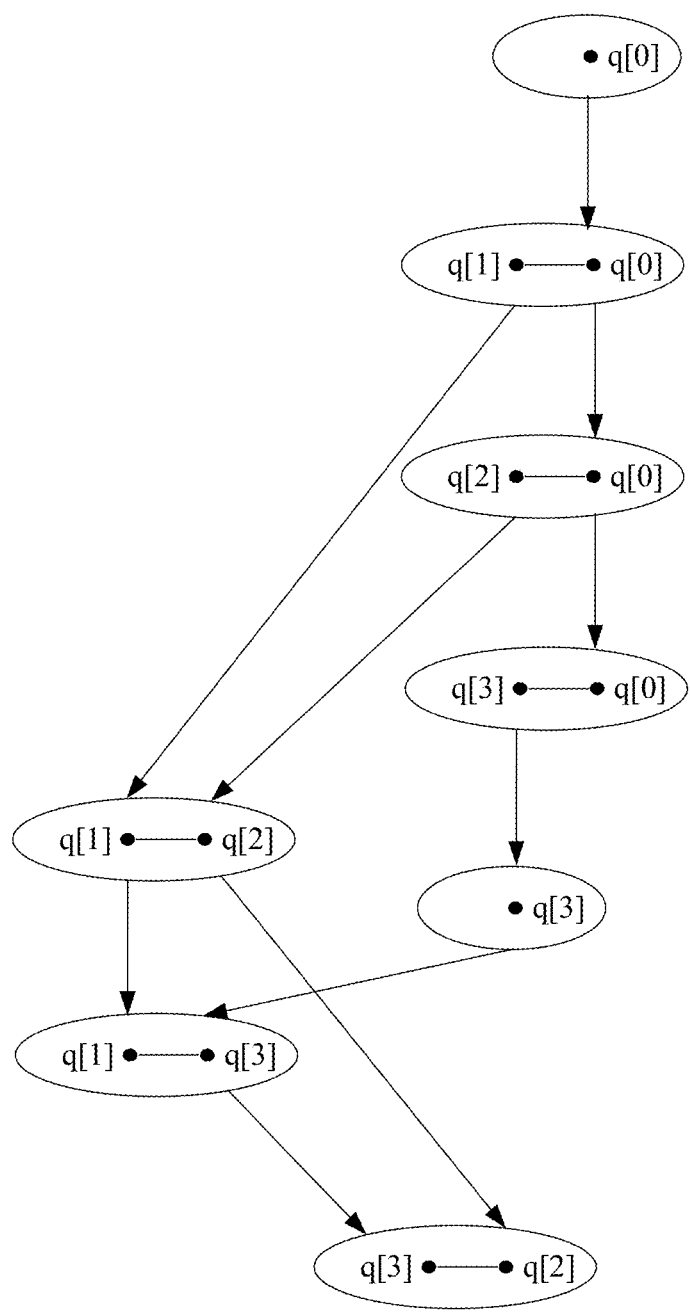
FIG. 2O is a schematic diagram of a first directed acyclic graph including a single-quantum logic gate according to some embodiments of the present disclosure.
Figure 2P:
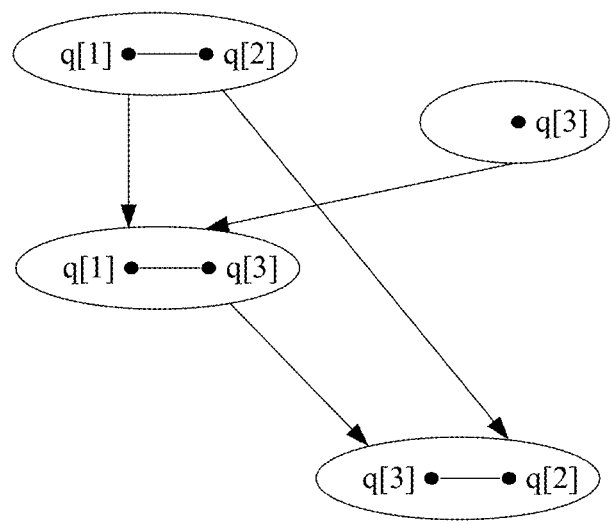
FIG. 2P is a schematic diagram of a new first directed acyclic graph obtained based on FIG. 2O.

It is to be noted that, if a single-quantum logic gate exists in the quantum program, a maximum subgraph sequence thereof is the same as the maximum subgraph sequence obtained in the above embodiments. It is assumed that the quantum program is H(q[0])<<CZ(q[0], q[1])<<CZ(q[0], q[2])<<H(q[3])<<CZ(q[0], q[3])<<CZ(q[1], q[2])<<CZ(q[1], q[3])<<CZ(q[2], q[3]). As shown in FIG. 2O, FIG. 2O is a schematic diagram of a first directed acyclic graph including a single-quantum logic gate according to some embodiments of the present disclosure. A node corresponding to H[0] includes only one point (a point corresponding to q[0]), so the first subgraph obtained is a point. Expansion is performed on the point, and the node corresponding to CZ(q[0], q[1]) is executed. The above first subgraph can be expanded into FIG. 2D. Subsequent steps are the same and the $0^{th}$ maximum subgraph can be obtained (FIG. 2H). The node corresponding to CZ(q[0], q[3]) is deleted to obtain a new first directed acyclic graph, as shown in FIG. 2P. FIG. 2P is a schematic diagram of a new first directed acyclic graph obtained based on FIG. 2O. In the first directed acyclic graph, in-degrees of a node corresponding to CZ(q[1], q[2]) and a node corresponding to H(q[3]) are both 0, and the two nodes are the beginning of the construction of the new first subgraph. The first subgraph does not include points or edges included by the two nodes, so the two nodes have a same priority. Firstly, the first subgraph is constructed either based on the node corresponding to CZ(q[1], q[2]) or based on the node corresponding to H(q[3]), and points included in the node corresponding to H(q[3]) may all be incorporated into the $1^{st}$ maximum subgraph (FIG. 2L). Subsequent steps are the same, and the $2^{nd}$ maximum subgraph (FIG. 2N) can be obtained (FIG. 2N).

For example, the constructing the quantum circuit based on the N sets of isomorphic subgraphs includes:

Determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs.

For example, it is assumed that the quantum program is CZ(q[0], q[1])<<CZ(q[0], q[2])<<CZ(q[0], q[3])<<CZ(q[1], q[2])<<CZ(q[1], q[3])<<CZ(q[2], q[3]). Three maximum subgraphs can be obtained, namely a maximum subgraph composed of CZ(q[0], q[1])<<CZ(q[0], q[2])<<CZ(q[0], q[3]) (as shown in FIG. 2H); a maximum subgraph composed of CZ(q[1], q[2])<<CZ(q[1], q[3]) (as shown in FIG. 2L); and a maximum subgraph composed of CZ(q[2], q[3]) (as shown in FIG. 2N).

Figure 2Q:
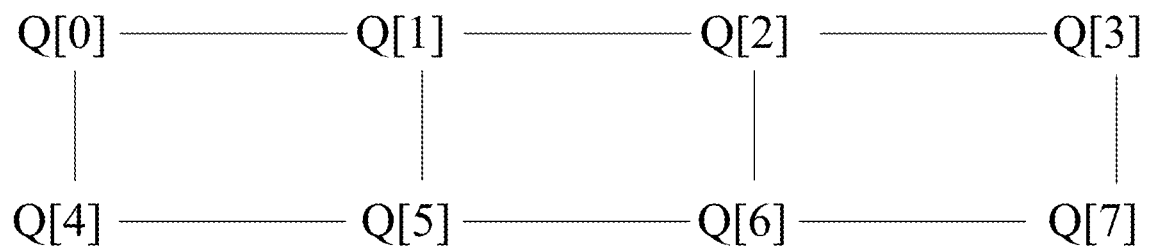
FIG. 2Q is a diagram of a topological structure of physical qubits in an electronic device according to some embodiments of the present disclosure.

As shown in FIG. 2Q, FIG. 2Q is a diagram of a topological structure of physical qubits in an electronic device according to some embodiments of the present disclosure. The electronic device includes 8 physical qubits, namely Q[0], Q[1], Q[2], Q[3], Q[4], Q[5], Q[6], and Q[7]. Q[0] is connected to Q[1] and Q[4], Q[5] is connected to Q[1], Q[4] and Q[6], Q[2] is connected to Q[1], Q[6] and Q[3] are connected, and Q[7] is connected to Q[3] and Q[6].

Figure 2R:
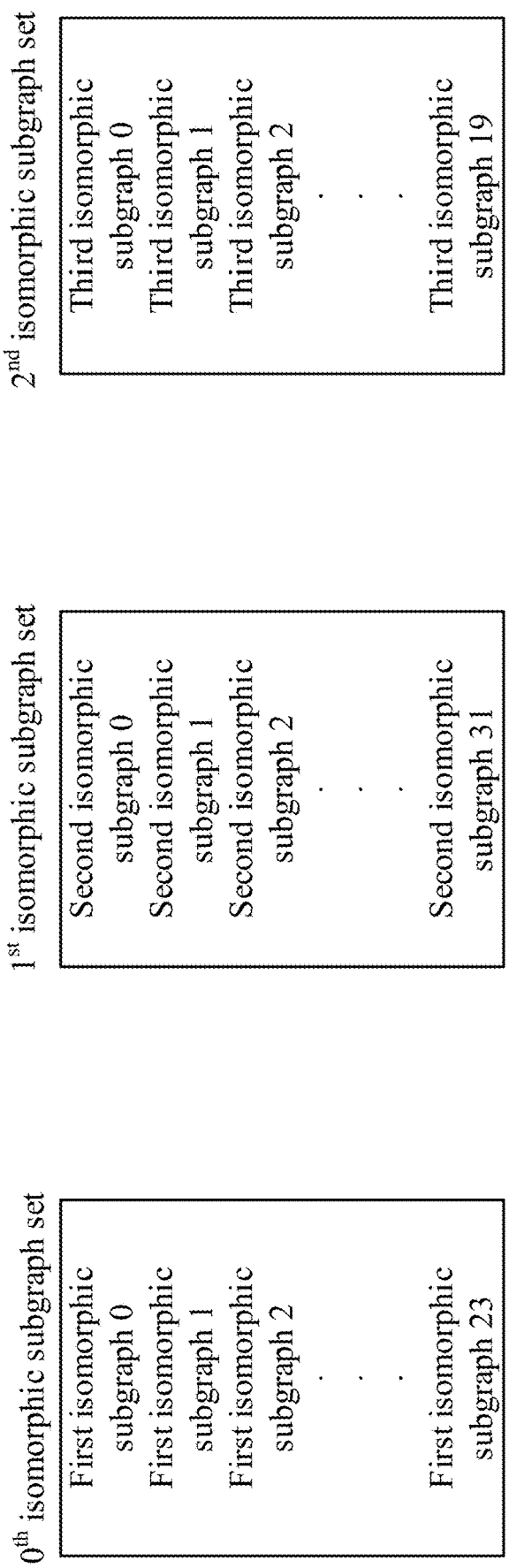
FIG. 2R is a schematic diagram of isomorphic subgraphs according to some embodiments of the present disclosure.

24 first isomorphic subgraphs may be obtained by mapping the $0^{th}$ maximum subgraph (FIG. 2H) in FIG. 2Q, and the 24 first isomorphic subgraphs constitute a $0^{th}$ isomorphic subgraph set. 32 second isomorphic subgraphs may be obtained by mapping the $1^{st}$ maximum subgraph (FIG. 2L) in FIG. 2Q, and the 32 second isomorphic subgraphs constitute a $1^{st}$ isomorphic subgraph set. 20 third isomorphic subgraphs may be obtained by mapping the $2^{nd}$ maximum subgraph (FIG. 2L) in FIG. 2Q, and the 20 third isomorphic subgraphs constitute a $2^{nd}$ isomorphic subgraph set. As shown in FIG. 2R, FIG. 2R is a schematic diagram of isomorphic subgraphs according to some embodiments of the present disclosure. Specific forms of each first isomorphic subgraph, each second isomorphic subgraph, and each third isomorphic subgraph will not be listed one by one in detail here.

A first fixed cost set, a second fixed cost set, and a third fixed cost set may be obtained by determining a fixed cost of each isomorphic subgraph in the above 3 isomorphic subgraph sets. The first fixed cost set includes 24 first fixed costs, the second fixed cost set includes 32 second fixed costs, and the third fixed cost set includes 20 third fixed costs. By determining an exchange cost between any two isomorphic subgraphs in any adjacent ones of the above 3 isomorphic subgraph sets, 24×32 first exchange costs between any two isomorphic subgraphs in the $0^{th}$ isomorphic subgraph set and the $1^{st}$ isomorphic subgraph set may be obtained, and 32×20 second exchange costs between any two isomorphic subgraphs in the $1^{st}$ isomorphic subgraph set and the $2^{nd}$ isomorphic subgraph set may be obtained. A quantum circuit is constructed based on the 24 first fixed costs, the 32 second fixed costs, the 20 third fixed costs, the 24×32 first exchange costs, and the 32×20 second exchange costs.

As can be seen, in some embodiments of the present disclosure, firstly, a fixed cost of each isomorphic subgraph in the N sets of isomorphic subgraphs and an exchange cost between any two isomorphic subgraphs in any adjacent sets of isomorphic subgraphs are determined, and a quantum circuit is constructed based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs. Some embodiments of the present disclosure provide a quantum circuit construction method, in which a quantum circuit is constructed through fixed costs of isomorphic subgraphs and exchange costs between the isomorphic subgraphs, so as to realize the construction of the quantum circuit.

Further, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes:

Determining the fixed cost of each isomorphic subgraph in the N sets of isomorphic subgraphs to obtain N fixed cost sets, the N fixed cost sets are in one-to-one correspondence to the N sets of isomorphic subgraphs;

Determining the exchange cost between any two isomorphic subgraphs in any adjacent sets of isomorphic subgraphs in the N sets of isomorphic subgraphs to obtain N−1 exchange cost sets, each of the exchange cost sets includes $k_i \cdot k_{i+1}$ exchange costs;

Determining $$\prod_{i=0}^{i=N-1} k_i$$

consumption costs based on the N fixed cost sets and the N−1 exchange cost sets; and Constructing the quantum circuit based on the $$\prod_{i=0}^{i=N-1} k_i$$

consumption costs.

For example, as shown in FIG. 2Q, the $0^{th}$ isomorphic subgraph set includes 24 first isomorphic subgraphs, each first isomorphic subgraph corresponds to a fixed cost, and the first fixed cost set includes 24 first fixed costs. The $1^{st}$ isomorphic subgraph set includes 32 second isomorphic subgraphs, each second isomorphic subgraph corresponds to a fixed cost, and the second fixed cost set includes 32 second fixed costs. The $2^{nd}$ isomorphic subgraph set includes 20 third isomorphic subgraphs, each third isomorphic subgraph corresponds to a fixed cost, and the third fixed cost set includes 20 third fixed costs. 24×32 first exchange costs exist between the $0^{th}$ isomorphic subgraph set and the $1^{st}$ isomorphic subgraph, and 32×20 first exchange costs exist between the $1^{st}$ isomorphic subgraph set and the $2^{nd}$ isomorphic subgraph.

As shown in FIG. 2Q, $$24 \times 32 \times 20 \left( \prod_{i=0}^{i=2} k_i = k_0 \cdot k_1 \cdot k_2 \right)$$

quantum circuits may be constructed based on the $0^{th}$ isomorphic subgraph set, the $1^{st}$ isomorphic subgraph set, and the $2^{nd}$ isomorphic subgraph set, each quantum circuit corresponds to a consumption cost, and each consumption cost is determined based on a first fixed cost, a second fixed cost, a third fixed cost, a first exchange cost, and a second exchange cost. The one with the minimum consumption cost may be selected to construct the quantum circuit.

As can be seen, in some embodiments of the present disclosure, the fixed cost of each isomorphic subgraph in the N sets of isomorphic subgraphs is determined to obtain N fixed cost sets, the N fixed cost sets are in one-to-one correspondence to the N sets of isomorphic subgraphs. The exchange cost between any two isomorphic subgraphs in any adjacent sets of isomorphic subgraphs in the N sets of isomorphic subgraphs are determined to obtain N−1 exchange cost sets, each of the exchange cost sets includes $k_i \cdot k_{i+1}$ exchange costs.

$$\prod_{i=0}^{i=N-1} k_i$$

consumption costs are determined based on the N fixed cost sets and the N−1 exchange cost sets. The quantum circuit is constructed based on the $$\prod_{i=0}^{i=N-1} k_i$$

consumption costs. Some embodiments of the present disclosure provide a quantum circuit construction method, in which consumption costs of all quantum circuits are calculated, and then the quantum circuit with the minimum consumption cost is selected for construction. In some embodiments of the present disclosure, the quantum circuit constructed has the lowest consumption cost and the highest fidelity, so the quality of the obtained quantum circuit is also the best.

With the quantum circuit construction method provided in the above embodiments of the present disclosure, the quantum circuit with the minimum consumption cost can be found. However, amounts of calculation and storage thereof are very huge. Therefore, the present disclosure provides another quantum circuit construction method. Please refer to the following embodiments for details.

Further, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes:

Determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determining exchange costs of all the second isomorphic subgraphs in the second sets of isomorphic subgraphs and each first isomorphic subgraph in the first set of isomorphic subgraphs to obtain $k_0$ exchange cost sets, each of the exchange cost sets includes $k_i$ exchange costs;

Determining $k_0$ consumption cost sets based on the first fixed cost set, the second fixed cost set, and the $k_0$ exchange cost sets, each of the consumption cost sets includes $k_i$ consumption costs;

Determining a minimum consumption cost in each of the consumption cost sets to obtain $k_0$ minimum consumption costs, the $k_0$ minimum consumption costs are in one-to-one correspondence to $k_0$ first isomorphic subgraphs in the first set of isomorphic subgraphs;

Constituting each first isomorphic subgraph in the $k_0$ first isomorphic subgraphs and the second isomorphic subgraph corresponding thereto into a new first isomorphic subgraph, to obtain $k_0$ new first isomorphic subgraphs;

Determining the $k_0$ new first isomorphic subgraphs as anew first set of isomorphic subgraphs;

Setting i=i+1, and performing the step of determining a first fixed cost of each first isomorphic subgraph in a first isomorphic subgraph set to obtain a first fixed cost set, an initial value of i is 1; and Constructing, when i=N−1, the quantum circuit based on the obtained $k_0$ minimum consumption costs.

Further, a first fixed cost of a new first isomorphic subgraph is determined based on the first fixed cost of the previous first isomorphic subgraph corresponding thereto, the second fixed cost of the previous second isomorphic subgraph, and an exchange cost between the previous first isomorphic subgraph and the previous second isomorphic subgraph.

Figure 2S:
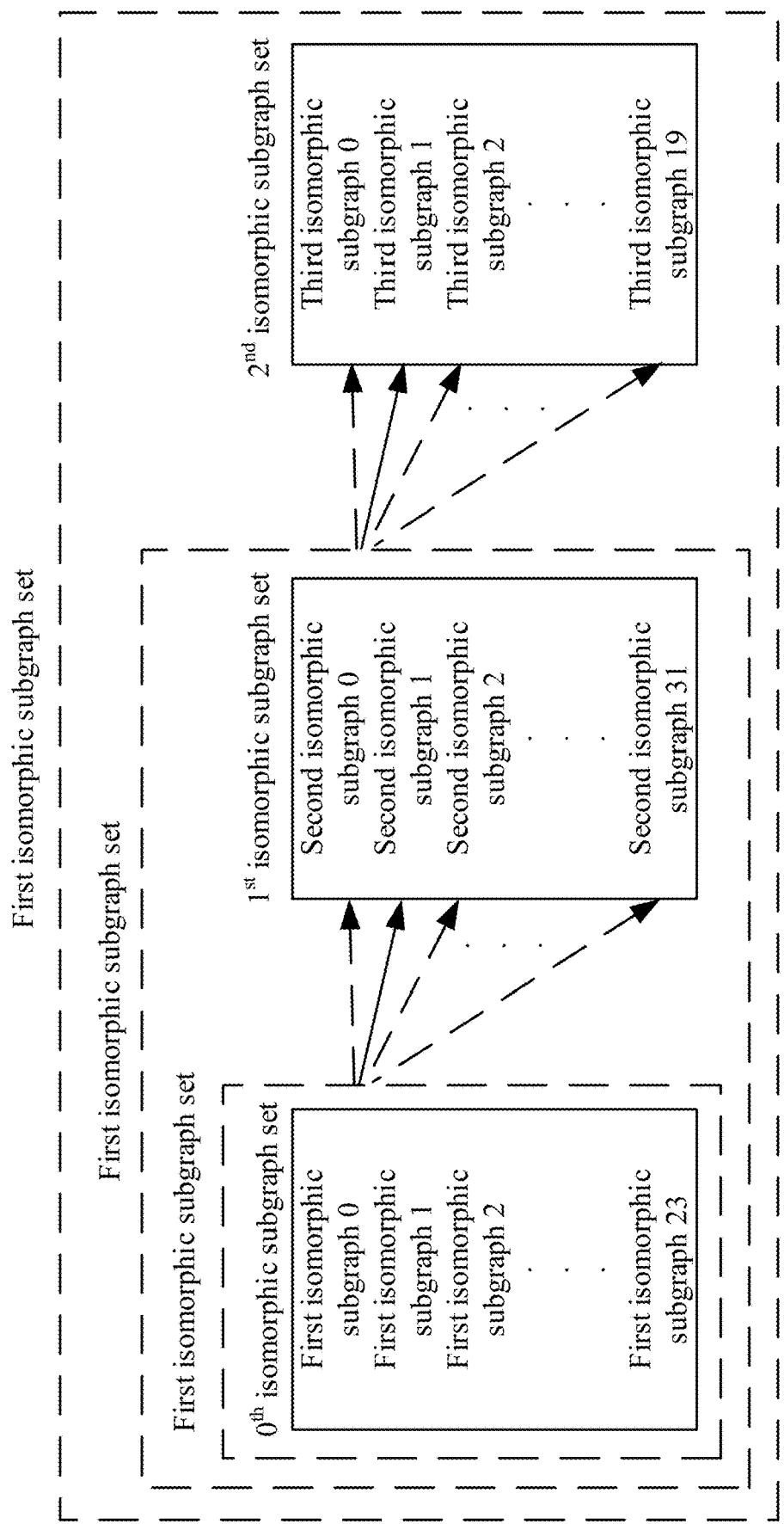
FIG. 2S is a schematic diagram of mutual matching between isomorphic subgraphs according to some embodiments of the present disclosure.

For example, as shown in FIG. 2S, FIG. 2S is a schematic diagram of mutual matching between isomorphic subgraphs according to some embodiments of the present disclosure. A first fixed cost of each first isomorphic subgraph in the $0^{th}$ isomorphic subgraph set is determined to obtain a first fixed cost set. The first fixed cost set includes 24 first fixed costs, which are a first fixed cost 0, a first fixed cost 1, . . . , and a first fixed cost 23 respectively. A second fixed cost of each second isomorphic subgraph in the $1^{st}$ isomorphic subgraph set is determined to obtain a second fixed cost set. The second fixed cost set includes 32 second fixed costs, which are a second fixed cost 0, a second fixed cost 1, . . . , and a second fixed cost 31 respectively.

An exchange cost set 0 may be obtained by determining exchange costs between a second isomorphic subgraph 0, a second isomorphic subgraph 1, . . . , a second isomorphic subgraph 31 and a first isomorphic subgraph 0, the exchange cost set 0 includes an exchange cost 00, an exchange cost 10, an exchange cost 20, . . . , and an exchange cost 310, an exchange cost set 1 may be obtained by determining exchange costs between the second isomorphic subgraph 0, the second isomorphic subgraph 1, . . . , the second isomorphic subgraph 31 and a first isomorphic subgraph 1, the exchange cost set 1 includes an exchange cost 01, an exchange cost 11, an exchange cost 21, . . . , and an exchange cost 311, . . . , until an exchange cost set 23 is obtained by determining exchange costs between the second isomorphic subgraph 0, the second isomorphic subgraph 1, . . . , the second isomorphic subgraph 31 and a first isomorphic subgraph 23, the exchange cost set 23 includes an exchange cost 023, an exchange cost 123, an exchange cost 223, . . . , and an exchange cost 3123.

A consumption cost 00 of the first isomorphic subgraph 0 and the second isomorphic subgraph 0 is determined based on the exchange cost 00, the first fixed cost 0, and the second fixed cost 0, a consumption cost 10 of the first isomorphic subgraph 0 and the second isomorphic subgraph 1 is determined based on the exchange cost 10, the first fixed cost 0, and the second fixed cost 1, . . . , and a consumption cost 310 of the first isomorphic subgraph 0 and the second isomorphic subgraph 31 is determined based on the exchange cost 310, the first fixed cost 0, and the second fixed cost 31. The consumption cost 00, the consumption cost 10, . . . and the consumption cost 310 constitute a consumption cost set 0.

A consumption cost 01 of the first isomorphic subgraph 1 and the second isomorphic subgraph 0 is determined based on the exchange cost 01, the first fixed cost 1, and the second fixed cost 0, a consumption cost 11 of the first isomorphic subgraph 1 and the second isomorphic subgraph 1 is determined based on the exchange cost 11, the first fixed cost 1, and the second fixed cost 1, . . . , and a consumption cost 311 of the first isomorphic subgraph 1 and the second isomorphic subgraph 31 is determined based on the exchange cost 311, the first fixed cost 1, and the second fixed cost 31. The consumption cost 01, the consumption cost 11, . . . , and the consumption cost 311 constitute a consumption cost set 1.

A consumption cost 023 of the first isomorphic subgraph 23 and the second isomorphic subgraph 0 is determined based on the exchange cost 023, the first fixed cost 23, and the second fixed cost 0, a consumption cost 123 of the first isomorphic subgraph 23 and the second isomorphic subgraph 1 is determined based on the exchange cost 123, the first fixed cost 23, and the second fixed cost 1, . . . , and a consumption cost 3123 of the first isomorphic subgraph 23 and the second isomorphic subgraph 31 is determined based on the exchange cost 3123, the first fixed cost 23, and the second fixed cost 31. The consumption cost 023, the consumption cost 123, . . . , and the consumption cost 3123 constitute a consumption cost set 23.

A minimum consumption cost in the consumption cost set 0 is determined, a minimum consumption cost in the consumption cost set 1 is determined, . . . , and a minimum consumption cost in the consumption cost set 23 is determined, to obtain 24 minimum consumption costs.

The first isomorphic subgraph 0 and the second isomorphic subgraph corresponding thereto form a new first isomorphic subgraph 0, the first isomorphic subgraph 1 and the second isomorphic subgraph corresponding thereto form a new first isomorphic subgraph 1, . . . , and a first isomorphic subgraph 23 and the second isomorphic subgraph corresponding thereto form a new first isomorphic subgraph 23. The new first isomorphic subgraph 0, the new first isomorphic subgraph 1, . . . , and the new first isomorphic subgraph 23 constitute a new first isomorphic subgraph set.

A first fixed cost of each first isomorphic subgraph in the new isomorphic subgraph set is determined to obtain a first fixed cost set. The first fixed cost set includes 24 first fixed costs, which are a first fixed cost 0', a first fixed cost 1', . . . , and a first fixed cost 23' respectively. A second fixed cost of each second isomorphic subgraph (here, the third isomorphic subgraph is a new second isomorphic subgraph) in the $2^{nd}$ isomorphic subgraph set is determined to obtain a second fixed cost set. The second fixed cost set includes 32 second fixed costs, which are a second fixed cost 0', a second fixed cost 1', . . . , and a second fixed cost 31' respectively.

An exchange cost set 0' may be obtained by determining exchange costs between a second isomorphic subgraph 0', a second isomorphic subgraph 1', . . . , a second isomorphic subgraph 31' and a first isomorphic subgraph 0', the exchange cost set 0' includes an exchange cost 00', an exchange cost 10', an exchange cost 20', . . . , and an exchange cost 310', an exchange cost set 1' may be obtained by determining exchange costs between the second isomorphic subgraph 0', the second isomorphic subgraph 1', . . . , the second isomorphic subgraph 31' and a first isomorphic subgraph 1', the exchange cost set 1' includes an exchange cost 01', an exchange cost 11', an exchange cost 21', . . . , and an exchange cost 311', . . . , until an exchange cost set 23' is obtained by determining exchange costs between the second isomorphic subgraph 0', the second isomorphic subgraph 1', . . . , the second isomorphic subgraph 31' and a first isomorphic subgraph 23', the exchange cost set 23' includes an exchange cost 023', an exchange cost 123', an exchange cost 223', . . . , and an exchange cost 3123'.

A consumption cost 00' of the first isomorphic subgraph 0' and the second isomorphic subgraph 0' is determined based on the exchange cost 00', the first fixed cost 0', and the second fixed cost 0', a consumption cost 10' of the first isomorphic subgraph 0' and the second isomorphic subgraph 1' is determined based on the exchange cost 10', the first fixed cost 0', and the second fixed cost 1', . . . , and a consumption cost 310' of the first isomorphic subgraph 0' and the second isomorphic subgraph 31' is determined based on the exchange cost 310', the first fixed cost 0', and the second fixed cost 31'. The consumption cost 00', the consumption cost 10', . . . , and the consumption cost 310' constitute a consumption cost set 0'.

A consumption cost 01' of the first isomorphic subgraph 1' and the second isomorphic subgraph 0' is determined based on the exchange cost 01', the first fixed cost 1', and the second fixed cost 0', a consumption cost 11' of the first isomorphic subgraph 1' and the second isomorphic subgraph 1' is determined based on the exchange cost 11', the first fixed cost 1', and the second fixed cost 1', . . . , and a consumption cost 311' of the first isomorphic subgraph 1' and the second isomorphic subgraph 31' is determined based on the exchange cost 311', the first fixed cost 1', and the second fixed cost 31'. The consumption cost 01', the consumption cost 11', . . . , and the consumption cost 311' constitute a consumption cost set 1'.

A consumption cost 023' of the first isomorphic subgraph 23' and the second isomorphic subgraph 0' is determined based on the exchange cost 023', the first fixed cost 23', and the second fixed cost 0', a consumption cost 123' of the first isomorphic subgraph 23' and the second isomorphic subgraph 1' is determined based on the exchange cost 123', the first fixed cost 23', and the second fixed cost 1', . . . , and a consumption cost 3123' of the first isomorphic subgraph 23' and the second isomorphic subgraph 31' is determined based on the exchange cost 3123', the first fixed cost 23', and the second fixed cost 31'. The consumption cost 023', the consumption cost 123', . . . , and the consumption cost 3123' constitute a consumption cost set 23'.

A minimum consumption cost in the consumption cost set 0' is determined, a minimum consumption cost in the consumption cost set 1' is determined, . . . , and a minimum consumption cost in the consumption cost set 23' is determined, to obtain 24 minimum consumption costs. 24 quantum circuits corresponding to the 24 minimum consumption costs are determined. A quantum circuit 0 is composed of the first isomorphic subgraph 0, the second isomorphic subgraph corresponding thereto, and the third isomorphic subgraph corresponding thereto, a quantum circuit 1 is composed of the first isomorphic subgraph 1, the second isomorphic subgraph corresponding thereto, and the third isomorphic subgraph corresponding thereto, . . . , and a quantum circuit 23 is composed of the first isomorphic subgraph 23, the second isomorphic subgraph corresponding thereto, and the third isomorphic subgraph corresponding thereto. The quantum circuit with the minimum consumption cost is selected therefrom.

As can be seen, in some embodiments of the present disclosure, a first fixed cost of each first isomorphic subgraph in a first set of isomorphic subgraphs is determined to obtain a first fixed cost set, the first set of isomorphic subgraphs is an isomorphic subgraph set corresponding to the $0^{th}$ maximum subgraph; a second fixed cost of each second isomorphic subgraph in a second set of isomorphic subgraphs is determined to obtain a second fixed cost set, the second set of isomorphic subgraphs is an isomorphic subgraph set corresponding to the $i^{th}$ maximum subgraph; exchange costs of all the second isomorphic subgraphs in the second sets of isomorphic subgraphs and each first isomorphic subgraph in the first set of isomorphic subgraphs are determined to obtain $k_0$ exchange cost sets, each of the exchange cost sets includes $k_i$ exchange costs; $k_0$ consumption cost sets are determined based on the first fixed cost set, the second fixed cost set, and the $k_0$ exchange cost sets, each of the consumption cost sets includes $k_i$ consumption costs; a minimum consumption cost in each of the consumption cost sets is determined to obtain $k_0$ minimum consumption costs, the $k_0$ minimum consumption costs are in one-to-one correspondence to $k_0$ first isomorphic subgraphs in the first set of isomorphic subgraphs; each first isomorphic subgraph in the $k_0$ first isomorphic subgraphs and the second isomorphic subgraph corresponding thereto are constituted into a new first isomorphic subgraph, to obtain $k_0$ new first isomorphic subgraphs; the $k_0$ new first isomorphic subgraphs are determined as a new first set of isomorphic subgraphs; i=i+1 is set, and the step of determining a first fixed cost of each first isomorphic subgraph in a first set of isomorphic subgraphs to obtain a first fixed cost set is performed, an initial value of i is 1; and when i=N−1, the quantum circuit is constructed based on the obtained $k_0$ minimum consumption costs.

Some embodiments of the present disclosure provide another quantum circuit construction method, in which a maximum subgraph sequence is matched from front to back by traversal, to find $k_0$ consumption costs, the number of consumption costs is equal to the number of isomorphic subgraphs corresponding to the $0^{th}$ maximum subgraph, an isomorphic subgraph corresponding to each maximum subgraph is determined based on the $k_0$ consumption costs, and then a quantum circuit is constructed by using the isomorphic subgraph corresponding to each maximum subgraph. In some embodiments of the present disclosure, every two adjacent isomorphic subgraph sets are screened once, and each time only an optimal isomorphic subgraph with the same number of isomorphic subgraphs corresponding to the $0^{th}$ maximum subgraph is obtained, which greatly reduces the amount of calculation and storage and can construct a quantum circuit.

With the quantum circuit construction method provided in some embodiments of the present disclosure, the quantum circuit with the minimum consumption can be found. However, amounts of calculation and storage thereof are very huge. Although the amounts of calculation and storage are reduced with the quantum circuit construction method provided in some other embodiments of the present disclosure, the optimal quantum circuit may be ignored. Therefore, the present disclosure further provides another quantum circuit construction method. Please refer to the following embodiments for details.

Further, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost includes:

Determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determining exchange costs of all the first isomorphic subgraphs in the first set of isomorphic subgraphs and each second isomorphic subgraph in the second set of isomorphic subgraphs to obtain $k_i$ exchange cost sets, each of the exchange cost sets includes $k_0$ exchange costs;

Determining $k_i$ consumption cost sets based on the first fixed cost set, the second fixed cost set, and the $k_i$ exchange cost sets, each of the consumption cost sets includes $k_0$ consumption costs;

Determining a minimum consumption cost in each of the consumption cost sets to obtain $k_i$ minimum consumption costs, the $k_i$ minimum consumption costs are in one-to-one correspondence to $k_i$ second isomorphic subgraphs in the second set of isomorphic subgraphs;

Constituting each second isomorphic subgraph in the $k_i$ second isomorphic subgraphs and the first isomorphic subgraph corresponding thereto into a new first isomorphic subgraph, to obtain $k_i$ new first isomorphic subgraphs;

Determining the $k_i$ new first isomorphic subgraphs as a new first set of isomorphic subgraphs;

Setting i=i+1, and performing the step of determining a first fixed cost of each first isomorphic subgraph in a first isomorphic subgraph set to obtain a first fixed cost set, an initial value of i is 1; and Constructing, when i=N−1, the quantum circuit based on the obtained $k_{N-1}$ minimum consumption costs.

Figure 2T:
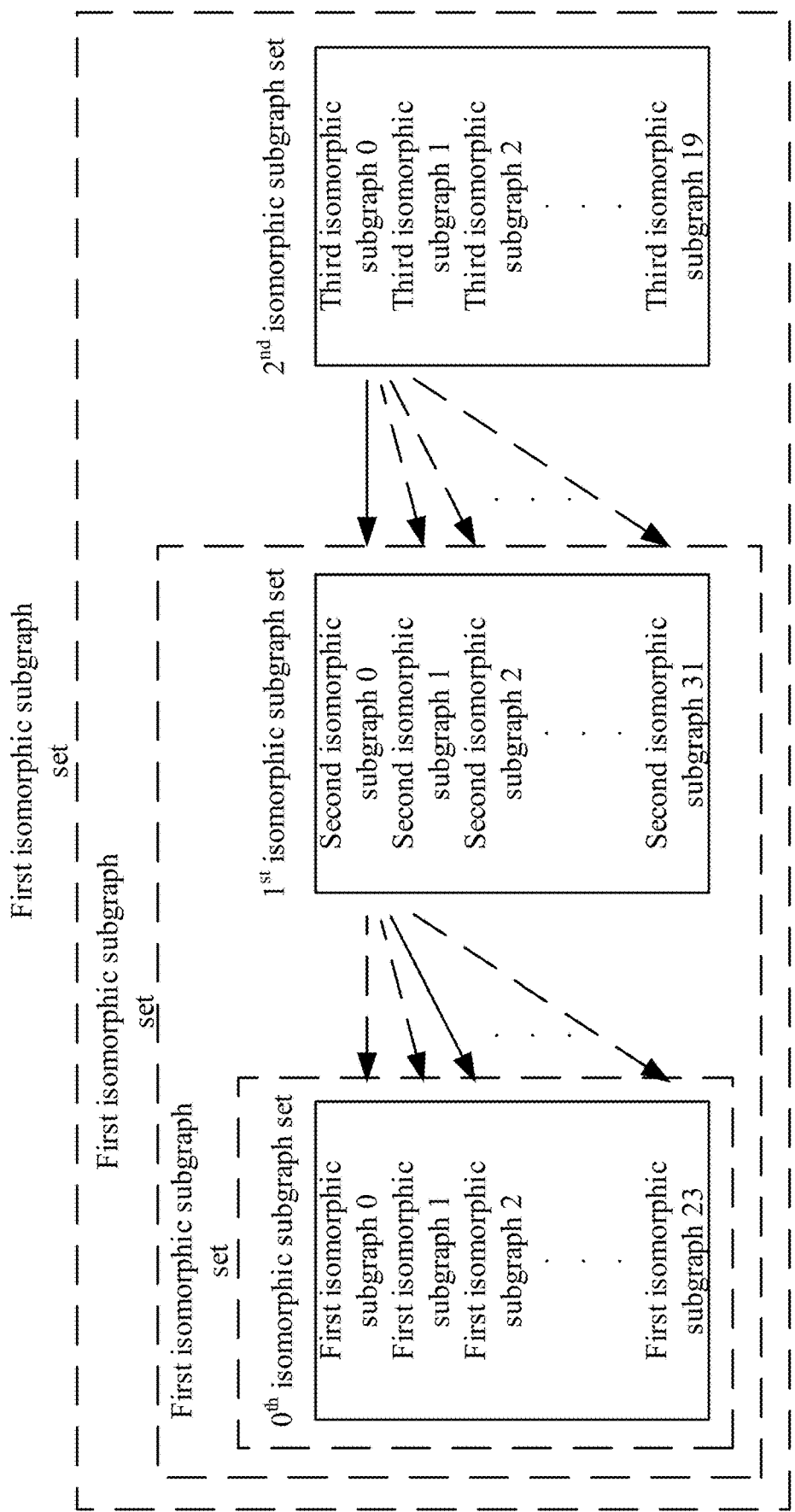
FIG. 2T is a schematic diagram of mutual matching between isomorphic subgraphs according to some embodiments of the present disclosure.

For example, as shown in FIG. 2T, FIG. 2T is a schematic diagram of mutual matching between isomorphic subgraphs according to some embodiments of the present disclosure. A first fixed cost of each first isomorphic subgraph in the $0^{th}$ isomorphic subgraph set is determined to obtain a first fixed cost set. The first fixed cost set includes 24 first fixed costs, which are a first fixed cost 0, a first fixed cost 1, . . . , and a first fixed cost 23 respectively. A second fixed cost of each second isomorphic subgraph in the $1^{st}$ isomorphic subgraph set is determined to obtain a second fixed cost set. The second fixed cost set includes 32 second fixed costs, which are a second fixed cost 0, a second fixed cost 1, . . . , and a second fixed cost 31 respectively.

An exchange cost set 0 may be obtained by determining exchange costs between a first isomorphic subgraph 0, a first isomorphic subgraph 1, . . . , a first isomorphic subgraph 23 and a second isomorphic subgraph 0, the exchange cost set 0 includes an exchange cost 00, an exchange cost 01, an exchange cost 01, . . . , and an exchange cost 023, an exchange cost set 1 may be obtained by determining exchange costs between the first isomorphic subgraph 0, the first isomorphic subgraph 1, . . . , the first isomorphic subgraph 23 and a second isomorphic subgraph 1, the exchange cost set 1 includes an exchange cost 10, an exchange cost 11, an exchange cost 12, . . . , and an exchange cost 123, . . . , until an exchange cost set 31 is obtained by determining exchange costs between the first isomorphic subgraph 0, the first isomorphic subgraph 1, . . . , the first isomorphic subgraph 23 and a second isomorphic subgraph 31, the exchange cost set 31 includes an exchange cost 310, an exchange cost 311, an exchange cost 312, . . . , and an exchange cost 3123.

A consumption cost 00 of the first isomorphic subgraph 0 and the second isomorphic subgraph 0 is determined based on the exchange cost 00, the first fixed cost 0, and the second fixed cost 0, a consumption cost 01 of the first isomorphic subgraph 1 and the second isomorphic subgraph 0 is determined based on the exchange cost 01, the first fixed cost 1, and the second fixed cost 0, . . . , and a consumption cost 023 of the first isomorphic subgraph 23 and the second isomorphic subgraph 0 is determined based on the exchange cost 023, the first fixed cost 23, and the second fixed cost 0. The consumption cost 00, the consumption cost 01, . . . , and the consumption cost 023 constitute a consumption cost set 0.

A consumption cost 10 of the first isomorphic subgraph 0 and the second isomorphic subgraph 1 is determined based on the exchange cost 10, the first fixed cost 0, and the second fixed cost 1, a consumption cost 11 of the first isomorphic subgraph 1 and the second isomorphic subgraph 1 is determined based on the exchange cost 11, the first fixed cost 1, and the second fixed cost 1, . . . , and a consumption cost 123 of the first isomorphic subgraph 23 and the second isomorphic subgraph 1 is determined based on the exchange cost 123, the first fixed cost 23, and the second fixed cost 1. The consumption cost 10, the consumption cost 11, . . . , and the consumption cost 123 constitute a consumption cost set 1.

A consumption cost 310 of the first isomorphic subgraph 0 and the second isomorphic subgraph 31 is determined based on the exchange cost 310, the first fixed cost 0, and the second fixed cost 31, a consumption cost 311 of the first isomorphic subgraph 1 and the second isomorphic subgraph 31 is determined based on the exchange cost 311, the first fixed cost 1, and the second fixed cost 31, . . . , and a consumption cost 3123 of the first isomorphic subgraph 23 and the second isomorphic subgraph 31 is determined based on the exchange cost 3123, the first fixed cost 23, and the second fixed cost 31. The consumption cost 310, the consumption cost 311, . . . , and the consumption cost 3123 constitute a consumption cost set 31.

A minimum consumption cost in the consumption cost set 0 is determined, a minimum consumption cost in the consumption cost set 1 is determined, . . . , and a minimum consumption cost in the consumption cost set 31 is determined, to obtain 32 minimum consumption costs.

The second isomorphic subgraph 0 and the first isomorphic subgraph corresponding to form a new first isomorphic subgraph 0, the second isomorphic subgraph 1 and the first isomorphic subgraph corresponding thereto form a new first isomorphic subgraph 1, . . . , and a second isomorphic subgraph 31 and the first isomorphic subgraph corresponding to form a new first isomorphic subgraph 31. The new first isomorphic subgraph 0, the new first isomorphic subgraph 1, . . . , and the new first isomorphic subgraph 31 constitute a new first isomorphic subgraph set.

A first fixed cost of each first isomorphic subgraph in the new isomorphic subgraph set is determined to obtain a first fixed cost set. The first fixed cost set includes 32 first fixed costs, which are a first fixed cost 0', a first fixed cost 1', . . . , and a first fixed cost 31' respectively. A second fixed cost of each second isomorphic subgraph (here, the third isomorphic subgraph is a new second isomorphic subgraph) in the $2^{nd}$ isomorphic subgraph set is determined to obtain a second fixed cost set. The second fixed cost set includes 20 second fixed costs, which are a second fixed cost 0', a second fixed cost 1', ..., and a second fixed cost 19' respectively.

An exchange cost set 0' may be obtained by determining exchange costs between a second isomorphic subgraph 0', a second isomorphic subgraph 1', ..., a second isomorphic subgraph 31' and a first isomorphic subgraph 0', the exchange cost set 0' includes an exchange cost 00', an exchange cost 10', an exchange cost 20', ..., and an exchange cost 310', an exchange cost set 1' may be obtained by determining exchange costs between the second isomorphic subgraph 0', the second isomorphic subgraph 1', ..., the second isomorphic subgraph 31' and a first isomorphic subgraph 1', the exchange cost set 1' includes an exchange cost 01', an exchange cost 11', an exchange cost 21', ..., and an exchange cost 311', ..., until an exchange cost set 19' is obtained by determining exchange costs between the second isomorphic subgraph 0', the second isomorphic subgraph 1', ..., the second isomorphic subgraph 31' and a first isomorphic subgraph 19', the exchange cost set 19' includes an exchange cost 019', an exchange cost 119', an exchange cost 219', ..., and an exchange cost 3119'.

A consumption cost 00' of the first isomorphic subgraph 0' and the second isomorphic subgraph 0' is determined based on the exchange cost 00', the first fixed cost 0', and the second fixed cost 0', a consumption cost 01' of the first isomorphic subgraph 1' and the second isomorphic subgraph 0' is determined based on the exchange cost 01', the first fixed cost 1', and the second fixed cost 0', ..., and a consumption cost 031' of the first isomorphic subgraph 31' and the second isomorphic subgraph 0' is determined based on the exchange cost 031', the first fixed cost 31', and the second fixed cost 0'. The consumption cost 00', the consumption cost 01', ..., and the consumption cost 031' constitute a consumption cost set 0'.

A consumption cost 10' of the first isomorphic subgraph 0' and the second isomorphic subgraph 1' is determined based on the exchange cost 10', the first fixed cost 0', and the second fixed cost 1', a consumption cost 11' of the first isomorphic subgraph 1' and the second isomorphic subgraph 1' is determined based on the exchange cost 11', the first fixed cost 1', and the second fixed cost 1', ..., and a consumption cost 131' of the first isomorphic subgraph 31' and the second isomorphic subgraph 1' is determined based on the exchange cost 131', the first fixed cost 31', and the second fixed cost 1'. The consumption cost 10', the consumption cost 11', ..., and the consumption cost 131' constitute a consumption cost set 1'.

A consumption cost 310' of the first isomorphic subgraph 0' and the second isomorphic subgraph 31' is determined based on the exchange cost 310', the first fixed cost 0', and the second fixed cost 31', a consumption cost 311' of the first isomorphic subgraph 1' and the second isomorphic subgraph 31' is determined based on the exchange cost 311', the first fixed cost 1', and the second fixed cost 31', ..., and a consumption cost 1931' of the first isomorphic subgraph 31' and the second isomorphic subgraph 19' is determined based on the exchange cost 1931', the first fixed cost 31', and the second fixed cost 19'. The consumption cost 310', the consumption cost 311', ..., and the consumption cost 3119' constitute a consumption cost set 19'.

A minimum consumption cost in the consumption cost set 0' is determined, a minimum consumption cost in the consumption cost set 1' is determined, ..., and a minimum consumption cost in the consumption cost set 19' is determined, to obtain 20 minimum consumption costs. 20 quantum circuits corresponding to the 20 minimum consumption costs are determined. A quantum circuit 0 is composed of the third isomorphic subgraph 0, the second isomorphic subgraph corresponding thereto, and the first isomorphic subgraph corresponding thereto, a quantum circuit 1 is composed of the third isomorphic subgraph 1, the second isomorphic subgraph corresponding thereto, and the third isomorphic subgraph corresponding thereto, ..., and a quantum circuit 19 is composed of the third isomorphic subgraph 19, the second isomorphic subgraph corresponding thereto, and the first isomorphic subgraph corresponding thereto. The quantum circuit with the minimum consumption cost is selected therefrom.

As can be seen, in some embodiments of the present disclosure, a first fixed cost of each first isomorphic subgraph in a first set of isomorphic subgraphs is determined to obtain a first fixed cost set, the first set of isomorphic subgraphs is an isomorphic subgraph set corresponding to the $0^{th}$ maximum subgraph; a second fixed cost of each second isomorphic subgraph in a second set of isomorphic subgraphs is determined to obtain a second fixed cost set, the second set of isomorphic subgraphs is an isomorphic subgraph set corresponding to the $i^{th}$ maximum subgraph; exchange costs of all the second isomorphic subgraphs in the second sets of isomorphic subgraphs and each first isomorphic subgraph in the first set of isomorphic subgraphs are determined to obtain $k_i$ exchange cost sets, each of the exchange cost sets includes $k_0$ exchange costs; $k_i$ consumption cost sets are determined based on the first fixed cost set, the second fixed cost set, and the $k_i$ exchange cost sets, each of the consumption cost sets includes $k_0$ consumption costs; a minimum consumption cost in each of the consumption cost sets is determined to obtain $k_i$ minimum consumption costs, the $k_i$ minimum consumption costs are in one-to-one correspondence to $k_i$ first isomorphic subgraphs in the first set of isomorphic subgraphs; each first isomorphic subgraph in the $k_i$ first isomorphic subgraphs and the second isomorphic subgraph corresponding thereto are constituted into a new first isomorphic subgraph, to obtain $k_i$ new first isomorphic subgraphs; the $k_i$ new first isomorphic subgraphs are determined as a new first set of isomorphic subgraphs; i=i+1 is set, and the step of determining a first fixed cost of each first isomorphic subgraph in a first set of isomorphic subgraphs to obtain a first fixed cost set is performed, an initial value of i is 1; and when i=N−1, the quantum circuit is constructed based on the obtained $k_{N-1}$ minimum consumption costs.

Some embodiments of the present disclosure provide another quantum circuit construction method, in which a maximum subgraph sequence is matched from front to back by traversal, to find $k_{N-1}$ consumption costs, the number of consumption costs is equal to the number of isomorphic subgraphs corresponding to the N-lth maximum subgraph, an isomorphic subgraph corresponding to each maximum subgraph is determined based on the $k_{N-1}$ consumption costs, and then a quantum circuit is constructed by using the isomorphic subgraph corresponding to each maximum subgraph. In some embodiments of the present disclosure, every two adjacent isomorphic subgraph sets are screened once, and each time only an optimal isomorphic subgraph with the same number of isomorphic subgraphs corresponding to the subsequent maximum subgraph is obtained, which greatly reduces the amount of calculation and storage and can construct a quantum circuit.

In the following embodiments, another specific example is given to illustrate differences between construction of a quantum circuit by traversal from front to back and construction a quantum circuit by traversal from back to front.

Figure 2U:
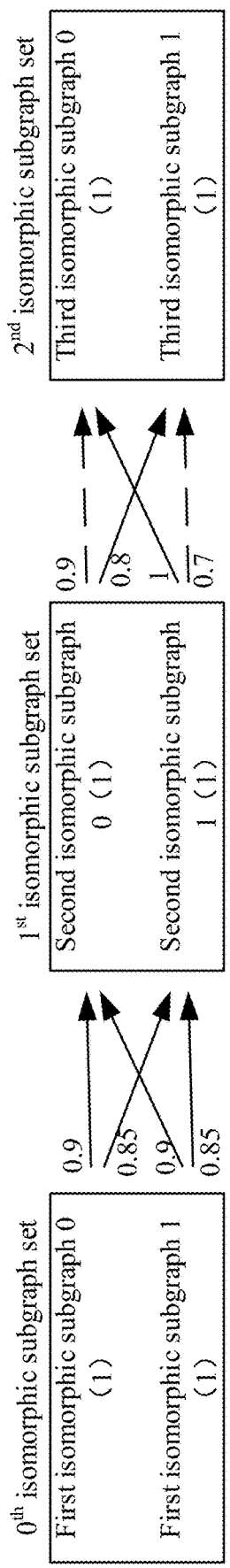
FIG. 2U is a schematic diagram of mutual matching between isomorphic subgraphs according to some embodiments of the present disclosure.

As shown in FIG. 2U, FIG. 2U is a schematic diagram of mutual matching between isomorphic subgraphs according to some embodiments of the present disclosure. The $0^{th}$ isomorphic subgraph set includes a first isomorphic subgraph 0 and a first isomorphic subgraph 1, the $1^{st}$ isomorphic subgraph set includes a second isomorphic subgraph 0 and a second isomorphic subgraph 1, and the $2^{nd}$ isomorphic subgraph set includes a third isomorphic subgraph 0 and a third isomorphic subgraph 1. Fidelity of the first isomorphic subgraph 0, the first isomorphic subgraph 1, the second isomorphic subgraph 0, the second isomorphic subgraph 1, the third isomorphic subgraph 0, and the third isomorphic subgraph 1 is 1, fidelity between the first isomorphic subgraph 0 and the second isomorphic subgraph 0 is 0.9, fidelity between the first isomorphic subgraph 0 and the second isomorphic subgraph 1 is 0.85, fidelity between the first isomorphic subgraph 1 and the second isomorphic subgraph 0 is 0.9, fidelity between the first isomorphic subgraph 1 and the second isomorphic subgraph 1 is 0.85, fidelity between the second isomorphic subgraph 0 and the third isomorphic subgraph 0 is 0.9, fidelity between the second isomorphic subgraph 0 and the third isomorphic subgraph 1 is 0.8, fidelity between the second isomorphic subgraph 1 and the third isomorphic subgraph 0 is 1, and fidelity between the second isomorphic subgraph 1 and the third isomorphic subgraph 1 is 0.7.

When the quantum circuit is constructed by traversal from front to back, a consumption cost of the first isomorphic subgraph 0 and the second isomorphic subgraph 0 is 0.1 (1−1×0.9×1), a consumption cost of the first isomorphic subgraph 0 and the second isomorphic subgraph 1 is 0.15 (1−1×0.85×1), the one with the lowest consumption cost is selected to obtain a new first isomorphic subgraph 0, and the new first isomorphic subgraph 0 consists of the first isomorphic subgraph 0 and the second isomorphic subgraph 0. A consumption cost of the first isomorphic subgraph 1 and the second isomorphic subgraph 0 is 0.1 (1−1×0.9×1), a consumption cost of the first isomorphic subgraph 1 and the second isomorphic subgraph 1 is 0.15 (1−1×0.85×1), the one with the lowest consumption cost is selected to obtain a new first isomorphic subgraph 1, and the new first isomorphic subgraph 1 consists of the first isomorphic subgraph 1 and the second isomorphic subgraph 0. A consumption cost of the new first isomorphic subgraph 0 and the third isomorphic subgraph 0 is 0.19 (1−1×0.9×1×0.9×1), a consumption cost of the new first isomorphic subgraph 0 and the third isomorphic subgraph 1 is 0.28 (1−1×0.9×1×0.8×1), the one with the lowest consumption cost is selected to obtain a new first isomorphic subgraph 0, and the new first isomorphic subgraph 0 consists of the first isomorphic subgraph 0, the second isomorphic subgraph 0, and the third isomorphic subgraph 0. A consumption cost of the new first isomorphic subgraph 1 and the third isomorphic subgraph 0 is 0.19 (1−1×0.9×1×0.9×1), a consumption cost of the new first isomorphic subgraph 1 and the third isomorphic subgraph 1 is 0.28 (1−1×0.9×1×0.8×1), the one with the lowest consumption cost is selected to obtain a new first isomorphic subgraph 1, and the new first isomorphic subgraph 1 consists of the first isomorphic subgraph 1, the second isomorphic subgraph 0, and the third isomorphic subgraph 0. Finally, the isomorphic subgraph with the lowest consumption cost is selected from the new first isomorphic subgraph 0 and the new first isomorphic subgraph 1 to construct a quantum circuit. Since the consumption costs of the two are 0.19, the quantum circuit can be constructed based on the first isomorphic subgraph 0, the second isomorphic subgraph 0, and the third isomorphic subgraph 0, or the quantum circuit can be constructed based on the first isomorphic subgraph 1, the second isomorphic subgraph 0, and the third isomorphic subgraph 0.

When the quantum circuit is constructed by traversal from back to front, a consumption cost of the second isomorphic subgraph 0 and the first isomorphic subgraph 0 is 0.1 (1−1×0.9×1), a consumption cost of the second isomorphic subgraph 0 and the first isomorphic subgraph 1 is 0.1 (1−1×0.9×1), the one with the lowest consumption cost is selected to obtain a new first isomorphic subgraph 0, the consumption costs of the two are the same, and therefore the new first isomorphic subgraph 0 may consist of the first isomorphic subgraph 0 and the second isomorphic subgraph 0 or consist of the first isomorphic subgraph 1 and the second isomorphic subgraph 0. A consumption cost of the second isomorphic subgraph 1 and the first isomorphic subgraph 0 is 0.15 (1−1×0.85×1), a consumption cost of the second isomorphic subgraph 1 and the first isomorphic subgraph 1 is 0.15 (1−1×0.85×1), the one with the lowest consumption cost is selected to obtain a new first isomorphic subgraph 1, the consumption costs of the two are the same, and therefore the new first isomorphic subgraph 1 may consist of the first isomorphic subgraph 1 and the second isomorphic subgraph 0 or consist of the first isomorphic subgraph 1 and the second isomorphic subgraph 1. A consumption cost of the new first isomorphic subgraph 0 and the third isomorphic subgraph 0 is 0.19 (1−1×0.9×1×0.9×1), a consumption cost of the new first isomorphic subgraph 0 and the third isomorphic subgraph 1 is 0.28 (1−1×0.9×1×0.8×1), the one with the lowest consumption cost is selected to obtain a new first isomorphic subgraph 0, and the new first isomorphic subgraph 0 consists of the first isomorphic subgraph 0, the second isomorphic subgraph 0, and the third isomorphic subgraph 0, or the new first isomorphic subgraph 0 consists of the first isomorphic subgraph 1, the second isomorphic subgraph 0, and the third isomorphic subgraph 0. A consumption cost of the new first isomorphic subgraph 1 and the third isomorphic subgraph 0 is 0.15 (1−1×0.85×1×1×1), a consumption cost of the new first isomorphic subgraph 1 and the third isomorphic subgraph 1 is 0.405 (1−1×0.85×1×0.7×1), the one with the lowest consumption cost is selected to obtain a new first isomorphic subgraph 1, and the new first isomorphic subgraph 1 may consist of the first isomorphic subgraph 0, the second isomorphic subgraph 1, and the third isomorphic subgraph 0, or consist of the first isomorphic subgraph 1, the second isomorphic subgraph 1, and the third isomorphic subgraph 0. Finally, the isomorphic subgraph with the lowest consumption cost is selected from the new first isomorphic subgraph 0 and the new first isomorphic subgraph 1 to construct a quantum circuit. Since the consumption cost of the new first isomorphic subgraph 1 is the lowest, which is 0.85, the quantum circuit can be constructed based on the first isomorphic subgraph 0, the second isomorphic subgraph 1, and the third isomorphic subgraph 0, or the quantum circuit can be constructed based on the first isomorphic subgraph 1, the second isomorphic subgraph 1, and the third isomorphic subgraph 0.

As can be seen, when the quantum circuit is constructed by traversal from front to back, an obtained result is that the quantum circuit is constructed based on the first isomorphic subgraph 0, the second isomorphic subgraph 0, and the third isomorphic subgraph 0 or the quantum circuit is constructed based on the first isomorphic subgraph 1, the second isomorphic subgraph 0, and the third isomorphic subgraph 0. When the quantum circuit is constructed by traversal from front to back, an obtained result is that the quantum circuit is constructed based on the first isomorphic subgraph 0, the second isomorphic subgraph 1, and the third isomorphic subgraph 0 or the quantum circuit is constructed based on the first isomorphic subgraph 1, the second isomorphic subgraph 1, and the third isomorphic subgraph 0. The results obtained by the two are different. The overall consumption cost of the former is 0.19, and the overall consumption cost of the latter is 0.15. Obviously, the latter is better than the former, and the quantum circuit construction method found by the former is not optimal.

It is to be noted that, in the above three embodiments of quantum circuit construction, the maximum subgraph, the maximum subgraph sequence, the isomorphic subgraph, the isomorphic subgraph set, the first fixed cost set, the second fixed cost set, the consumption cost set, and the like are all numbered from 0, and may alternatively be numbered from 1 or from any other number or letter, which will not be illustrated one by one here.

Further, the fixed cost and the exchange cost are determined based on fidelity.

Further, the fixed cost and the exchange cost are determined based on the number of CZ gates.

It is to be noted that fidelity corresponding to any two-quantum logic gate may be equivalent to fidelity corresponding to at least one CZ gate.

Each isomorphic subgraph corresponds to a maximum subgraph. Each maximum subgraph is determined based on at least one two-quantum logic gate. The fixed cost of each isomorphic subgraph is determined based on a product of fidelity corresponding to the at least one two-quantum logic gate.

For example, quantum logic gates corresponding to a maximum subgraph 2H are CZ(q[0], q[1]), CZ(q[0], q[2]), and CZ(q[0], q[3]), and quantum logic gates corresponding to a maximum subgraph 2L are CZ(q[1], q[2]) and CZ(q[1], q[3]). When the maximum subgraph 2H and the maximum subgraph 2L are mapped to FIG. 2Q, a mapping relationship of the maximum subgraph 2H is as follows: q[1]→Q[0], q[0]→Q[1], q[3]→Q[2], and q[2]→Q[5], and a mapping relationship of the maximum subgraph 2L is as follows: q[3]→Q[2], q[1]→Q[1], and q[2]→Q[5].

The fixed cost and the exchange cost are determined based on fidelity.

Fidelity of an analog signal corresponding to a CZ gate acting on Q[0] and Q[1] is F01, fidelity of the analog signal corresponding to a CZ gate acting on Q[1] and Q[2] is F12, and fidelity of the analog signal corresponding to a CZ gate acting on Q[1] and Q[5] is F15. A fixed cost of the maximum subgraph 2H is 1−F01·F12·F15. When CZ (q[1], q[2]) and CZ (q[1], q[3]) are executed, the mapping relationship of q[1] is required to be transformed from Q[0] to Q[1], and a fixed cost of the maximum subgraph 2L is 1−F12·F15. When the mapping relationship of q[1] is transformed from Q[0] to Q[1], there is a need to introduce a quantum logic gate SWAP(q[0], q[1]). SWAP(q[0], q[1])=CZ(q[0], q[1]) CZ(q [0], q[1]) CZ(q[0], q[1]). Therefore, an exchange cost of the maximum subgraph 2H and the maximum subgraph 2L is 1−F013. The total consumption cost is 1−F01·F12·F15·F12·F15·F013.

The fixed cost and the exchange cost are determined based on the number of CZ gates. The fixed cost of the maximum subgraph 2H is 3 CZ gates, the fixed cost of the maximum subgraph 2L is 2 CZ gates, the exchange cost of the maximum subgraph 2H and the maximum subgraph 2L is 3 CZ gates, and the total consumption cost is 8 CZ gates.

Figure 3:
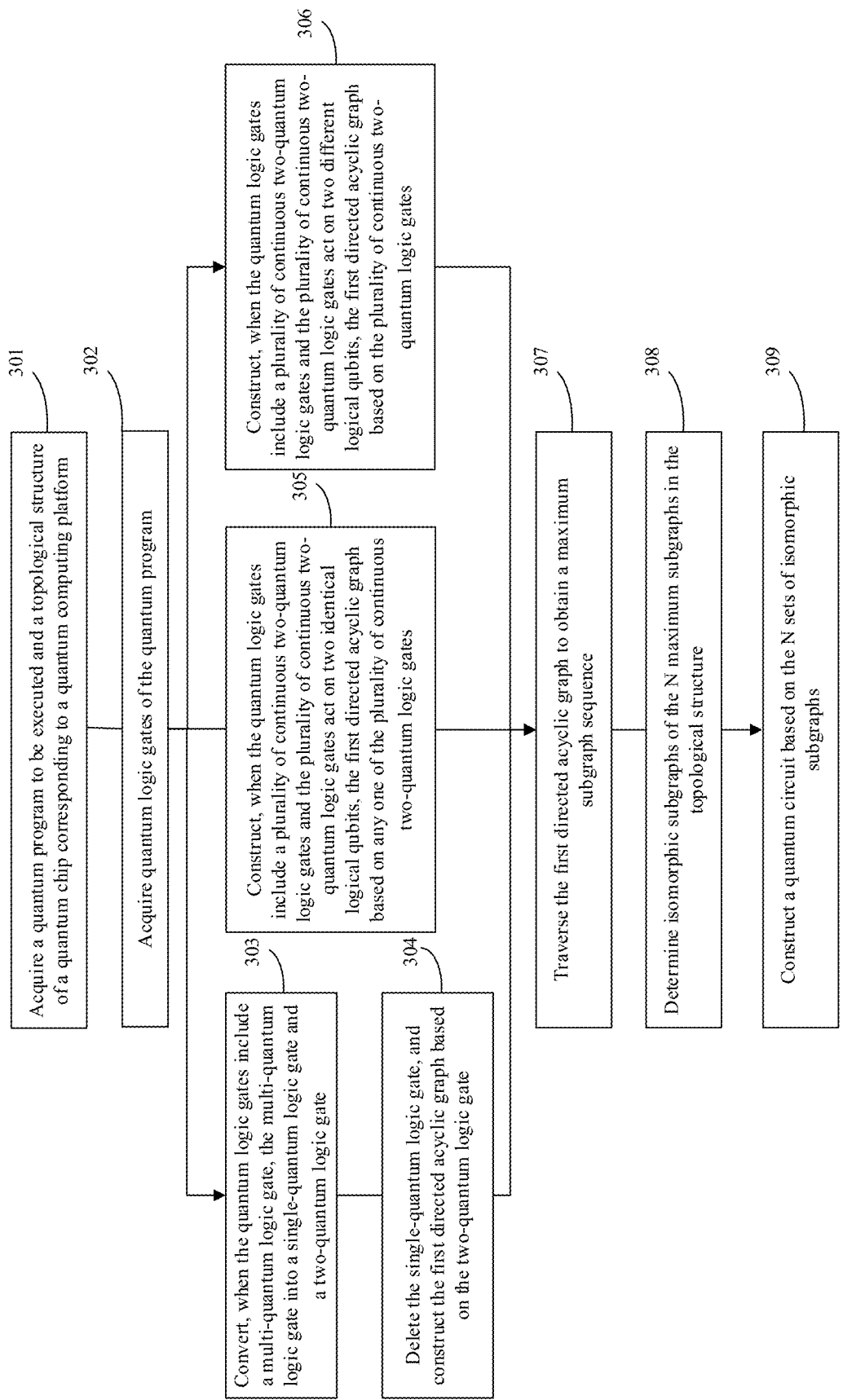
FIG. 3 is a schematic flowchart of another quantum computing platform adaptation method according to some embodiments of the present disclosure.

Referring to FIG. 3, FIG. 3 is a schematic flowchart of another quantum computing platform adaptation method according to some embodiments of the present disclosure. The method includes the following steps.

In step 301, a quantum program to be executed and a topological structure of a quantum chip corresponding to a quantum computing platform are acquired, the topological structure is configured to represent physical qubits in an electronic device and a connection relationship between the physical qubits.

In step 302, quantum logic gates of the quantum program are acquired.

In step 303, when the quantum logic gates include a multi-quantum logic gate, the multi-quantum logic gate is converted into a single-quantum logic gate and a two-quantum logic gate.

In step 304, the single-quantum logic gate is deleted, and the first directed acyclic graph is constructed based on the two-quantum logic gate.

In step 305, when the quantum logic gates include a plurality of continuous two-quantum logic gates and the plurality of continuous two-quantum logic gates act on two identical logical qubits, the first directed acyclic graph is constructed based on any one of the plurality of continuous two-quantum logic gates.

In step 306, when the quantum logic gates include a plurality of continuous two-quantum logic gates and the plurality of continuous two-quantum logic gates act on two different logical qubits, the first directed acyclic graph is constructed based on the plurality of continuous two-quantum logic gates, the first directed acyclic graph includes nodes and directed edges; the nodes include two points and an edge, the two points are configured to represent two logical qubits corresponding to the quantum logic gate, and the edge is configured to represent the quantum logic gate acting on the two logical qubits; and the directed edges are configured to represent dependence of the quantum logic gate based on a quantum state evolution time sequence of logical qubits.

In step 307, the first directed acyclic graph is traversed to obtain a maximum subgraph sequence, the maximum subgraph sequence includes N maximum subgraphs, and N is an integer greater than or equal to 1.

In step 308, isomorphic subgraphs of the N maximum subgraphs in the topological structure are determined to obtain N sets of isomorphic subgraphs, the N sets of isomorphic subgraphs are in one-to-one correspondence to the N maximum subgraphs.

In step 309, a quantum circuit is constructed based on the N sets of isomorphic subgraphs, the quantum circuit is configured to operate on the quantum computing platform.

It is to be noted that a specific implementation process of this embodiment may be obtained with reference to the specific implementation process described in the above method embodiments. Details are not described herein again.

Figure 4:
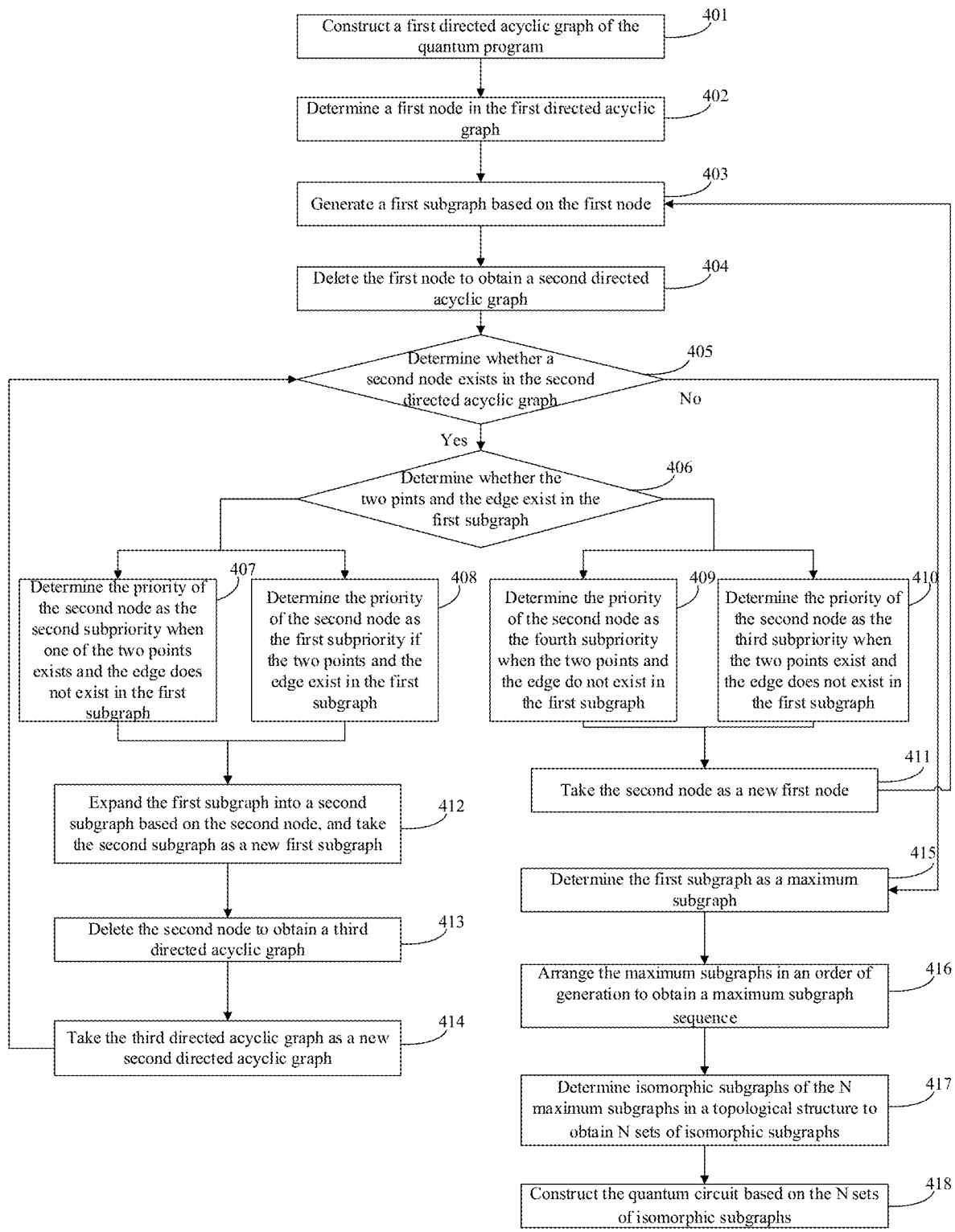
FIG. 4 is a schematic flowchart of a quantum circuit construction method according to some embodiments of the present disclosure.
Figure 7:
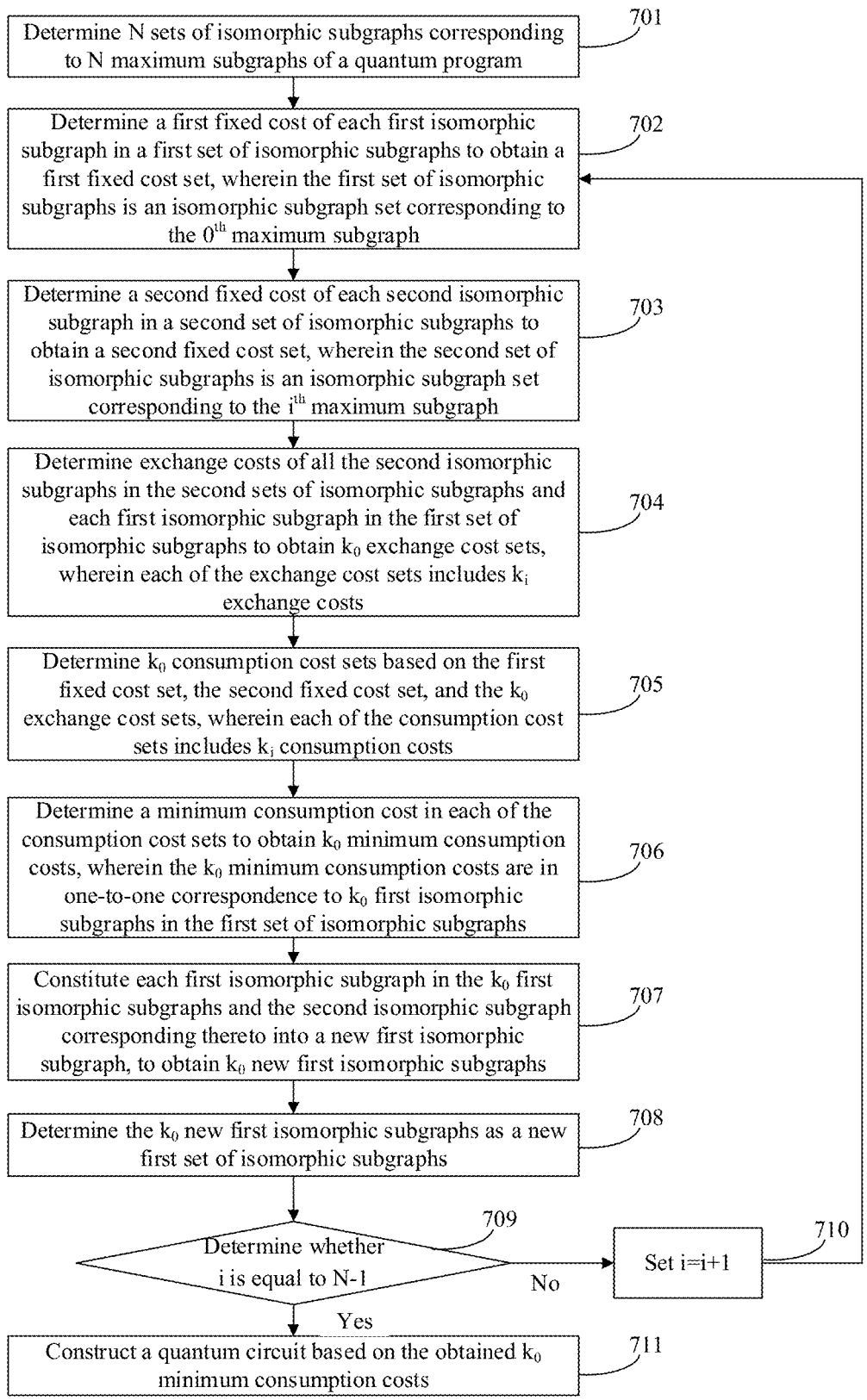
FIG. 7 is a schematic flowchart of yet still another quantum circuit construction method according to some embodiments of the present disclosure.

Some embodiments of the present disclosure further provide a quantum circuit construction method shown in FIG. 4 and FIG. 7. The above quantum circuit construction method may be configured to implement the above step of adapting the quantum program to the quantum computing platform based on the topological structure.

Referring to FIG. 4, FIG. 4 is a schematic flowchart of another quantum circuit construction method according to some embodiments of the present disclosure. The method includes the following steps.

In step 401, a first directed acyclic graph of the quantum program is constructed.

In step 402, a first node in the first directed acyclic graph is determined, an in-degree of the first node is 0.

In step 403, a first subgraph is generated based on the first node.

In step 404, the first node is deleted to obtain a second directed acyclic graph.

In step 405, it is determined whether a second node exists in the second directed acyclic graph, an in-degree of the second node is 0; the second node includes two points and an edge, the two points are configured to represent two logical qubits in the quantum program, and the edge is configured to represent the quantum logic gate acting on the two logical qubits; and a priority of the second node is determined based on the two points, the edge, and the first subgraph.

If yes, step 406 is performed.

If not, step 415 is performed.

In step 406, it is determined whether the two pints and the edge exist in the first subgraph.

In step 407, the priority of the second node is determined as the second subpriority when one of the two points exists and the edge does not exist in the first subgraph.

In step 408, the priority of the second node is determined as the first subpriority if the two points and the edge exist in the first subgraph.

In step 409, the priority of the second node is determined as the fourth subpriority when the two points and the edge do not exist in the first subgraph.

In step 410, the priority of the second node is determined as the third subpriority when the two points exist and the edge does not exist in the first subgraph. The priorities, from high to low, are sequentially the first subpriority, the second subpriority, the third subpriority, and the fourth subpriority.

In step 411, when the second node has a second priority, the second node is taken as a new first node, and then step 403 is performed, the second priority includes a third subpriority and a fourth subpriority.

In step 412, when the second node has a first priority, the first subgraph is expanded into a second subgraph based on the second node, and the second subgraph is taken as a new first subgraph, the first priority includes a first subpriority and a second subpriority.

In step 413, the second node is deleted to obtain a third directed acyclic graph.

In step 414, the third directed acyclic graph is taken as a new second directed acyclic graph, and then step 405 is performed.

In step 415, the first subgraph is determined as a maximum subgraph.

In step 416, the maximum subgraphs are arranged in an order of generation to obtain a maximum subgraph sequence, the maximum subgraph sequence includes N maximum subgraphs, and N is an integer greater than or equal to 1.

In step 417, isomorphic subgraphs of the N maximum subgraphs in a topological structure are determined to obtain N sets of isomorphic subgraphs, the topological structure is configured to represent physical qubits in an electronic device and a connection relationship between the physical qubits, and the N sets of isomorphic subgraphs are in one-to-one correspondence to the N maximum subgraphs.

In step 418, the quantum circuit is constructed based on the N sets of isomorphic subgraphs.

It is to be noted that a specific implementation process of this embodiment may be obtained with reference to the specific implementation process described in the above method embodiments. Details are not described herein again.

Figure 5:
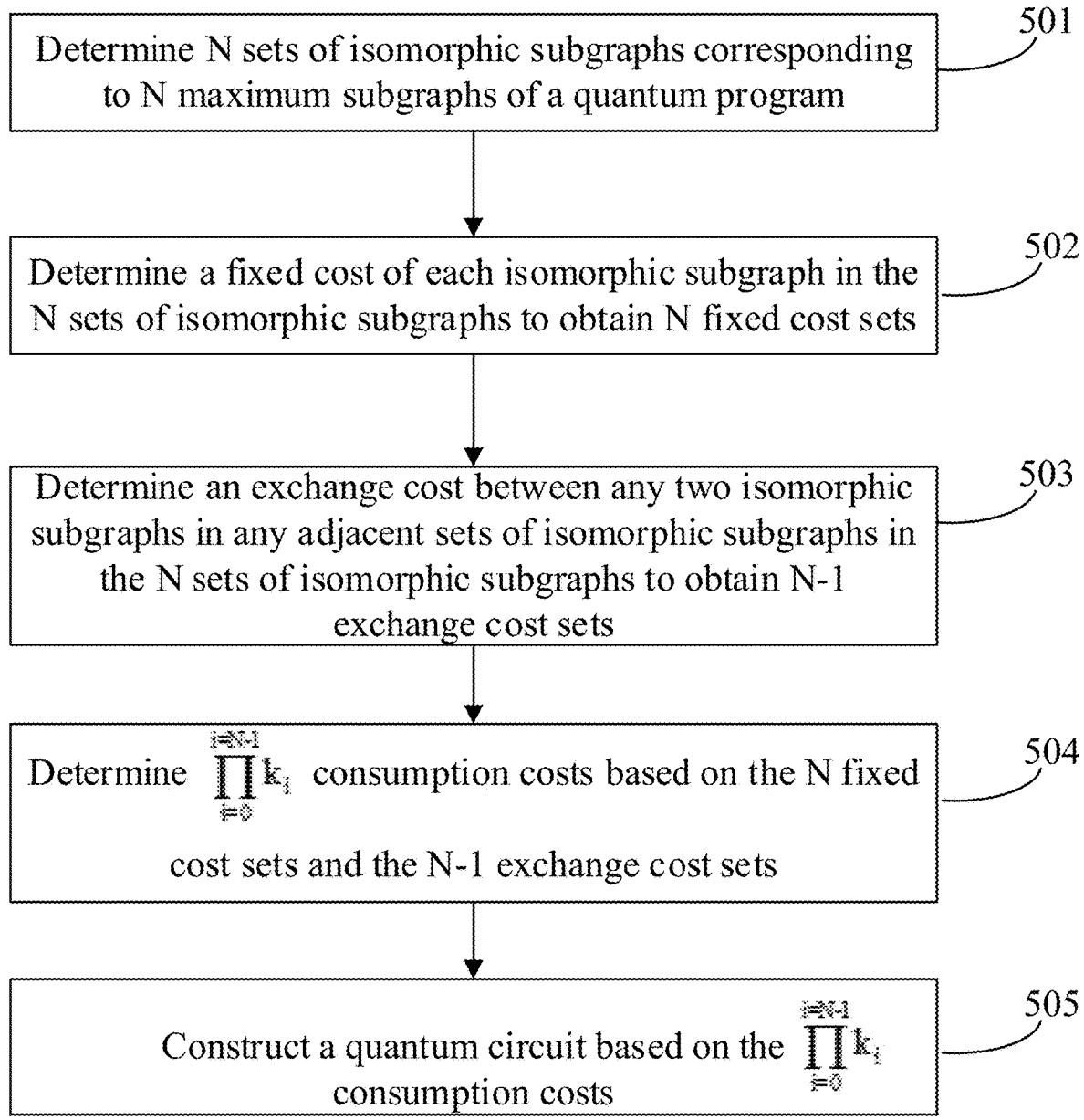
FIG. 5 is a schematic flowchart of another quantum circuit construction method according to some embodiments of the present disclosure.

Referring to FIG. 5, FIG. 5 is a schematic flowchart of another quantum circuit construction method according to some embodiments of the present disclosure. The method includes the following steps.

In step 501, N sets of isomorphic subgraphs corresponding to N maximum subgraphs of a quantum program are determined, the N maximum subgraphs are determined based on a directed acyclic graph of the quantum program, the N sets of isomorphic subgraphs constitute a bit relation graph on a quantum chip in an electronic device obtained by mapping the N maximum subgraphs based on a topological structure of the quantum chip, and N is an integer greater than or equal to 1; and the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1.

In step 502, a fixed cost of each isomorphic subgraph in the N sets of isomorphic subgraphs is determined to obtain N fixed cost sets, the N fixed cost sets are in one-to-one correspondence to the N sets of isomorphic subgraphs.

In step 503, an exchange cost between any two isomorphic subgraphs in any adjacent sets of isomorphic subgraphs in the N sets of isomorphic subgraphs is determined to obtain N−1 exchange cost sets, each of the exchange cost sets includes $k_i \cdot k_{i+1}$ exchange costs.

In step 504, $$\prod_{i=0}^{i=N-1} k_i$$

consumption costs are determined based on the N fixed cost sets and the N−1 exchange cost sets.

In step 505, a quantum circuit is constructed based on the $$\prod_{i=0}^{i=N-1} k_i$$

consumption costs.

Figure 6:
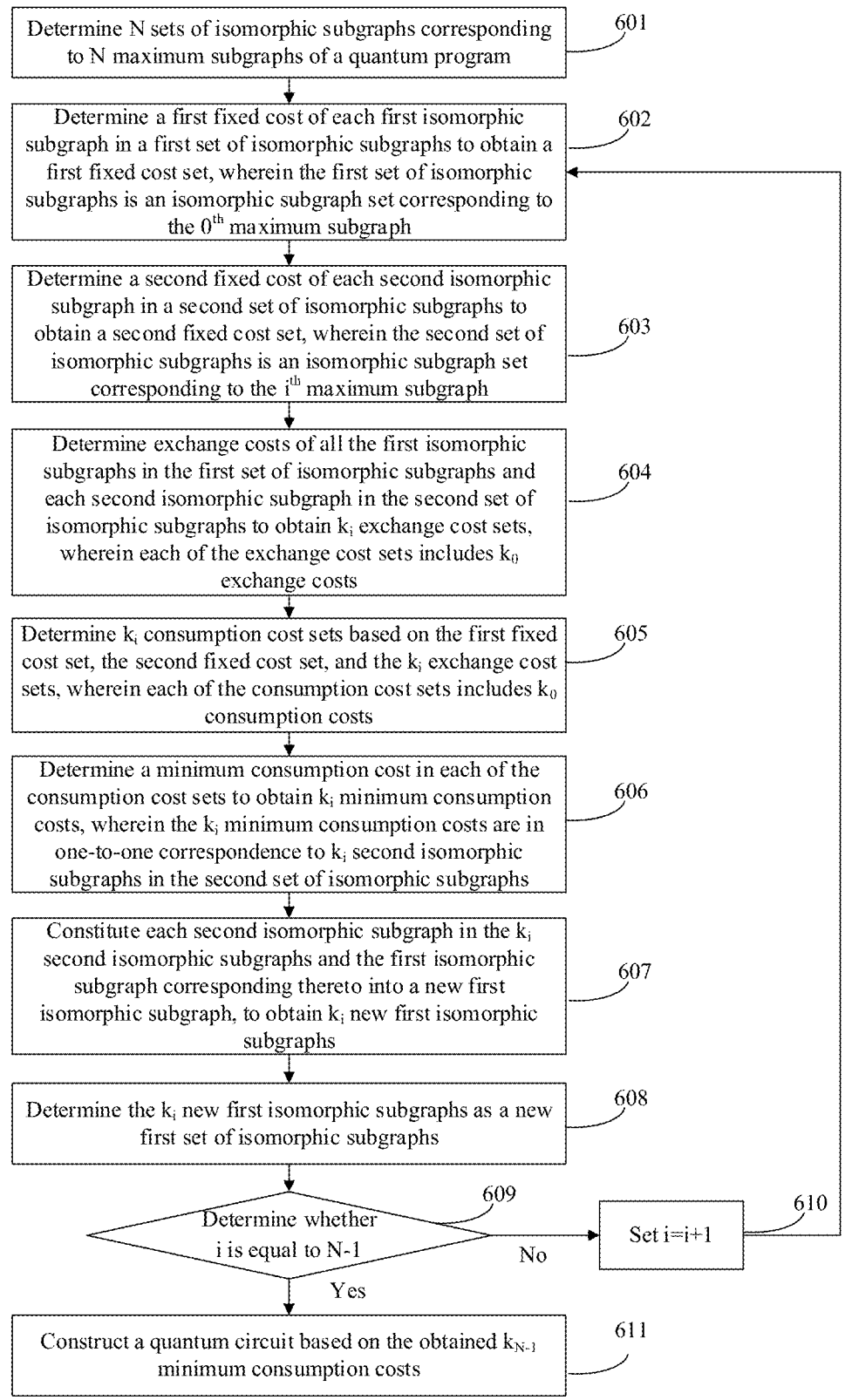
FIG. 6 is a schematic flowchart of still another quantum circuit construction method according to some embodiments of the present disclosure.

With the quantum circuit construction method provided in the above embodiments of the present disclosure, the quantum circuit with the minimum consumption cost can be found. However, amounts of calculation and storage thereof are very huge. Therefore, the present disclosure provides another quantum circuit construction method. Please refer to the following embodiments for details. Referring to FIG. 6, FIG. 6 is a schematic flowchart of yet another quantum circuit construction method according to some embodiments of the present disclosure. The method includes the following steps.

In step 601, N sets of isomorphic subgraphs corresponding to N maximum subgraphs of a quantum program are determined, the N maximum subgraphs are determined based on a directed acyclic graph of the quantum program, the N sets of isomorphic subgraphs constitute a bit relation graph on a quantum chip in an electronic device obtained by mapping the N maximum subgraphs based on a topological structure of the quantum chip, and N is an integer greater than or equal to 1; and the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1.

In step 602, a first fixed cost of each first isomorphic subgraph in a first set of isomorphic subgraphs is determined to obtain a first fixed cost set, the first set of isomorphic subgraphs is an isomorphic subgraph set corresponding to the $0^{th}$ maximum subgraph.

In step 603, a second fixed cost of each second isomorphic subgraph in a second set of isomorphic subgraphs is determined to obtain a second fixed cost set, the second set of isomorphic subgraphs is an isomorphic subgraph set corresponding to the $i^{th}$ maximum subgraph.

In step 604, exchange costs of all the first isomorphic subgraphs in the first set of isomorphic subgraphs and each second isomorphic subgraph in the second set of isomorphic subgraphs are determined to obtain $k_i$ exchange cost sets, each of the exchange cost sets includes $k_0$ exchange costs.

In step 605, $k_i$ consumption cost sets are determined based on the first fixed cost set, the second fixed cost set, and the $k_i$ exchange cost sets, each of the consumption cost sets includes $k_0$ consumption costs.

In step 606, a minimum consumption cost in each of the consumption cost sets is determined to obtain $k_i$ minimum consumption costs, the $k_i$ minimum consumption costs are in one-to-one correspondence to $k_i$ second isomorphic subgraphs in the second set of isomorphic subgraphs.

In step 607, each second isomorphic subgraph in the $k_i$ second isomorphic subgraphs and the first isomorphic subgraph corresponding thereto are constituted into a new first isomorphic subgraph, to obtain $k_i$ new first isomorphic subgraphs.

In step 608, the $k_i$ new first isomorphic subgraphs are determined as a new first set of isomorphic subgraphs.

In step 609, it is determined whether i is equal to N−1.

If not, step 610 is performed.

If yes, step 611 is performed.

In step 610, i=i+1 is set, and step 602 is performed, an initial value of i is 1.

In step 611, a quantum circuit is constructed based on the obtained $k_{N-1}$ minimum consumption costs.

With the quantum circuit construction method provided in some embodiments of the present disclosure, the quantum circuit with the minimum consumption in the quantum program can be found. However, amounts of calculation and storage thereof are very huge. Although the amounts of calculation and storage are reduced with the quantum circuit construction method provided in some other embodiments of the present disclosure, the optimal quantum circuit may be ignored. Therefore, the present disclosure further provides another quantum circuit construction method. Please refer to the following embodiments for details.

Referring to FIG. 7, FIG. 7 is a schematic flowchart of yet another quantum circuit construction method according to some embodiments of the present disclosure. The method includes the following steps.

In step 701, N sets of isomorphic subgraphs corresponding to N maximum subgraphs of a quantum program are determined, the N maximum subgraphs are determined based on a directed acyclic graph of the quantum program, the N sets of isomorphic subgraphs constitute a bit relation graph on a quantum chip in an electronic device obtained by mapping the N maximum subgraphs based on a topological structure of the quantum chip, and N is an integer greater than or equal to 1; and the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1.

In step 702, a first fixed cost of each first isomorphic subgraph in a first set of isomorphic subgraphs is determined to obtain a first fixed cost set, the first set of isomorphic subgraphs is an isomorphic subgraph set corresponding to the $0^{th}$ maximum subgraph.

In step 703, a second fixed cost of each second isomorphic subgraph in a second set of isomorphic subgraphs is determined to obtain a second fixed cost set, the second set of isomorphic subgraphs is an isomorphic subgraph set corresponding to the $i^{th}$ maximum subgraph.

In step 704, exchange costs of all the second isomorphic subgraphs in the second sets of isomorphic subgraphs and each first isomorphic subgraph in the first set of isomorphic subgraphs are determined to obtain $k_0$ exchange cost sets, each of the exchange cost sets includes $k_i$ exchange costs.

In step 705, $k_0$ consumption cost sets are determined based on the first fixed cost set, the second fixed cost set, and the $k_0$ exchange cost sets, each of the consumption cost sets includes $k_i$ consumption costs.

In step 706, a minimum consumption cost in each of the consumption cost sets is determined to obtain $k_0$ minimum consumption costs, the $k_0$ minimum consumption costs are in one-to-one correspondence to $k_0$ first isomorphic subgraphs in the first set of isomorphic subgraphs.

In step 707, each first isomorphic subgraph in the $k_0$ first isomorphic subgraphs and the second isomorphic subgraph corresponding thereto are constituted into a new first isomorphic subgraph, to obtain $k_0$ new first isomorphic subgraphs.

In step 708, the $k_0$ new first isomorphic subgraphs are determined as a new first set of isomorphic subgraphs.

In step 709, it is determined whether i is equal to N−1, an initial value of i is 1.

If not, step 710 is performed.

If yes, step 711 is performed.

In step 710, i=i+1 is set, and step 702 is performed.

In step 711, a quantum circuit is constructed based on the obtained $k_0$ minimum consumption costs.

Figure 8:
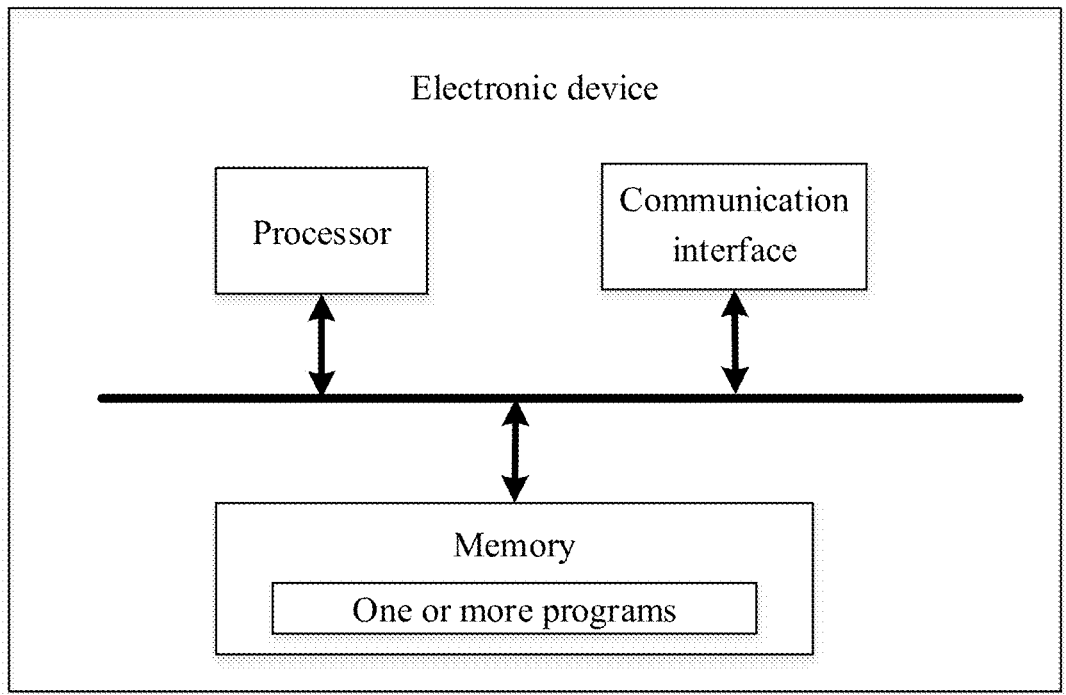
FIG. 8 is a schematic structural diagram of an electronic device according to some embodiments of the present disclosure.

Consistent with the embodiments shown in FIG. 1 to FIG. 7 above, referring to FIG. 8, FIG. 8 is a schematic structural diagram of an electronic device according to some embodiments of the present disclosure. As shown in FIG. 8, the electronic device includes a processor, a memory, a communication interface, and one or more programs, the one or more programs are stored in the memory and configured to be executed by the processor, and the programs include instructions for performing the following steps:

Acquiring a quantum program to be executed and a topological structure of a quantum chip corresponding to a quantum computing platform, the topological structure is configured to represent physical qubits in an electronic device and a connection relationship between the physical qubits; and Adapting the quantum program to the quantum computing platform based on the topological structure.

In some embodiments of the present disclosure, for the adapting the quantum program to the quantum computing platform based on the topological structure, the above programs include instructions specifically for performing the following steps:

Constructing a first directed acyclic graph of the quantum program;

Traversing the first directed acyclic graph to obtain a maximum subgraph sequence, the maximum subgraph sequence includes N maximum subgraphs, and N is an integer greater than or equal to 1;

Determining isomorphic subgraphs of the N maximum subgraphs in the topological structure to obtain N sets of isomorphic subgraphs, the N sets of isomorphic subgraphs are in one-to-one correspondence to the N maximum subgraphs; and Constructing a quantum circuit based on the N sets of isomorphic subgraphs, the quantum circuit is configured to operate on the quantum computing platform.

In some embodiments of the present disclosure, for the constructing a first directed acyclic graph of the quantum program, the above programs include instructions specifically for performing the following steps:

Acquiring quantum logic gates of the quantum program; and

Constructing the first directed acyclic graph based on the quantum logic gates, the first directed acyclic graph includes nodes and directed edges; the nodes include two points and an edge, the two points are configured to represent two logical qubits corresponding to the quantum logic gate, and the edge is configured to represent the quantum logic gate acting on the two logical qubits; and the directed edges are configured to represent dependence of the quantum logic gate based on a quantum state evolution time sequence of logical qubits.

In some embodiments of the present disclosure, the quantum logic gates include multi-quantum logic gates; and for the constructing the first directed acyclic graph based on the quantum logic gates, the above programs include instructions specifically for performing the following steps:

Converting the multi-quantum logic gate into a single-quantum logic gate and a two-quantum logic gate; and Deleting the single-quantum logic gate, and constructing the first directed acyclic graph based on the two-quantum logic gate.

In some embodiments of the present disclosure, for the constructing the first directed acyclic graph based on the quantum logic gates, the above programs include an instruction specifically for performing the following step:

Constructing, when the quantum logic gates include a plurality of continuous two-quantum logic gates and the plurality of continuous two-quantum logic gates act on two identical logical qubits, the first directed acyclic graph based on any one of the plurality of continuous two-quantum logic gates.

In some embodiments of the present disclosure, the above programs further include an instruction for performing the following step:

Constructing, when the quantum logic gates include a plurality of continuous two-quantum logic gates and the plurality of continuous two-quantum logic gates act on two different logical qubits, the first directed acyclic graph based on the plurality of continuous two-quantum logic gates.

In some embodiments of the present disclosure, for the traversing the first directed acyclic graph to obtain a maximum subgraph sequence, the above programs include instructions specifically for performing the following steps:

Determining a first node in the first directed acyclic graph, an in-degree of the first node is 0;

Generating a first subgraph based on the first node;

Deleting the first node to obtain a second directed acyclic graph;

Determining whether a second node exists in the second directed acyclic graph, an in-degree of the second node is 0;

Determining the first subgraph as a maximum subgraph when the second node does not exist in the second directed acyclic graph; and Arranging the maximum subgraphs in an order of generation to obtain the maximum subgraph sequence.

In some embodiments of the present disclosure, for the traversing the first directed acyclic graph to obtain a maximum subgraph sequence, the above programs further include instructions specifically for performing the following steps:

Determining, when the second node exists in the second directed acyclic graph, a priority of the second node, the second node includes two points and an edge, the two points are configured to represent two logical qubits in the quantum program, and the edge is configured to represent the quantum logic gate acting on the two logical qubits; and the priority of the second node is determined based on the two points, the edge, and the first subgraph; and Generating a maximum subgraph based on the second node and the priority of the second node.

In some embodiments of the present disclosure, for the generating a maximum subgraph based on the second node and the priority of the second node, the above programs include instructions specifically for performing the following steps:

Expanding, when the second node has a first priority, the first subgraph into a second subgraph based on the second node, and taking the second subgraph as a new first subgraph;

Deleting the second node to obtain a third directed acyclic graph; and

Taking the third directed acyclic graph as a new second directed acyclic graph, and then performing the step of determining whether a second node exists in the second directed acyclic graph.

In some embodiments of the present disclosure, for the generating a maximum subgraph based on the second node and the priority of the second node, the above programs further include an instruction specifically for performing the following step:

Taking, when the second node has a second priority, the second node as a new first node, and then performing the step of generating a first subgraph based on the first node, the first priority is prior than the second priority.

In some embodiments of the present disclosure, the first priority includes a first subpriority and a second subpriority, and the second priority includes a third subpriority and a fourth subpriority; and for the determining a priority of the second node, the above programs include instructions specifically for performing the following steps:

Determining the priority of the second node as the fourth subpriority when the two points and the edge do not exist in the first subgraph;

Determining the priority of the second node as the third subpriority when the two points exist and the edge does not exist in the first subgraph;

Determining the priority of the second node as the second subpriority when one of the two points exists and the edge does not exist in the first subgraph; and Determining the priority of the second node as the first subpriority if the two points and the edge exist in the first subgraph; the priorities, from high to low, are sequentially the first subpriority, the second subpriority, the third subpriority, and the fourth subpriority.

In some embodiments of the present disclosure, for the adapting the quantum program to the quantum computing platform based on the topological structure, the above programs include instructions specifically for performing the following steps:

Determining N sets of isomorphic subgraphs corresponding to N maximum subgraphs of the quantum program, the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and Determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and for the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the adaptation unit 902 is specifically configured to:

Determine the fixed cost of each isomorphic subgraph in the N sets of isomorphic subgraphs to obtain N fixed cost sets, the N fixed cost sets are in one-to-one correspondence to the N sets of isomorphic subgraphs;

Determine the exchange cost between any two isomorphic subgraphs in any adjacent sets of isomorphic subgraphs in the N sets of isomorphic subgraphs to obtain N−1 exchange cost sets, each of the exchange cost sets includes $k_i \cdot k_{i+1}$ exchange costs;

Determine $$\prod_{i=0}^{i=N-1} k_i$$

consumption costs based on the N fixed cost sets and the N−1 exchange cost sets; and Construct the quantum circuit based on the $$\prod_{i=0}^{i=N-1} k_i$$

consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and for the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the above programs include instructions specifically for performing the following steps:

Determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determining exchange costs of all the first isomorphic subgraphs in the first set of isomorphic subgraphs and each second isomorphic subgraph in the second set of isomorphic subgraphs to obtain $k_i$ exchange cost sets, each of the exchange cost sets includes $k_0$ exchange costs;

Determining $k_i$ consumption cost sets based on the first fixed cost set, the second fixed cost set, and the $k_i$ exchange cost sets, each of the consumption cost sets includes $k_0$ consumption costs;

Determining a minimum consumption cost in each of the consumption cost sets to obtain $k_i$ minimum consumption costs, the $k_i$ minimum consumption costs are in one-to-one correspondence to $k_i$ second isomorphic subgraphs in the second set of isomorphic subgraphs;

Constituting each second isomorphic subgraph in the $k_i$ second isomorphic subgraphs and the first isomorphic subgraph corresponding thereto into a new first isomorphic subgraph, to obtain $k_i$ new first isomorphic subgraphs;

Determining the $k_i$ new first isomorphic subgraphs as a new first set of isomorphic subgraphs;

Setting i=i+1, and performing the step of determining a first fixed cost of each first isomorphic subgraph in a first isomorphic subgraph set to obtain a first fixed cost set, an initial value of i is 1; and Constructing, when i=N−1, the quantum circuit based on the obtained $k_{N-1}$ minimum consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and for the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the above programs include instructions specifically for performing the following steps:

Determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determining exchange costs of all the second isomorphic subgraphs in the second sets of isomorphic subgraphs and each first isomorphic subgraph in the first set of isomorphic subgraphs to obtain $k_0$ exchange cost sets, each of the exchange cost sets includes $k_i$ exchange costs;

Determining $k_0$ consumption cost sets based on the first fixed cost set, the second fixed cost set, and the $k_0$ exchange cost sets, each of the consumption cost sets includes $k_i$ consumption costs;

Determining a minimum consumption cost in each of the consumption cost sets to obtain $k_0$ minimum consumption costs, the $k_0$ minimum consumption costs are in one-to-one correspondence to $k_0$ first isomorphic subgraphs in the first set of isomorphic subgraphs;

Constituting each first isomorphic subgraph in the $k_0$ first isomorphic subgraphs and the second isomorphic subgraph corresponding t hereto into a new first isomorphic subgraph, to obtain $k_0$ new first isomorphic subgraphs;

Determining the $k_0$ new first isomorphic subgraphs as a new first set of isomorphic subgraphs;

Setting i=i+1, and performing the step of determining a first fixed cost of each first isomorphic subgraph in a first isomorphic subgraph set to obtain a first fixed cost set, an initial value of i is 1; and Constructing, when i=N−1, the quantum circuit based on the obtained $k_0$ minimum consumption costs.

In some embodiments of the present disclosure, the fixed cost and the exchange cost are determined based on fidelity.

In some embodiments of the present disclosure, the fixed cost and the exchange cost are determined based on the number of CZ gates.

It is to be noted that a specific implementation process of this embodiment may be obtained with reference to the specific implementation process described in the above method embodiments. Details are not described herein again.

In an electronic device in some other embodiments provided in the present disclosure, the electronic device has a structure shown in FIG. 4. The electronic device includes a processor, a memory, a communication interface, and one or more programs, the one or more programs are stored in the memory and configured to be executed by the processor, and the programs include instructions for performing the following steps:

Traversing a first directed acyclic graph of a quantum program to obtain a maximum subgraph sequence, the maximum subgraph sequence includes N maximum subgraphs, and N is an integer greater than or equal to 1; and Constructing a quantum circuit according to the N maximum subgraphs and a topological structure, the topological structure is configured to represent physical qubits in an electronic device and a connection relationship between the physical qubits.

In some embodiments of the present disclosure, for the constructing a quantum circuit according to the N maximum subgraphs and a topological structure, the above programs include instructions specifically for performing the following steps:

Determining isomorphic subgraphs of the N maximum subgraphs in the topological structure to obtain N sets of isomorphic subgraphs, the N sets of isomorphic subgraphs are in one-to-one correspondence to the N maximum subgraphs; and Constructing the quantum circuit based on the N sets of isomorphic subgraphs.

In some embodiments of the present disclosure, for the traversing a first directed acyclic graph of a quantum program to obtain a maximum subgraph sequence, the above programs include instructions specifically for performing the following steps:

Determining a first node in the first directed acyclic graph, an in-degree of the first node is 0;

Generating a first subgraph based on the first node;

Deleting the first node to obtain a second directed acyclic graph;

Determining whether a second node exists in the second directed acyclic graph, an in-degree of the second node is 0;

Determining the first subgraph as a maximum subgraph when the second node does not exist in the second directed acyclic graph; and Arranging the maximum subgraphs in an order of generation to obtain the maximum subgraph sequence.

In some embodiments of the present disclosure, for the traversing a first directed acyclic graph of a quantum program to obtain a maximum subgraph sequence, the above programs further include instructions for performing the following steps:

Determining, when the second node exists in the second directed acyclic graph, a priority of the second node, the second node includes two points and an edge, the two points are configured to represent two logical qubits in the quantum program, and the edge is configured to represent the quantum logic gate acting on the two logical qubits; and the priority of the second node is determined based on the two points, the edge, and the first subgraph; and Generating a maximum subgraph based on the second node and the priority of the second node.

In some embodiments of the present disclosure, for the generating a maximum subgraph based on the second node and the priority of the second node, the above programs include instructions specifically for performing the following steps:

Expanding, when the second node has a first priority, the first subgraph into a second subgraph based on the second node, and taking the second subgraph as a new first subgraph;

Deleting the second node to obtain a third directed acyclic graph; and

Taking the third directed acyclic graph as a new second directed acyclic graph, and then performing the step of determining whether a second node exists in the second directed acyclic graph.

In some embodiments of the present disclosure, for the generating a maximum subgraph based on the second node and the priority of the second node, the above programs further include an instruction for performing the following step:

Taking, when the second node has a second priority, the second node as a new first node, and then performing the step of generating a first subgraph based on the first node, the first priority is prior than the second priority.

In some embodiments of the present disclosure, the first priority includes a first subpriority and a second subpriority, and the second priority includes a third subpriority and a fourth subpriority; and for the determining a priority of the second node, the above programs include instructions specifically for performing the following steps:

Determining the priority of the second node as the fourth subpriority when the two points and the edge do not exist in the first subgraph;

Determining the priority of the second node as the third subpriority when the two points exist and the edge does not exist in the first subgraph;

Determining the priority of the second node as the second subpriority when one of the two points exists and the edge does not exist in the first subgraph; and Determining the priority of the second node as the first subpriority if the two points and the edge exist in the first subgraph; the priorities, from high to low, are sequentially the first subpriority, the second subpriority, the third subpriority, and the fourth subpriority.

It is to be noted that a specific implementation process of this embodiment may be obtained with reference to the specific implementation process described in the above method embodiments. Details are not described herein again.

In an electronic device in some other embodiments provided in the present disclosure, the electronic device has a structure shown in FIG. 4. The electronic device includes a processor, a memory, a communication interface, and one or more programs, the one or more programs are stored in the memory and configured to be executed by the processor, and the programs include instructions for performing the following steps:

Determining N sets of isomorphic subgraphs corresponding to N maximum subgraphs of the quantum program, the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and Determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and for the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the above programs include instructions specifically for performing the following steps:

Determining the fixed cost of each isomorphic subgraph in the N sets of isomorphic subgraphs to obtain N fixed cost sets, the N fixed cost sets are in one-to-one correspondence to the N sets of isomorphic subgraphs;

Determining the exchange cost between any two isomorphic subgraphs in any adjacent sets of isomorphic subgraphs in the N sets of isomorphic subgraphs to obtain N−1 exchange cost sets, each of the exchange cost sets includes $k_i \cdot k_{i+1}$ exchange costs;

Determining $$\prod\nolimits_{i=0}^{i=N-1} k_i$$

consumption costs based on the N fixed cost sets and the N−1 exchange cost sets; and Constructing the quantum circuit based on the $$\prod\nolimits_{i=0}^{i=N-1} k_i$$

consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and for the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the above programs include instructions specifically for performing the following steps:

Determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determining exchange costs of all the first isomorphic subgraphs in the first set of isomorphic subgraphs and each second isomorphic subgraph in the second set of isomorphic subgraphs to obtain $k_i$ exchange cost sets, each of the exchange cost sets includes $k_0$ exchange costs;

Determining $k_i$ consumption cost sets based on the first fixed cost set, the second fixed cost set, and the $k_i$ exchange cost sets, each of the consumption cost sets includes $k_0$ consumption costs;

Determining a minimum consumption cost in each of the consumption cost sets to obtain $k_i$ minimum consumption costs, the $k_i$ minimum consumption costs are in one-to-one correspondence to $k_i$ second isomorphic subgraphs in the second set of isomorphic subgraphs;

Constituting each second isomorphic subgraph in the $k_i$ second isomorphic subgraphs and the first isomorphic subgraph corresponding thereto into a new first isomorphic subgraph, to obtain $k_i$ new first isomorphic subgraphs;

Determining the $k_i$ new first isomorphic subgraphs as a new first set of isomorphic subgraphs;

Setting i=i+1, and performing the step of determining a first fixed cost of each first isomorphic subgraph in a first isomorphic subgraph set to obtain a first fixed cost set, an initial value of i is 1; and Constructing, when i=N−1, the quantum circuit based on the obtained $k_{N-1}$ minimum consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and for the determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the above programs include instructions specifically for performing the following steps:

Determining a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determining a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determining exchange costs of all the second isomorphic subgraphs in the second sets of isomorphic subgraphs and each first isomorphic subgraph in the first set of isomorphic subgraphs to obtain $k_0$ exchange cost sets, each of the exchange cost sets includes $k_i$ exchange costs;

Determining $k_0$ consumption cost sets based on the first fixed cost set, the second fixed cost set, and the $k_0$ exchange cost sets, each of the consumption cost sets includes $k_i$ consumption costs;

Determining a minimum consumption cost in each of the consumption cost sets to obtain $k_0$ minimum consumption costs, the $k_0$ minimum consumption costs are in one-to-one correspondence to $k_0$ first isomorphic subgraphs in the first set of isomorphic subgraphs;

Constituting each first isomorphic subgraph in the $k_0$ first isomorphic subgraphs and the second isomorphic subgraph corresponding thereto into a new first isomorphic subgraph, to obtain $k_0$ new first isomorphic subgraphs;

Determining the $k_0$ new first isomorphic subgraphs as a new first set of isomorphic subgraphs;

Setting i=i+1, and performing the step of determining a first fixed cost of each first isomorphic subgraph in a first isomorphic subgraph set to obtain a first fixed cost set, an initial value of i is 1; and Constructing, when i=N−1, the quantum circuit based on the obtained $k_0$ minimum consumption costs.

In some embodiments of the present disclosure, the fixed cost and the exchange cost are determined based on fidelity.

In some embodiments of the present disclosure, the fixed cost and the exchange cost are determined based on the number of CZ gates.

It is to be noted that a specific implementation process of this embodiment may be obtained with reference to the specific implementation process described in the above method embodiments. Details are not described herein again.

In some embodiments of the present disclosure, the electronic device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It is to be noted that, in some embodiments of the present disclosure, division into units is an example, and is merely a logical function division. In an actual implementation, another division manner may be used.

Figure 9:
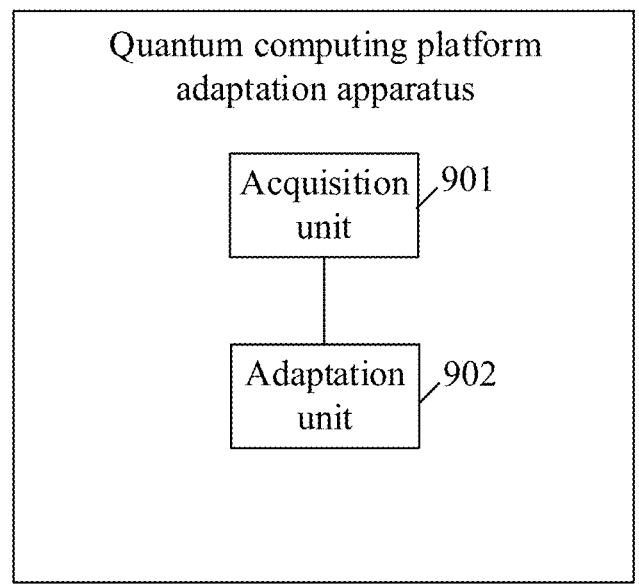
FIG. 9 is a schematic structural diagram of a quantum computing platform adaptation apparatus according to some embodiments of the present disclosure.

The following are apparatus embodiments of the present disclosure. The apparatus embodiments of the present disclosure are used to perform the method implemented by the method embodiments of the present disclosure. Referring to FIG. 9, FIG. 9 is a schematic structural diagram of a quantum computing platform adaptation apparatus according to some embodiments of the present disclosure. The apparatus includes:

An acquisition unit 901 configured to acquire a quantum program and a topological structure of a quantum chip corresponding to a quantum computing platform, the topological structure is configured to represent physical qubits in an electronic device and a connection relationship between the physical qubits; and An adaptation unit 902 configured to adapt the quantum program to the quantum computing platform based on the topological structure.

In some embodiments of the present disclosure, when adapting the quantum program to the quantum computing platform based on the topological structure, the adaptation unit 902 is specifically configured to:

Construct a first directed acyclic graph of the quantum program;

Traverse the first directed acyclic graph to obtain a maximum subgraph sequence, the maximum subgraph sequence includes N maximum subgraphs, and N is an integer greater than or equal to 1;

Determine isomorphic subgraphs of the N maximum subgraphs in the topological structure to obtain N sets of isomorphic subgraphs, the N sets of isomorphic subgraphs are in one-to-one correspondence to the N maximum subgraphs; and Construct a quantum circuit based on the N sets of isomorphic subgraphs, the quantum circuit is configured to operate on the quantum computing platform.

In some embodiments of the present disclosure, when constructing a first directed acyclic graph of the quantum program, the adaptation unit 902 is specifically configured to:

Acquire quantum logic gates of the quantum program; and

Construct the first directed acyclic graph based on the quantum logic gates, the first directed acyclic graph includes nodes and directed edges; the nodes include two points and an edge, the two points are configured to represent two logical qubits corresponding to the quantum logic gate, and the edge is configured to represent the quantum logic gate acting on the two logical qubits; and the directed edges are configured to represent dependence of the quantum logic gate based on a quantum state evolution time sequence of logical qubits.

In some embodiments of the present disclosure, the quantum logic gates include multi-quantum logic gates; and when constructing the first directed acyclic graph based on the quantum logic gates, the adaptation unit 902 is specifically configured to:

Convert the multi-quantum logic gate into a single-quantum logic gate and a two-quantum logic gate; and Delete the single-quantum logic gate, and construct the first directed acyclic graph based on the two-quantum logic gate.

In some embodiments of the present disclosure, when constructing the first directed acyclic graph based on the quantum logic gates, the adaptation unit 902 is specifically configured to:

Construct, when the quantum logic gates include a plurality of continuous two-quantum logic gates and the plurality of continuous two-quantum logic gates act on two identical logical qubits, the first directed acyclic graph based on any one of the plurality of continuous two-quantum logic gates.

In some embodiments of the present disclosure, the adaptation unit 902 is further configured to:

Construct, when the quantum logic gates include a plurality of continuous two-quantum logic gates and the plurality of continuous two-quantum logic gates act on two different logical qubits, the first directed acyclic graph based on the plurality of continuous two-quantum logic gates.

In some embodiments of the present disclosure, when traversing the first directed acyclic graph to obtain a maximum subgraph sequence, the adaptation unit 902 is specifically configured to:

Determine a first node in the first directed acyclic graph, an in-degree of the first node is 0;
Generate a first subgraph based on the first node;
Delete the first node to obtain a second directed acyclic graph;
Determine whether a second node exists in the second directed acyclic graph, an in-degree of the second node is 0;
Determine the first subgraph as a maximum subgraph when the second node does not exist in the second directed acyclic graph; and
Arrange the maximum subgraphs in an order of generation to obtain the maximum subgraph sequence.

In some embodiments of the present disclosure, when traversing the first directed acyclic graph to obtain a maximum subgraph sequence, the adaptation unit 902 is further configured to:

Determine, when the second node exists in the second directed acyclic graph, a priority of the second node, the second node includes two points and an edge, the two points are configured to represent two logical qubits in the quantum program, and the edge is configured to represent the quantum logic gate acting on the two logical qubits; and the priority of the second node is determined based on the two points, the edge, and the first subgraph; and
Generate a maximum subgraph based on the second node and the priority of the second node.

In some embodiments of the present disclosure, when generating a maximum subgraph based on the second node and the priority of the second node, the adaptation unit 902 is specifically configured to:

Expand, when the second node has a first priority, the first subgraph into a second subgraph based on the second node, and take the second subgraph as a new first subgraph;
Delete the second node to obtain a third directed acyclic graph; and
Take the third directed acyclic graph as a new second directed acyclic graph, and then perform the step of determining whether a second node exists in the second directed acyclic graph.

In some embodiments of the present disclosure, when generating a maximum subgraph based on the second node and the priority of the second node, the adaptation unit 902 is further configured to:

Take, when the second node has a second priority, the second node as a new first node, and then perform the step of generating a first subgraph based on the first node, the first priority is prior than the second priority.

In some embodiments of the present disclosure, the first priority includes a first subpriority and a second subpriority, and the second priority includes a third subpriority and a fourth subpriority; and when determining a priority of the second node, the adaptation unit 902 is specifically configured to:

Determine the priority of the second node as the fourth subpriority when the two points and the edge do not exist in the first subgraph;
Determine the priority of the second node as the third subpriority when the two points exist and the edge does not exist in the first subgraph;
Determine the priority of the second node as the second subpriority when one of the two points exists and the edge does not exist in the first subgraph; and
Determine the priority of the second node as the first subpriority if the two points and the edge exist in the first subgraph; the priorities, from high to low, are sequentially the first subpriority, the second subpriority, the third subpriority, and the fourth subpriority.

In some embodiments of the present disclosure, when adapting the quantum program to the quantum computing platform based on the topological structure, the adaptation unit 902 is specifically configured to:

Determine N sets of isomorphic subgraphs corresponding to N maximum subgraphs of the quantum program, the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and
Determine a fixed cost of each isomorphic subgraph in the N sets of isomorphic subgraphs and an exchange cost between any two isomorphic subgraphs in any adjacent sets of isomorphic subgraphs, and construct a quantum circuit based on the fixed cost and the exchange cost, the fixed cost is determined based on the quantum logic gate corresponding to the isomorphic subgraph, and the exchange cost is determined based on SWAP gates required for conversion between quantum logic gates corresponding to the isomorphic subgraphs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and when determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the adaptation unit 902 is specifically configured to:

Determine the fixed cost of each isomorphic subgraph in the N sets of isomorphic subgraphs to obtain N fixed cost sets, the N fixed cost sets are in one-to-one correspondence to the N sets of isomorphic subgraphs;

Determine the exchange cost between any two isomorphic subgraphs in any adjacent sets of isomorphic subgraphs in the N sets of isomorphic subgraphs to obtain N−1 exchange cost sets, each of the exchange cost sets includes $k_i \cdot k_{i+1}$ exchange costs;
Determine $$\prod_{i=0}^{i=N-1} k_i$$

consumption costs based on the N fixed cost sets and the N−1 exchange cost sets; and
Construct the quantum circuit based on the $$\prod_{i=0}^{i=N-1} k_i$$

consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and when determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the adaptation unit 902 is specifically configured to:

Determine a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determine a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determine exchange costs of all the first isomorphic subgraphs in the first set of isomorphic subgraphs and each second isomorphic subgraph in the second set of isomorphic subgraphs to obtain $k_i$ exchange cost sets, each of the exchange cost sets includes $k_0$ exchange costs;

Determine $k_i$ consumption cost sets based on the first fixed cost set, the second fixed cost set, and the $k_i$ exchange cost sets, each of the consumption cost sets includes $k_0$ consumption costs;

Determine a minimum consumption cost in each of the consumption cost sets to obtain $k_i$ minimum consumption costs, the $k_i$ minimum consumption costs are in one-to-one correspondence to $k_i$ second isomorphic subgraphs in the second set of isomorphic subgraphs;

Constitute each second isomorphic subgraph in the $k_i$ second isomorphic subgraphs and the first isomorphic subgraph corresponding thereto into a new first isomorphic subgraph, to obtain $k_i$ new first isomorphic subgraphs;

Determine the $k_i$ new first isomorphic subgraphs as a new first set of isomorphic subgraphs;

Set i=i+1, and perform the step of determining a first fixed cost of each first isomorphic subgraph in a first isomorphic subgraph set to obtain a first fixed cost set, an initial value of i is 1; and Construct, when i=N−1, the quantum circuit based on the obtained $k_{N-1}$ minimum consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and when determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the adaptation unit 902 is specifically configured to:

Determine a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determine a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determine exchange costs of all the second isomorphic subgraphs in the second sets of isomorphic subgraphs and each first isomorphic subgraph in the first set of isomorphic subgraphs to obtain $k_0$ exchange cost sets, each of the exchange cost sets includes $k_i$ exchange costs;

Determine $k_0$ consumption cost sets based on the first fixed cost set, the second fixed cost set, and the $k_0$ exchange cost sets, each of the consumption cost sets includes $k_i$ consumption costs;

Determine a minimum consumption cost in each of the consumption cost sets to obtain $k_0$ minimum consumption costs, the $k_0$ minimum consumption costs are in one-to-one correspondence to $k_0$ first isomorphic subgraphs in the first set of isomorphic subgraphs;

Constitute each first isomorphic subgraph in the $k_0$ first isomorphic subgraphs and the second isomorphic subgraph corresponding thereto into a new first isomorphic subgraph, to obtain $k_0$ new first isomorphic subgraphs;

Determine the $k_0$ new first isomorphic subgraphs as a new first set of isomorphic subgraphs;

Set i=i+1, and perform the step of determining a first fixed cost of each first isomorphic subgraph in a first isomorphic subgraph set to obtain a first fixed cost set, an initial value of i is 1; and Construct, when i=N−1, the quantum circuit based on the obtained $k_0$ minimum consumption costs.

In some embodiments of the present disclosure, the fixed cost and the exchange cost are determined based on fidelity.

In some embodiments of the present disclosure, the fixed cost and the exchange cost are determined based on the number of CZ gates.

It is to be noted that the acquisition unit 901 and the adaptation unit 902 may be implemented through a processor.

Figure 10:
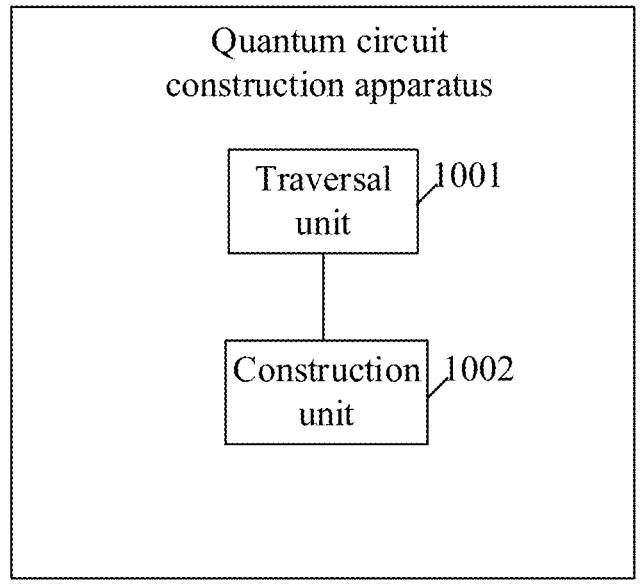
FIG. 10 is a schematic structural diagram of a quantum circuit construction apparatus according to some embodiments of the present disclosure.

Referring to FIG. 10, FIG. 10 is a schematic structural diagram of a quantum circuit construction apparatus according to some embodiments of the present disclosure. The apparatus includes:

A traversal unit 1001 configured to traverse a first directed acyclic graph of a quantum program to obtain a maximum subgraph sequence, the maximum subgraph sequence includes N maximum subgraphs, and N is an integer greater than or equal to 1; and A construction unit 1002 configured to construct a quantum circuit according to the N maximum subgraphs and a topological structure, the topological structure is configured to represent physical qubits in an electronic device and a connection relationship between the physical qubits.

In some embodiments of the present disclosure, when constructing a quantum circuit according to the N maximum subgraphs and a topological structure, the construction unit 1002 is specifically configured to determine isomorphic subgraphs of the N maximum subgraphs in the topological structure to obtain N sets of isomorphic subgraphs, the N sets of isomorphic subgraphs are in one-to-one correspondence to the N maximum subgraphs; and construct the quantum circuit based on the N sets of isomorphic subgraphs.

In some embodiments of the present disclosure, when traversing a first directed acyclic graph of a quantum program to obtain a maximum subgraph sequence, the traversal unit 1001 may be specifically configured to:

Determine a first node in the first directed acyclic graph, an in-degree of the first node is 0;

Generate a first subgraph based on the first node;

Delete the first node to obtain a second directed acyclic graph;

Determine whether a second node exists in the second directed acyclic graph, an in-degree of the second node is 0;

Determine the first subgraph as a maximum subgraph when the second node does not exist in the second directed acyclic graph; and Arrange the maximum subgraphs in an order of generation to obtain the maximum subgraph sequence.

In some embodiments of the present disclosure, when traversing a first directed acyclic graph of a quantum program to obtain a maximum subgraph sequence, the traversal unit 1001 may be further configured to:

Determine, when the second node exists in the second directed acyclic graph, a priority of the second node, the second node includes two points and an edge, the two points are configured to represent two logical qubits in the quantum program, and the edge is configured to represent the quantum logic gate acting on the two logical qubits; and the priority of the second node is determined based on the two points, the edge, and the first subgraph; and Generate a maximum subgraph based on the second node and the priority of the second node.

In some embodiments of the present disclosure, when generating a maximum subgraph based on the second node and the priority of the second node, the traversal unit 1001 may be specifically configured to:

Expand, when the second node has a first priority, the first subgraph into a second subgraph based on the second node, and take the second subgraph as a new first subgraph;

Delete the second node to obtain a third directed acyclic graph; and

Take the third directed acyclic graph as a new second directed acyclic graph, and then perform the step of determining whether a second node exists in the second directed acyclic graph.

In some embodiments of the present disclosure, when generating a maximum subgraph based on the second node and the priority of the second node, the traversal unit 1001 may be further configured to:

Take, when the second node has a second priority, the second node as a new first node, and then perform the step of generating a first subgraph based on the first node, the first priority is prior than the second priority.

In some embodiments of the present disclosure, the first priority includes a first subpriority and a second subpriority, and the second priority includes a third subpriority and a fourth subpriority; and when determining a priority of the second node, the traversal unit 1001 may be specifically configured to:

Determine the priority of the second node as the fourth subpriority when the two points and the edge do not exist in the first subgraph;

Determine the priority of the second node as the third subpriority when the two points exist and the edge does not exist in the first subgraph;

Determine the priority of the second node as the second subpriority when one of the two points exists and the edge does not exist in the first subgraph; and Determine the priority of the second node as the first subpriority if the two points and the edge exist in the first subgraph; the priorities, from high to low, are sequentially the first subpriority, the second subpriority, the third subpriority, and the fourth subpriority.

It is to be noted that the traversal unit 1001 and the construction unit 1002 may be implemented through a processor.

Figure 11:
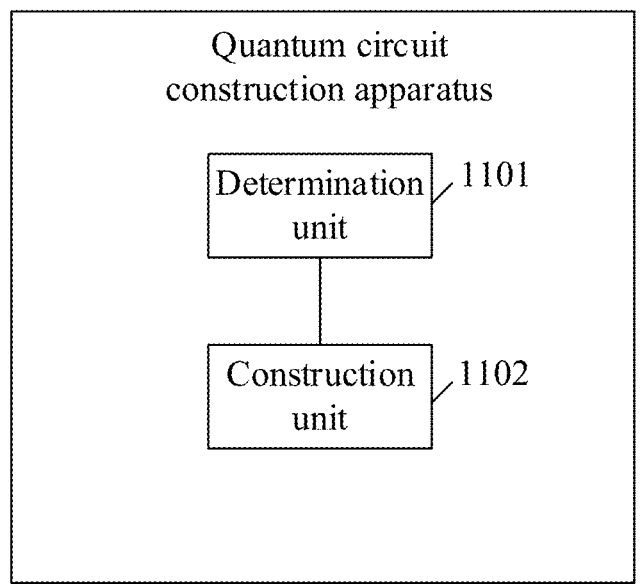
FIG. 11 is a schematic structural diagram of another quantum circuit construction apparatus according to some embodiments of the present disclosure.

Referring to FIG. 11, FIG. 11 is a schematic structural diagram of a quantum circuit construction apparatus according to some embodiments of the present disclosure. The apparatus includes:

A determination unit 1101 configured to determine N sets of isomorphic subgraphs corresponding to N maximum subgraphs of the quantum program, the N maximum subgraphs are determined based on a directed acyclic graph of the quantum program, and N is an integer greater than or equal to 1; and A construction unit 1102 configured to determine a fixed cost of each isomorphic subgraph in the N sets of isomorphic subgraphs and an exchange cost between any two isomorphic subgraphs in any adjacent sets of isomorphic subgraphs, and construct a quantum circuit based on the fixed cost and the exchange cost; the fixed cost is determined based on the quantum logic gate corresponding to the isomorphic subgraph, and the exchange cost is determined based on SWAP gates required for conversion between quantum logic gates corresponding to the isomorphic subgraphs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and when determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the construction unit 1102 is specifically configured to:

Determine the fixed cost of each isomorphic subgraph in the N sets of isomorphic subgraphs to obtain N fixed cost sets, the N fixed cost sets are in one-to-one correspondence to the N sets of isomorphic subgraphs;

Determine the exchange cost between any two isomorphic subgraphs in any adjacent sets of isomorphic subgraphs in the N sets of isomorphic subgraphs to obtain N−1 exchange cost sets, each of the exchange cost sets includes $k_i \cdot k_{i+1}$ exchange costs;

Determine $$\prod\nolimits_{i=0}^{i=N-1} k_i$$

consumption costs based on the N fixed cost sets and the N−1 exchange cost sets; and Construct the quantum circuit based on the $$\prod\nolimits_{i=0}^{i=N-1} k_i$$

consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and when determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the construction unit 1102 is specifically configured to:

Determine a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determine a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determine exchange costs of all the first isomorphic subgraphs in the first set of isomorphic subgraphs and each second isomorphic subgraph in the second set of isomorphic subgraphs to obtain $k_i$ exchange cost sets, each of the exchange cost sets includes $k_0$ exchange costs;

Determine $k_i$ consumption cost sets based on the first fixed cost set, the second fixed cost set, and the $k_i$ exchange cost sets, each of the consumption cost sets includes $k_0$ consumption costs;

Determine a minimum consumption cost in each of the consumption cost sets to obtain $k_i$ minimum consumption costs, the $k_i$ minimum consumption costs are in one-to-one correspondence to $k_i$ second isomorphic subgraphs in the second set of isomorphic subgraphs;

Constitute each second isomorphic subgraph in the $k_i$ second isomorphic subgraphs and the first isomorphic subgraph corresponding thereto into a new first isomorphic subgraph, to obtain $k_i$ new first isomorphic subgraphs;

Determine the $k_i$ new first isomorphic subgraphs as a new first set of isomorphic subgraphs;

Set i=i+1, and perform the step of determining a first fixed cost of each first isomorphic subgraph in a first isomorphic subgraph set to obtain a first fixed cost set, an initial value of i is 1; and Construct, when i=N−1, the quantum circuit based on the obtained $k_{N-1}$ minimum consumption costs.

In some embodiments of the present disclosure, the N maximum subgraphs constitute a maximum subgraph sequence, an isomorphic subgraph set corresponding to an $i^{th}$ maximum subgraph in the maximum subgraph sequence includes $k_i$ isomorphic subgraphs, and the maximum subgraph sequence is numbered from 0 to N−1; and when determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, the construction unit 1102 is specifically configured to:

Determine a first fixed cost of each first isomorphic subgraph in a first set of isomorphic subgraphs to obtain a first fixed cost set, the first set of isomorphic subgraphs is an isomorphic subgraph set corresponding to the $0^{th}$ maximum subgraph;

Determine a second fixed cost of each second isomorphic subgraph in a second set of isomorphic subgraphs to obtain a second fixed cost set, the second set of isomorphic subgraphs is an isomorphic subgraph set corresponding to the $i^{th}$ maximum subgraph;

Determine exchange costs of all the second isomorphic subgraphs in the second sets of isomorphic subgraphs and each first isomorphic subgraph in the first set of isomorphic subgraphs to obtain $k_0$ exchange cost sets, each of the exchange cost sets includes $k_i$ exchange costs;

Determine $k_0$ consumption cost sets based on the first fixed cost set, the second fixed cost set, and the $k_0$ exchange cost sets, each of the consumption cost sets includes $k_i$ consumption costs;

Determine a minimum consumption cost in each of the consumption cost sets to obtain $k_0$ minimum consumption costs, the $k_0$ minimum consumption costs are in one-to-one correspondence to $k_0$ first isomorphic subgraphs in the first set of isomorphic subgraphs;

Constitute each first isomorphic subgraph in the $k_0$ first isomorphic subgraphs and the second isomorphic subgraph corresponding thereto into a new first isomorphic subgraph, to obtain $k_0$ new first isomorphic subgraphs;

Determine the $k_0$ new first isomorphic subgraphs as a new first set of isomorphic subgraphs;

Set i=i+1, and perform the step of determining a first fixed cost of each first isomorphic subgraph in a first isomorphic subgraph set to obtain a first fixed cost set, an initial value of i is 1; and Construct, when i=N−1, the quantum circuit based on the obtained $k_0$ minimum consumption costs.

In some embodiments of the present disclosure, the fixed cost and the exchange cost are determined based on fidelity.

In some embodiments of the present disclosure, the fixed cost and the exchange cost are determined based on the number of CZ gates.

It is to be noted that the determination unit 1101 and the construction unit 1102 may be implemented through a processor.

Some embodiments of the present disclosure further provide a computer-readable storage medium. The computer-readable storage medium stores a computer program for electronic data exchange. The computer program causes a computer to perform some or all steps of any method described in the above method embodiments. The computer includes an electronic device.

Some embodiments of the present disclosure further provide a computer program product. The computer program product includes a non-transitory computer-readable storage medium storing a computer program. The computer program is operable to cause a computer to perform some or all steps of any method described in the above method embodiments. The computer program product may be a software installation package, and the above computer includes an electronic device.

Some embodiments of the present disclosure further provide a quantum computer operating system. The quantum computer operating system implements adaptation to the quantum computing platform according to some or all steps of any method described in the above method embodiments.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. In addition, those skilled in the art should also appreciate that all the embodiments described in the specification are preferred embodiments, and the actions and modules involved are not necessarily mandatory to the present disclosure.

In the above embodiments, the descriptions of the embodiments have respective focus points. For a part that is not described in detail in one embodiment, refer to related descriptions in other embodiments.

In the embodiments provided in the present disclosure, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may be or may not be physically separate, and parts displayed as units may be or may not be physical units, may be located in one position, or may be distributed on a plurality of network units. Some or all of the units may be selected based on actual requirements to achieve the objective of the solution of this embodiment.

In addition, functional units in various embodiments of the present disclosure may be integrated into one processing unit, or each of the units may exist alone physically, or two or more units are integrated into one unit. The above integrated units may be implemented in the form of hardware or software functional units.

The above integrated units, if implemented in the form of software functional unit and sold or used as an independent product, may be stored in a computer-readable memory. Based on such understanding, the technical solution of the present disclosure essentially, or the part contributing to the related art, or all or some of the technical solution may be implemented in the form of a software product. The computer software product is stored in a memory, and includes several instructions for instructing a computer device (which may be a personal computer, a server, a network device, or the like) to perform all or some of the steps of the methods described in various embodiments of the present disclosure. The foregoing memory includes: various media that can store program code, such as a USB flash drive, a read-only memory (ROM), a random access memory (RAM), a removable hard disk, a magnetic disk, or an optical disc.

Those of ordinary skill in the art may understand that all or some of the steps of the methods in the above embodiments may be implemented by a program instructing relevant hardware. The program may be stored in a computer-readable memory. The memory may include a flash memory, a ROM, a RAM, a magnetic disk, an optical disc, or the like.

Some embodiments of the present disclosure are described in detail above. The principle and some embodiments of the present disclosure are described herein through specific examples. The description about the embodiments is merely provided to help understand the method and core ideas of the present disclosure. In addition, those of ordinary skill in the art can make variations to the present disclosure in terms of the specific embodiments and application scopes based on the ideas of the present disclosure. Therefore, the contents of this specification shall not be construed as any limitation on the present disclosure.

What is claimed is:

1. A quantum computing platform adaptation method, comprising:
    acquiring a quantum program to be executed and a topological structure of a quantum chip corresponding to a quantum computing platform, wherein the topological structure is configured to represent physical qubits in an electronic device and a connection relationship between the physical qubits; and
    adapting the quantum program to the quantum computing platform based on the topological structure,
    wherein the adapting the quantum program to the quantum computing platform based on the topological structure comprises:
        determining N sets of isomorphic subgraphs corresponding to N maximum subgraphs of the quantum program, wherein the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and
        determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, wherein the fixed cost is determined based on the quantum logic gate corresponding to the isomorphic subgraph, and the exchange cost is determined based on SWAP gates required for conversion between quantum logic gates corresponding to the isomorphic subgraphs.

2. The method according to claim 1, wherein the adapting the quantum program to the quantum computing platform based on the topological structure comprises:
    constructing a first directed acyclic graph of the quantum program;
    traversing the first directed acyclic graph to obtain a maximum subgraph sequence, the maximum subgraph sequence comprises N maximum subgraphs, and N is an integer greater than or equal to 1;

determining isomorphic subgraphs of the N maximum subgraphs in the topological structure to obtain N sets of isomorphic subgraphs, the N sets of isomorphic subgraphs being in one-to-one correspondence to the N maximum subgraphs; and constructing the quantum circuit based on the N sets of isomorphic subgraphs, wherein the quantum circuit is configured to operate on the quantum computing platform.

3. The method according to claim 2, wherein the constructing the first directed acyclic graph of the quantum program comprises:

acquiring quantum logic gates of the quantum program; and constructing the first directed acyclic graph based on the quantum logic gates, wherein the first directed acyclic graph comprises nodes and directed edges; the nodes comprise two points and an edge, the two points are configured to represent two logical qubits corresponding to the quantum logic gate, and the edge is configured to represent the quantum logic gate acting on the two logical qubits; and the directed edges are configured to represent dependence of the quantum logic gate based on a quantum state evolution time sequence of logical qubits.

4. The method according to claim 3, wherein the quantum logic gates comprise multi-quantum logic gates; and the constructing the first directed acyclic graph based on the quantum logic gates comprises:

converting the multi-quantum logic gate into a single-quantum logic gate and a two-quantum logic gate; and deleting the single-quantum logic gate, and constructing the first directed acyclic graph based on the two-quantum logic gate.

5. The method according to claim 3, wherein the constructing the first directed acyclic graph based on the quantum logic gates comprises:

constructing, when the quantum logic gates comprise a plurality of continuous two-quantum logic gates and the plurality of continuous two-quantum logic gates act on two identical logical qubits, the first directed acyclic graph based on any one of the plurality of continuous two-quantum logic gates.

6. The method according to claim 5, wherein the method further comprises:

constructing, when the quantum logic gates comprise the plurality of continuous two-quantum logic gates and the plurality of continuous two-quantum logic gates act on two different logical qubits, the first directed acyclic graph based on the plurality of continuous two-quantum logic gates.

7. The method according to claim 2, wherein the traversing the first directed acyclic graph to obtain the maximum subgraph sequence comprises:

determining a first node in the first directed acyclic graph, an in-degree of the first node being 0;

generating a first subgraph based on the first node;

deleting the first node to obtain a second directed acyclic graph;

determining whether a second node exists in the second directed acyclic graph, an in-degree of the second node being 0;

determining the first subgraph as a maximum subgraph when the second node does not exist in the second directed acyclic graph; and arranging the maximum subgraphs in an order of generation to obtain the maximum subgraph sequence.

8. The method according to claim 7, wherein the traversing the first directed acyclic graph to obtain the maximum subgraph sequence further comprises:

determining, when the second node exists in the second directed acyclic graph, a priority of the second node, wherein the second node comprises two points and an edge, the two points are configured to represent two logical qubits in the quantum program, and the edge is configured to represent the quantum logic gate acting on the two logical qubits; and the priority of the second node is determined based on the two points, the edge, and the first subgraph; and generating a maximum subgraph based on the second node and the priority of the second node.

9. The method according to claim 8, wherein the generating the maximum subgraph based on the second node and the priority of the second node comprises:

expanding, when the second node has a first priority, the first subgraph into a second subgraph, and taking the second subgraph as a new first subgraph;

deleting the second node to obtain a third directed acyclic graph; and taking the third directed acyclic graph as a new second directed acyclic graph, and then performing the step of determining whether a second node exists in the second directed acyclic graph.

10. The method according to claim 9, wherein the generating the maximum subgraph based on the second node and the priority of the second node further comprises:

taking, when the second node has a second priority, the second node as a new first node, and then performing the step of generating a first subgraph based on the first node, wherein the first priority is prior than the second priority.

11. The method according to claim 10, wherein the first priority comprises a first subpriority and a second subpriority, and the second priority comprises a third subpriority and a fourth subpriority; and the determining a priority of the second node comprises:

determining the priority of the second node as the fourth subpriority when the two points and the edge do not exist in the first subgraph;

determining the priority of the second node as the third subpriority when the two points exist and the edge does not exist in the first subgraph;

determining the priority of the second node as the second subpriority when one of the two points exists and the edge does not exist in the first subgraph; and determining the priority of the second node as the first subpriority if the two points and the edge exist in the first subgraph; wherein the priorities, from high to low, are sequentially the first subpriority, the second subpriority, the third subpriority, and the fourth subpriority.

12. The method according to claim 1, wherein the N maximum subgraphs constitute a maximum subgraph sequence, an isomorphic subgraph set corresponding to an $i^{th}$ maximum subgraph in the maximum subgraph sequence comprises $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing the quantum circuit based on the fixed cost and the exchange cost comprises:

determining the fixed cost of each isomorphic subgraph in the N sets of isomorphic subgraphs to obtain N fixed cost sets, wherein the N fixed cost sets are in one-to-one correspondence to the N sets of isomorphic subgraphs;
determining the exchange cost between any two isomorphic subgraphs in any adjacent sets of isomorphic subgraphs in the N sets of isomorphic subgraphs to obtain N−1 exchange cost sets, wherein each of the exchange cost sets comprises $k_i \cdot k_{i+1}$ exchange costs;
determining $$\prod_{i=0}^{i=N-1} k_i$$

consumption costs based on the N fixed cost sets and the N−1 exchange cost sets; and
constructing the quantum circuit based on the $$\prod_{i=0}^{i=N-1} k_i$$

consumption costs.

13. The method according to claim 1, wherein the N maximum subgraphs constitute a maximum subgraph sequence, a set of isomorphic subgraphs corresponding to an $i^{th}$ maximum subgraph in the maximum subgraph sequence comprises $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing the quantum circuit based on the fixed cost and the exchange cost comprises:
    determining a first fixed cost of each first isomorphic subgraph in a first set of isomorphic subgraphs to obtain a first fixed cost set, wherein the first set of isomorphic subgraphs is an isomorphic subgraph set corresponding to the $0^{th}$ maximum subgraph;
    determining a second fixed cost of each second isomorphic subgraph in a second set of isomorphic subgraphs to obtain a second fixed cost set, wherein the second set of isomorphic subgraphs is an isomorphic subgraph set corresponding to the $i^{th}$ maximum subgraph;
    determining exchange costs of all the first isomorphic subgraphs in the first set of isomorphic subgraphs and each second isomorphic subgraph in the second set of isomorphic subgraphs to obtain $k_i$ exchange cost sets, wherein each of the exchange cost sets comprises $k_0$ exchange costs;
    determining $k_i$ consumption cost sets based on the first fixed cost set, the second fixed cost set, and the $k_i$ exchange cost sets, wherein each of the consumption cost sets comprises $k_0$ consumption costs;
    determining a minimum consumption cost in each of the consumption cost sets to obtain $k_i$ minimum consumption costs, wherein the $k_i$ minimum consumption costs are in one-to-one correspondence to $k_i$ second isomorphic subgraphs in the second set of isomorphic subgraphs;
    constituting each second isomorphic subgraph in the $k_i$ second isomorphic subgraphs and the first isomorphic subgraph corresponding thereto into a new first isomorphic subgraph, to obtain $k_i$ new first isomorphic subgraphs;
    determining the $k_i$ new first isomorphic subgraphs as a new first set of isomorphic subgraphs;
    setting i=i+1, and performing the step of determining a first fixed cost of each first isomorphic subgraph in a first isomorphic subgraph set to obtain a first fixed cost set, wherein an initial value of i is 1; and
    constructing, when i=N−1, the quantum circuit based on the obtained $k_{N-1}$ minimum consumption costs.

14. The method according to claim 1, wherein the N maximum subgraphs constitute a maximum subgraph sequence, a set of isomorphic subgraphs corresponding to an $i^{th}$ maximum subgraph in the maximum subgraph sequence comprises $k_i$ isomorphic subgraphs, and the maximum subgraph sequence is numbered from 0 to N−1; and the determining a fixed cost of each isomorphic subgraph in the N sets of isomorphic subgraphs and an exchange cost between any two isomorphic subgraphs in any adjacent sets of isomorphic subgraphs, and constructing the quantum circuit based on the fixed cost and the exchange cost comprises:
    determining a first fixed cost of each first isomorphic subgraph in a first set of isomorphic subgraphs to obtain a first fixed cost set, wherein the first set of isomorphic subgraphs is an isomorphic subgraph set corresponding to the $0^{th}$ maximum subgraph;
    determining a second fixed cost of each second isomorphic subgraph in a second set of isomorphic subgraphs to obtain a second fixed cost set, wherein the second set of isomorphic subgraphs is an isomorphic subgraph set corresponding to the $i^{th}$ maximum subgraph;
    determining exchange costs of all the second isomorphic subgraphs in the second sets of isomorphic subgraphs and each first isomorphic subgraph in the first set of isomorphic subgraphs to obtain $k_0$ exchange cost sets, wherein each of the exchange cost sets comprises $k_i$ exchange costs;
    determining $k_0$ consumption cost sets based on the first fixed cost set, the second fixed cost set, and the $k_0$ exchange cost sets, wherein each of the consumption cost sets comprises $k_i$ consumption costs;
    determining a minimum consumption cost in each of the consumption cost sets to obtain $k_0$ minimum consumption costs, wherein the $k_0$ minimum consumption costs are in one-to-one correspondence to $k_0$ first isomorphic subgraphs in the first set of isomorphic subgraphs;
    constituting each first isomorphic subgraph in the $k_0$ first isomorphic subgraphs and the second isomorphic subgraph corresponding thereto into a new first isomorphic subgraph, to obtain $k_0$ new first isomorphic subgraphs;
    determining the $k_0$ new first isomorphic subgraphs as a new first set of isomorphic subgraphs;
    setting i=i+1, and performing the step of determining a first fixed cost of each first isomorphic subgraph in a first set of isomorphic subgraphs to obtain a first fixed cost set, wherein an initial value of i is 1; and
    constructing, when i=N−1, the quantum circuit based on the obtained $k_0$ minimum consumption costs.

15. The method according to claim 1, wherein the fixed cost and the exchange cost are determined based on fidelity, or
    wherein the fixed cost and the exchange cost are determined based on a number of CZ gates.

16. A quantum computing platform adaptation apparatus, comprising:
    at least one processor; and
    a memory configured to store instructions executable by the at least one processor;
    wherein the instructions cause the at least one processor to:

acquire a quantum program and a topological structure of a quantum chip corresponding to a quantum computing platform, wherein the topological structure is configured to represent physical qubits in an electronic device and a connection relationship between the physical qubits; and adapt the quantum program to the quantum computing platform based on the topological structure, wherein the adapting the quantum program to the quantum computing platform based on the topological structure comprises:

determining N sets of isomorphic subgraphs corresponding to N maximum subgraphs of the quantum program, wherein the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, wherein the fixed cost is determined based on the quantum logic gate corresponding to the isomorphic subgraph, and the exchange cost is determined based on SWAP gates required for conversion between quantum logic gates corresponding to the isomorphic subgraphs.

17. The apparatus according to claim 16, wherein the processor is further configured to:

construct a first directed acyclic graph of the quantum program;

traverse the first directed acyclic graph to obtain a maximum subgraph sequence, the maximum subgraph sequence comprises N maximum subgraphs, and N is an integer greater than or equal to 1;

determine isomorphic subgraphs of the N maximum subgraphs in the topological structure to obtain N sets of isomorphic subgraphs, the N sets of isomorphic subgraphs being in one-to-one correspondence to the N maximum subgraphs; and construct the quantum circuit based on the N sets of isomorphic subgraphs, wherein the quantum circuit is configured to operate on the quantum computing platform.

18. A non-transitory computer-readable storage medium, wherein the computer-readable storage medium stores computer program instructions thereon, the computer program instructions, when being executed by a processor, are configured to:

acquire a quantum program and a topological structure of a quantum chip corresponding to a quantum computing platform, wherein the topological structure is configured to represent physical qubits in an electronic device and a connection relationship between the physical qubits; and adapt the quantum program to the quantum computing platform based on the topological structure, wherein the adapting the quantum program to the quantum computing platform based on the topological structure comprises:

determining N sets of isomorphic subgraphs corresponding to N maximum subgraphs of the quantum program, wherein the N maximum subgraphs are determined based on a directed acyclic graph of the quantum program, the N sets of isomorphic subgraphs constitute a bit relation graph on the quantum chip obtained by mapping the N maximum subgraphs based on the topological structure of the quantum chip in the electronic device, and N is an integer greater than or equal to 1; and determining a fixed cost of each isomorphic subgraph in the N sets of isomorphic subgraphs and an exchange cost between any two isomorphic subgraphs in any adjacent sets of isomorphic subgraphs, and constructing a quantum circuit based on the fixed cost and the exchange cost, wherein the fixed cost is determined based on the quantum logic gate corresponding to the isomorphic subgraph, and the exchange cost is determined based on SWAP gates required for conversion between quantum logic gates corresponding to the isomorphic subgraphs.

19. The non-transitory computer-readable storage medium according to claim 18, wherein the processor is further configured to:

construct a first directed acyclic graph of the quantum program;

traverse the first directed acyclic graph to obtain a maximum subgraph sequence, the maximum subgraph sequence comprises N maximum subgraphs, and N is an integer greater than or equal to 1;

determine isomorphic subgraphs of the N maximum subgraphs in the topological structure to obtain N sets of isomorphic subgraphs, the N sets of isomorphic subgraphs being in one-to-one correspondence to the N maximum subgraphs; and construct the quantum circuit based on the N sets of isomorphic subgraphs, wherein the quantum circuit is configured to operate on the quantum computing platform.

* * * * *